US012671867B2

(12) United States Patent
Noguchi

(10) Patent No.: US 12,671,867 B2
(45) **Date of Patent: \*Jun. 30, 2026**

(54) IMAGE PROCESSING DEVICE, OPERATION METHOD OF IMAGE PROCESSING DEVICE, AND OPERATION PROGRAM OF IMAGE PROCESSING DEVICE

(71) Applicant: FUJIFILM Corporation, Tokyo (JP)

(72) Inventor: Yukinori Noguchi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 74 days.

This patent is subject to a terminal disclaimer.

(21) Appl. No.: 18/760,747

(22) Filed: Jul. 1, 2024

(65) Prior Publication Data

US 2024/0357203 A1 Oct. 24, 2024

Related U.S. Application Data

(63) Continuation of application No. 17/822,694, filed on Aug. 26, 2022, now Pat. No. 12,069,340, which is a (Continued)

(30) Foreign Application Priority Data

Mar. 31, 2020 (JP) ................................. 2020-064618

(51) Int. Cl.
*H04N 21/442* (2011.01)
*G06T 7/00* (2017.01)
(Continued)

(52) U.S. Cl.
CPC ..... *H04N 21/44245* (2013.01); *G06T 7/0002* (2013.01); *H04N 17/002* (2013.01); *H04N 21/4621* (2013.01); *G06T 2207/30168* (2013.01)

(58) Field of Classification Search
CPC ............. H04N 17/002; H04N 21/4621; H04N 21/44245; H04N 21/232; H04N 21/23418;
(Continued)

(56) References Cited

U.S. PATENT DOCUMENTS 7,346,844 B1 3/2008 Baer et al.
8,266,120 B2 9/2012 Hsu et al.
(Continued)

FOREIGN PATENT DOCUMENTS

JP 2011-082864 A 4/2011
JP 2012-165371 A 8/2012
(Continued)

OTHER PUBLICATIONS

An Office Action; "Notice of Reasons for Refusal," mailed by the Japanese Patent Office on Dec. 3, 2024, which corresponds to Japanese Patent Application No. 2023-075237 and is related to U.S. Appl. No. 18/760,747; with English language translation.
(Continued)

*Primary Examiner* — Marly S Camargo
(74) *Attorney, Agent, or Firm* — Studebaker Brackett PLLC

(57) ABSTRACT

Provided is an image processing device including at least one processor, in which the processor acquires a first performance evaluation value related to performance of a first imaging apparatus of a first user who is one of a plurality of users, acquires a second performance evaluation value related to performance of a second imaging apparatus of a second user different from the first user among the plurality of users, specifies an image of the second user corresponding to the second imaging apparatus having the second performance evaluation value, which is equal to or larger than the first performance evaluation value, from shared images
(Continued)

which are limitedly shared by the plurality of users, and sets a presentation priority of a specific image, which is the specified image, to the first user to be higher than presentation priorities of other shared images.

20 Claims, 35 Drawing Sheets

Related U.S. Application Data continuation of application No. PCT/JP2020/047534, filed on Dec. 18, 2020.

(51) Int. Cl.

| *H04N 17/00* | (2006.01) |
| *H04N 21/2747* | (2011.01) |
| *H04N 21/462* | (2011.01) |

(58) Field of Classification Search

CPC ............. H04N 21/2408; H04N 21/258; H04N 21/26258; H04N 21/2747; H04N 21/4314; G06T 7/0002; G06T 2207/30168

See application file for complete search history.

(56) References Cited

U.S. PATENT DOCUMENTS

| 8,705,945 | B2 | | 4/2014 | Mae | |
| 9,241,018 | B2 | * | 1/2016 | Johnson | ................. G06V 20/30 |
| 11,288,786 | B2 | | 3/2022 | Wada et al. | |
| 12,069,340 | B2 | * | 8/2024 | Noguchi | .............. H04N 21/442 |
| 2011/0085696 | A1 | | 4/2011 | Yamakawa | |
| 2012/0192242 | A1 | | 7/2012 | Kellerer et al. | |
| 2014/0285687 | A1 | | 9/2014 | Yamamoto | |
| 2015/0281568 | A1 | | 10/2015 | Kamada et al. | |
| 2017/0180626 | A1 | | 6/2017 | Hayashi et al. | |
| 2023/0019620 | A1 | | 1/2023 | Noda | |
| 2024/0098346 | A1 | * | 3/2024 | Kumar et al. | ... H04N 21/23418 |

FOREIGN PATENT DOCUMENTS

| JP | 2014-182651 | A | 9/2014 |
| JP | 2016-123069 | A | 7/2016 |
| JP | 2019-220994 | A | 12/2019 |
| WO | 2014/054342 | A1 | 4/2014 |
| WO | 2016/038977 | A1 | 3/2016 |

OTHER PUBLICATIONS

Written Opinion of the International Searching Authority issued in PCT/JP2020/047534; mailed Mar. 9, 2021.
International Search Report issued in PCT/JP2020/047534; mailed Mar. 9, 2021.

* cited by examiner

FIG. 4

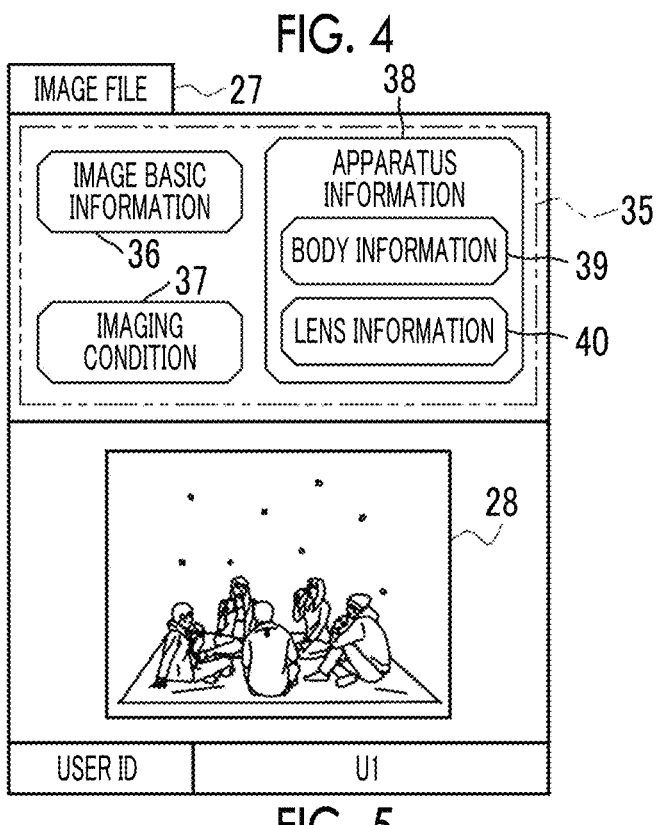

| IMAGE FILE | 27 | 38 |
| --- | --- | --- |

- IMAGE BASIC INFORMATION — 36
- IMAGING CONDITION — 37
- APPARATUS INFORMATION — 35
  - BODY INFORMATION — 39
  - LENS INFORMATION — 40

28

| USER ID | U1 |
| --- | --- |

FIG. 5

| IMAGE BASIC INFORMATION — 36 | | | |
| --- | --- | --- | --- |
| IMAGE ID | IMG0100 | | |
| IMAGING DATE AND TIME | 04/05/2020   19:08 | | |
| IMAGING LOCATION | 41.40356   2.66334 | | |
| TAG | CHERRY-BLOSSOM VIEWING | ENTERTAINMENT PARTY | CHERRY BLOSSOMS AT NIGHT |

FIG. 6

| IMAGING CONDITION — 37 | |
| --- | --- |
| EXPOSURE TIME | 1/60 |
| ISO SENSITIVITY | 800 |
| SHUTTER SPEED | 1/60 |
| F-NUMBER | F4 |
| SUBJECT DISTANCE | 2.0 m |
| FOCAL LENGTH | 30 mm |
| IMAGING MODE SETTING | NIGHT VIEW MODE |

| BODY INFORMATION | 39 |
|---|---|
| MANUFACTURER NAME | FD1 |
| MODEL NAME | FD1a |
| RESOLUTION | 500 dpi × 500 dpi |
| ⋮ | |

| LENS INFORMATION | 40 |
|---|---|
| MANUFACTURER NAME | FL1 |
| MODEL NAME | FL1a |
| MINIMUM F-NUMBER | F2 |
| FOCAL LENGTH | 16 mm TO 80 mm |
| ANGLE OF VIEW | 84° TO 20° |
| ⋮ | |

FIG. 15

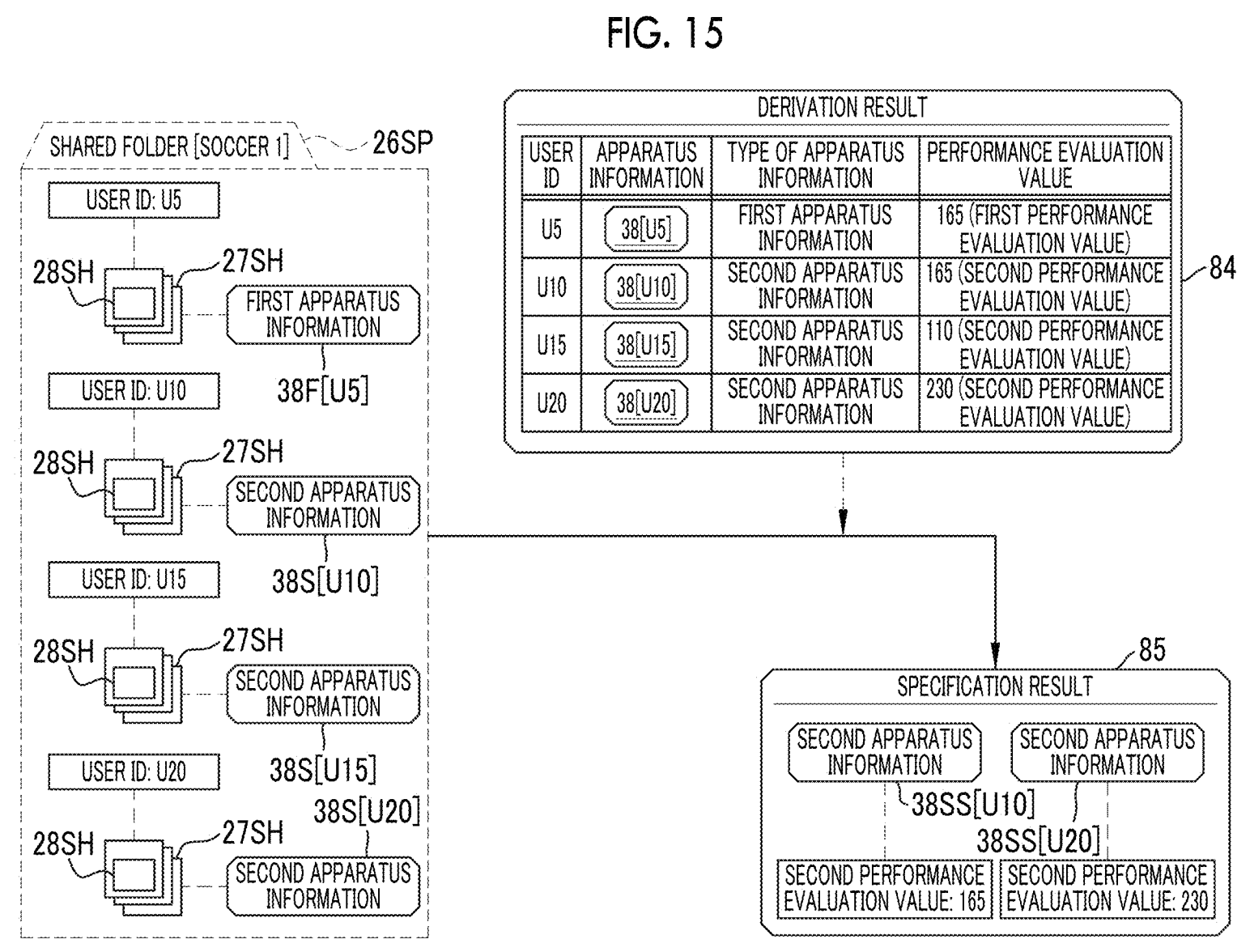

DERIVATION RESULT — 84

| USER ID | APPARATUS INFORMATION | TYPE OF APPARATUS INFORMATION | PERFORMANCE EVALUATION VALUE |
|---|---|---|---|
| U5 | 38[U5] | FIRST APPARATUS INFORMATION | 165 (FIRST PERFORMANCE EVALUATION VALUE) |
| U10 | 38[U10] | SECOND APPARATUS INFORMATION | 165 (SECOND PERFORMANCE EVALUATION VALUE) |
| U15 | 38[U15] | SECOND APPARATUS INFORMATION | 110 (SECOND PERFORMANCE EVALUATION VALUE) |
| U20 | 38[U20] | SECOND APPARATUS INFORMATION | 230 (SECOND PERFORMANCE EVALUATION VALUE) |

SPECIFICATION RESULT — 85

| SECOND APPARATUS INFORMATION | SECOND APPARATUS INFORMATION |
|---|---|
| 38SS[U10] | 38SS[U20] |
| SECOND PERFORMANCE EVALUATION VALUE: 165 | SECOND PERFORMANCE EVALUATION VALUE: 230 |

SHARED FOLDER [SOCCER 1] — 26SP

USER ID: U5
27SH
FIRST APPARATUS INFORMATION
38F[U5]
28SH

USER ID: U10
27SH
SECOND APPARATUS INFORMATION
38S[U10]
28SH

USER ID: U15
27SH
SECOND APPARATUS INFORMATION
38S[U15]
28SH

USER ID: U20
27SH
SECOND APPARATUS INFORMATION
38S[U20]
28SH

Figure 18:
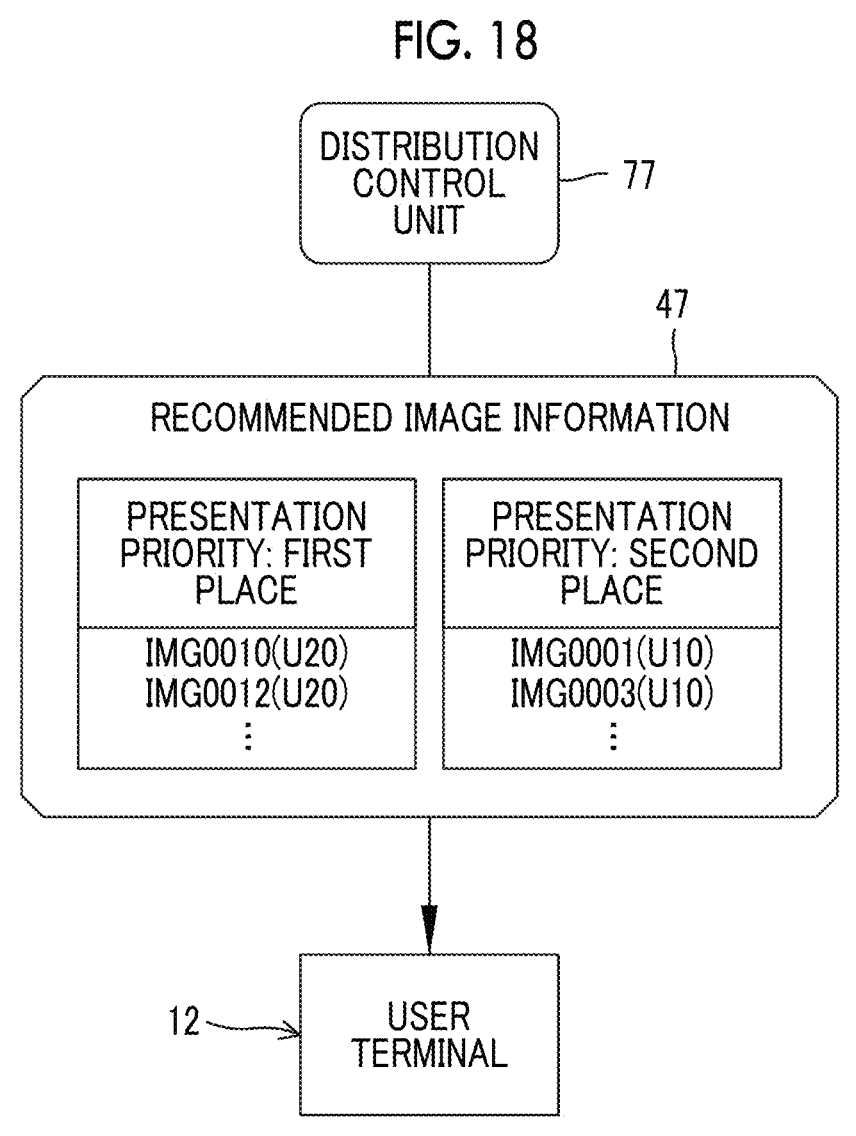

DISTRIBUTION
CONTROL
UNIT — 77

47

RECOMMENDED IMAGE INFORMATION

| PRESENTATION PRIORITY: FIRST PLACE | PRESENTATION PRIORITY: SECOND PLACE |
|---|---|
| IMG0010(U20)<br>IMG0012(U20)<br>⋮ | IMG0001(U10)<br>IMG0003(U10)<br>⋮ |

12 — USER
TERMINAL

FIG. 19

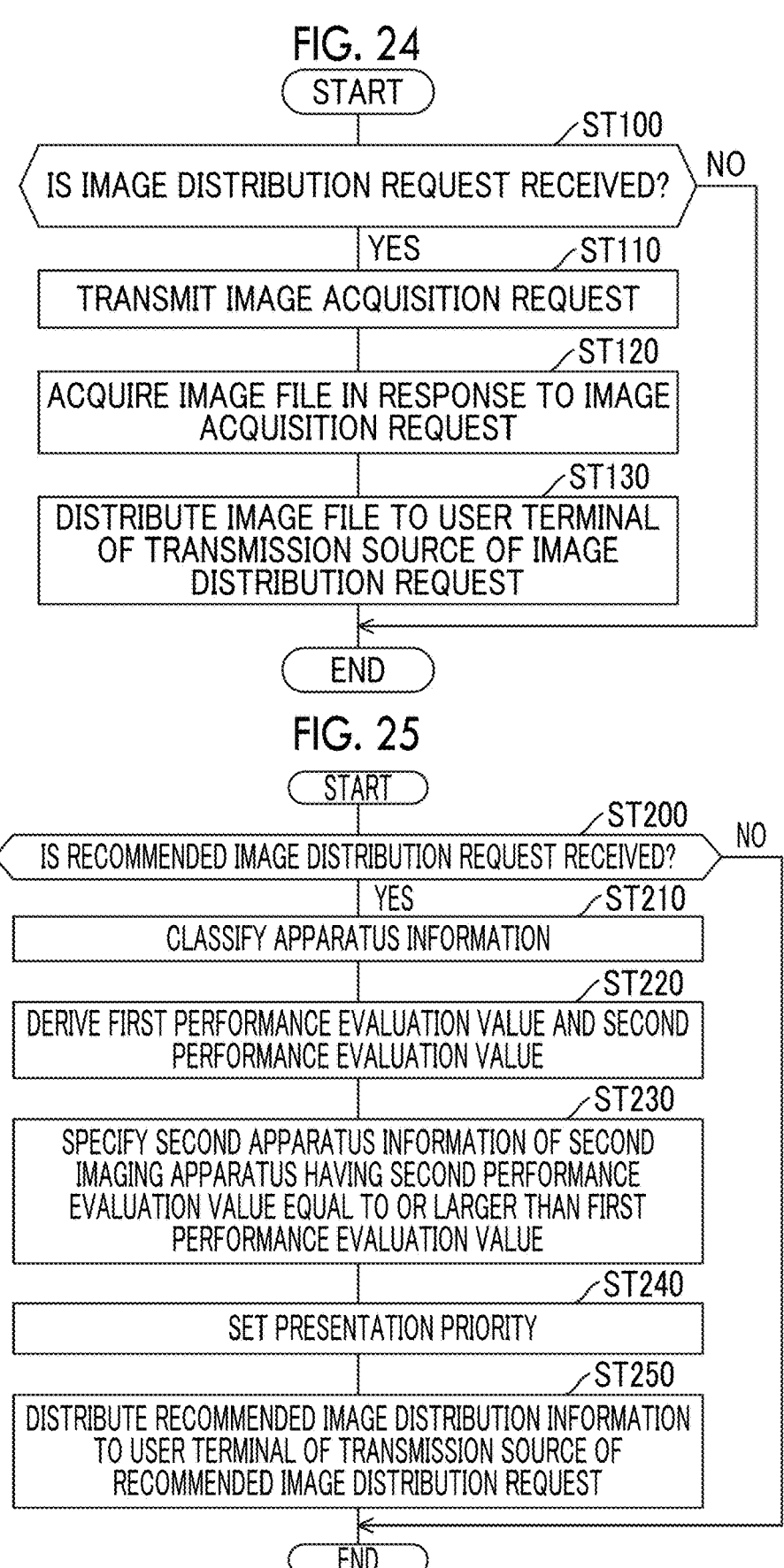

FIG. 24

START

ST100
IS IMAGE DISTRIBUTION REQUEST RECEIVED? — NO

YES   ST110
TRANSMIT IMAGE ACQUISITION REQUEST

ST120
ACQUIRE IMAGE FILE IN RESPONSE TO IMAGE ACQUISITION REQUEST

ST130
DISTRIBUTE IMAGE FILE TO USER TERMINAL OF TRANSMISSION SOURCE OF IMAGE DISTRIBUTION REQUEST

END

FIG. 25

START

ST200
IS RECOMMENDED IMAGE DISTRIBUTION REQUEST RECEIVED? — NO

YES   ST210
CLASSIFY APPARATUS INFORMATION

ST220
DERIVE FIRST PERFORMANCE EVALUATION VALUE AND SECOND PERFORMANCE EVALUATION VALUE

ST230
SPECIFY SECOND APPARATUS INFORMATION OF SECOND IMAGING APPARATUS HAVING SECOND PERFORMANCE EVALUATION VALUE EQUAL TO OR LARGER THAN FIRST PERFORMANCE EVALUATION VALUE

ST240
SET PRESENTATION PRIORITY

ST250
DISTRIBUTE RECOMMENDED IMAGE DISTRIBUTION INFORMATION TO USER TERMINAL OF TRANSMISSION SOURCE OF RECOMMENDED IMAGE DISTRIBUTION REQUEST

END

Figure 33:
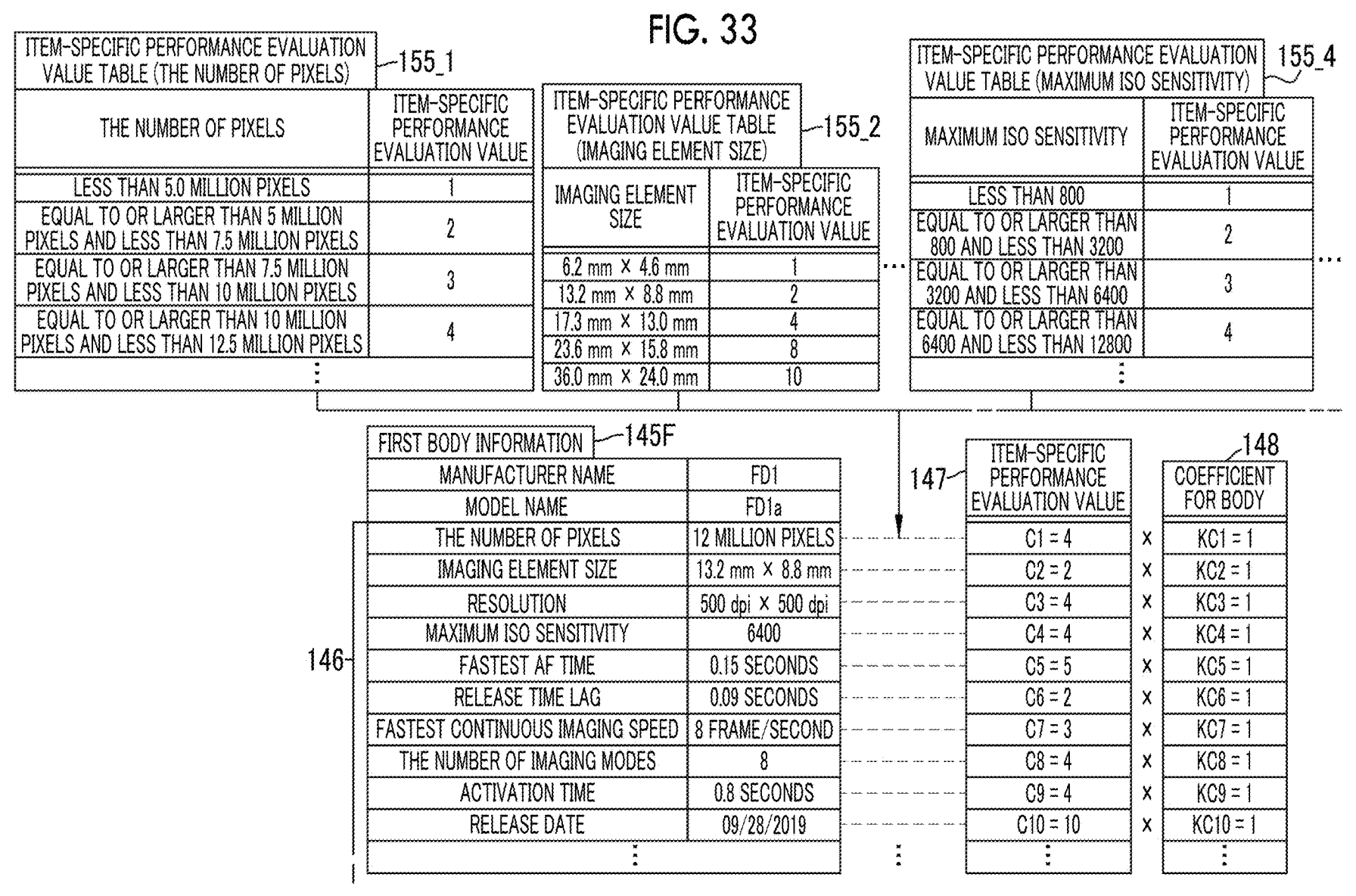

155_1 — ITEM-SPECIFIC PERFORMANCE EVALUATION VALUE TABLE (THE NUMBER OF PIXELS)

| THE NUMBER OF PIXELS | ITEM-SPECIFIC PERFORMANCE EVALUATION VALUE |
|---|---|
| LESS THAN 5.0 MILLION PIXELS | 1 |
| EQUAL TO OR LARGER THAN 5 MILLION PIXELS AND LESS THAN 7.5 MILLION PIXELS | 2 |
| EQUAL TO OR LARGER THAN 7.5 MILLION PIXELS AND LESS THAN 10 MILLION PIXELS | 3 |
| EQUAL TO OR LARGER THAN 10 MILLION PIXELS AND LESS THAN 12.5 MILLION PIXELS | 4 |
| ... | |

155_2 — ITEM-SPECIFIC PERFORMANCE EVALUATION VALUE TABLE (IMAGING ELEMENT SIZE)

| IMAGING ELEMENT SIZE | ITEM-SPECIFIC PERFORMANCE EVALUATION VALUE |
|---|---|
| 6.2 mm × 4.6 mm | 1 |
| 13.2 mm × 8.8 mm | 2 |
| 17.3 mm × 13.0 mm | 4 |
| 23.6 mm × 15.8 mm | 8 |
| 36.0 mm × 24.0 mm | 10 |
| ... | |

155_4 — ITEM-SPECIFIC PERFORMANCE EVALUATION VALUE TABLE (MAXIMUM ISO SENSITIVITY)

| MAXIMUM ISO SENSITIVITY | ITEM-SPECIFIC PERFORMANCE EVALUATION VALUE |
|---|---|
| LESS THAN 800 | 1 |
| EQUAL TO OR LARGER THAN 800 AND LESS THAN 3200 | 2 |
| EQUAL TO OR LARGER THAN 3200 AND LESS THAN 6400 | 3 |
| EQUAL TO OR LARGER THAN 6400 AND LESS THAN 12800 | 4 |
| ... | |

145F — FIRST BODY INFORMATION

| | |
|---|---|
| MANUFACTURER NAME | FD1 |
| MODEL NAME | FD1a |
| THE NUMBER OF PIXELS | 12 MILLION PIXELS |
| IMAGING ELEMENT SIZE | 13.2 mm × 8.8 mm |
| RESOLUTION | 500 dpi × 500 dpi |
| MAXIMUM ISO SENSITIVITY | 6400 |
| FASTEST AF TIME | 0.15 SECONDS |
| RELEASE TIME LAG | 0.09 SECONDS |
| FASTEST CONTINUOUS IMAGING SPEED | 8 FRAME/SECOND |
| THE NUMBER OF IMAGING MODES | 8 |
| ACTIVATION TIME | 0.8 SECONDS |
| RELEASE DATE | 09/28/2019 |
| ... | |

146

147 — ITEM-SPECIFIC PERFORMANCE EVALUATION VALUE

| |
|---|
| C1 = 4 |
| C2 = 2 |
| C3 = 4 |
| C4 = 4 |
| C5 = 5 |
| C6 = 2 |
| C7 = 3 |
| C8 = 4 |
| C9 = 4 |
| C10 = 10 |
| ... |

×

148 — COEFFICIENT FOR BODY

| |
|---|
| KC1 = 1 |
| KC2 = 1 |
| KC3 = 1 |
| KC4 = 1 |
| KC5 = 1 |
| KC6 = 1 |
| KC7 = 1 |
| KC8 = 1 |
| KC9 = 1 |
| KC10 = 1 |
| ... |

FIG. 35A
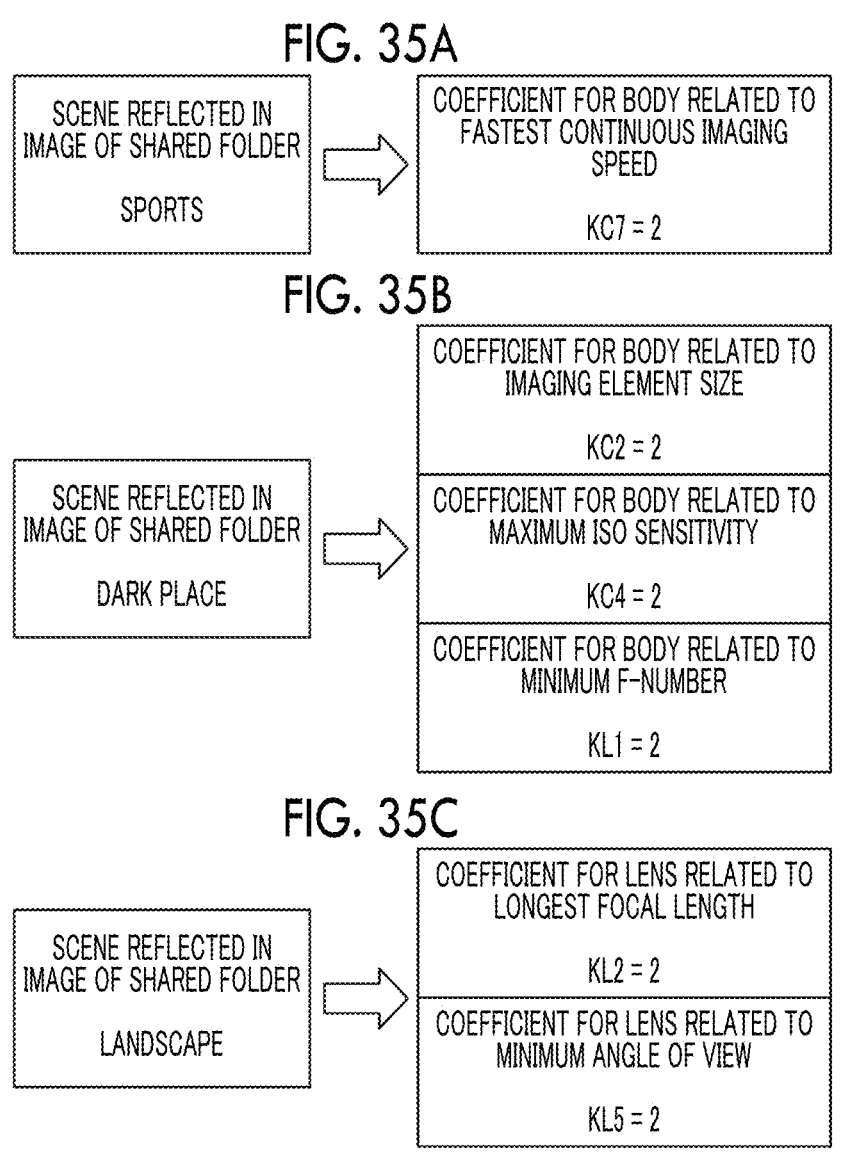
FIG. 35B
FIG. 35C
FIG. 36
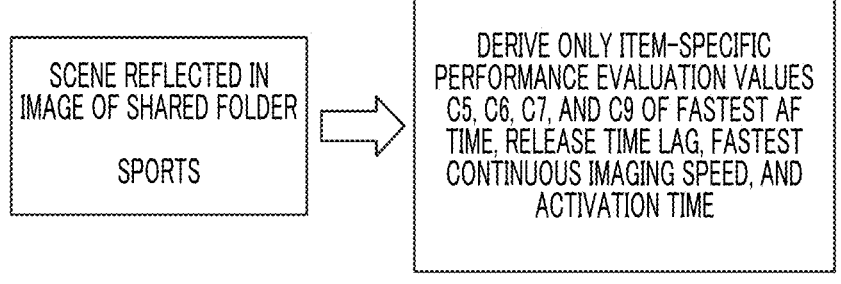

PERSONAL FOLDER [U20] 25

38S_A
27S
28S
SECOND APPARATUS INFORMATION
→ APPARATUS-SPECIFIC SECOND PERFORMANCE EVALUATION VALUE: 200

38S_B
27S
28S
SECOND APPARATUS INFORMATION
→ APPARATUS-SPECIFIC SECOND PERFORMANCE EVALUATION VALUE: 260

38S_C
27S
28S
SECOND APPARATUS INFORMATION
→ APPARATUS-SPECIFIC SECOND PERFORMANCE EVALUATION VALUE: 110

38S_D
27S
28S
SECOND APPARATUS INFORMATION

SHARED FOLDER [SOCCER 1] 26SP

USER ID: U20
38S_A
27SH
28SH
SECOND APPARATUS INFORMATION
→ APPARATUS-SPECIFIC SECOND PERFORMANCE EVALUATION VALUE: 230

...

$$\text{SECOND PERFORMANCE EVALUATION VALUE}: \frac{230 + 200 + 260 + 110}{4} = 200$$

FIG. 39

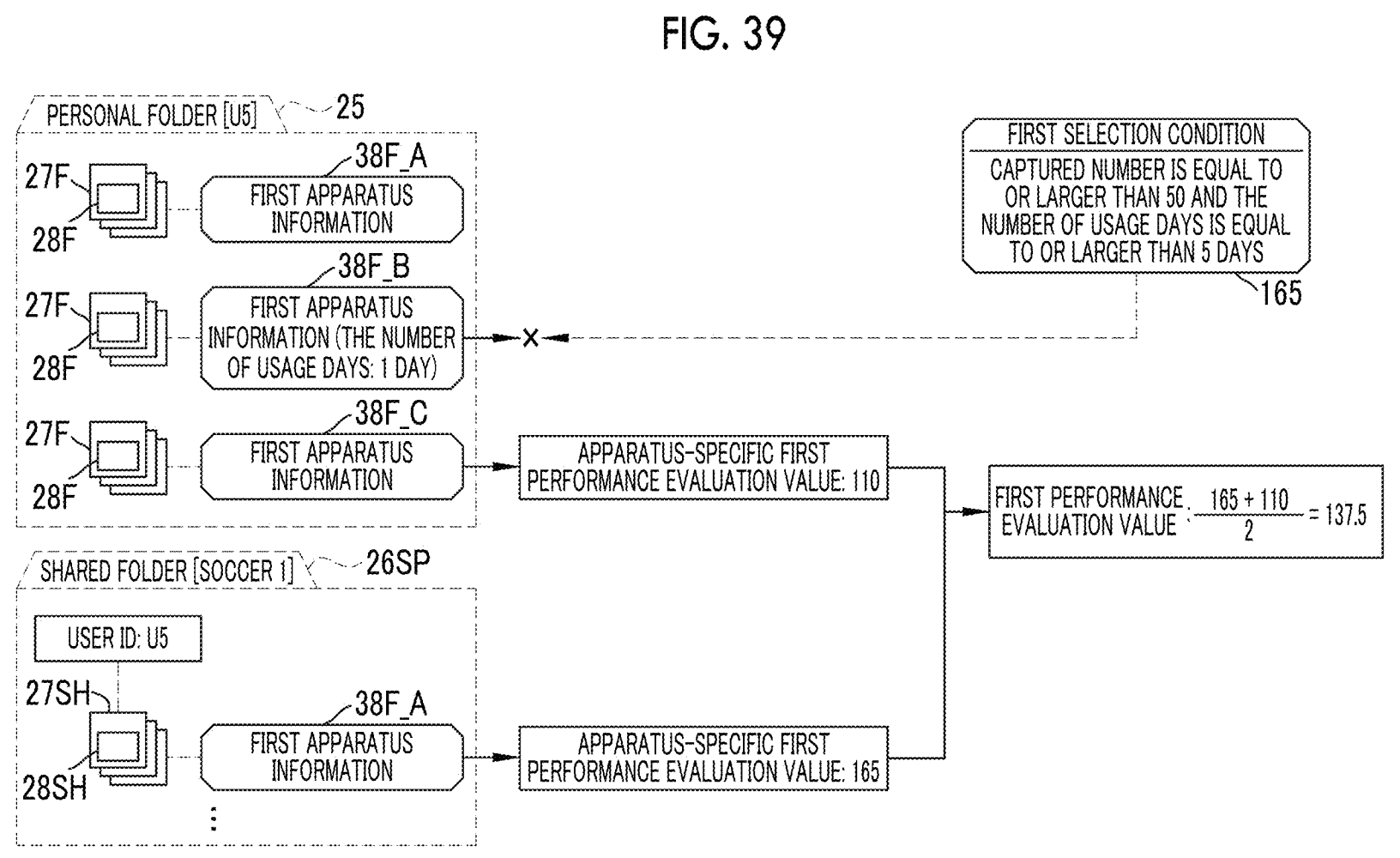

FIRST SELECTION CONDITION

CAPTURED NUMBER IS EQUAL TO OR LARGER THAN 50 AND THE NUMBER OF USAGE DAYS IS EQUAL TO OR LARGER THAN 5 DAYS

165

FIRST PERFORMANCE EVALUATION VALUE $$\frac{165 + 110}{2} = 137.5$$

APPARATUS-SPECIFIC FIRST PERFORMANCE EVALUATION VALUE: 110

APPARATUS-SPECIFIC FIRST PERFORMANCE EVALUATION VALUE: 165

PERSONAL FOLDER [U5]    25

38F_A
FIRST APPARATUS INFORMATION
27F    28F

38F_B
FIRST APPARATUS INFORMATION (THE NUMBER OF USAGE DAYS: 1 DAY)
27F    28F

38F_C
FIRST APPARATUS INFORMATION
27F    28F

X

SHARED FOLDER [SOCCER 1]    26SP

USER ID: U5

38F_A
FIRST APPARATUS INFORMATION
27SH    28SH

Figure 43:
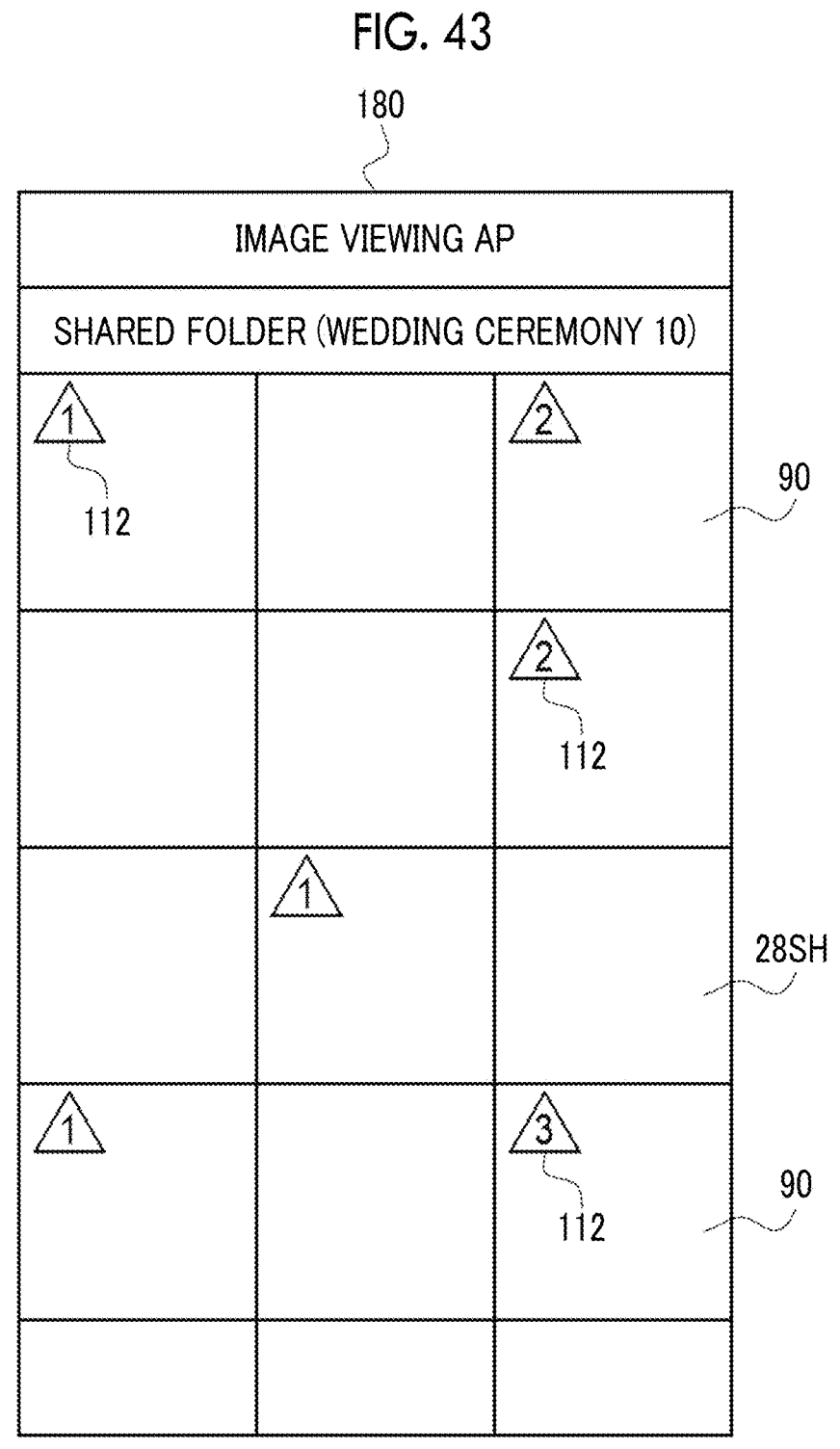

| IMAGE VIEWING AP | | |
|---|---|---|
| SHARED FOLDER (WEDDING CEREMONY 10) | | |
| △1 112 | | △2 90 |
| | | △2 112 |
| | △1 | 28SH |
| △1 | | △3 112 90 |
| | | |

IMAGE PROCESSING DEVICE, OPERATION METHOD OF IMAGE PROCESSING DEVICE, AND OPERATION PROGRAM OF IMAGE PROCESSING DEVICE

CROSS-REFERENCE TO RELATED APPLICATIONS

This application is a Continuation of U.S. patent application Ser. No. 17/822,694 filed on Aug. 26, 2022, which is a Continuation of International Application No. PCT/JP2020/047534 filed on Dec. 18, 2020, the disclosure of which is incorporated herein by reference in its entirety. Further, this application claims priority from Japanese Patent Application No. 2020-064618 filed on Mar. 31, 2020, the disclosure of which is incorporated herein by reference in its entirety.

BACKGROUND

1. Technical Field

The technology of the present disclosure relates to an image processing device, an operation method of an image processing device, and an operation program of an image processing device.

2. Description of the Related Art

Recently, a service for sharing captured images has been provided within a user group consisting of a plurality of users who participate in a common event, such as a sports day, a party, a wedding ceremony, a presentation, a concert, or a sports match. Specifically, it is a service in which each user transmits an image to an image distribution server on a network, grants access authority to the user group, and permits viewing of the transmitted image, photographic print, and the like.

In such an image sharing service, there is a demand for presenting an image desired by the user from a large number of images transmitted by the plurality of users without bothering the user. In response to such a demand, for example, JP2014-182651A discloses the following technologies.

That is, in the technology disclosed in JP2014-182651A, a period in the event regarded as important by the user (hereinafter, referred to as "important period") is specified based on operation information of an imaging apparatus that captures the image. Moreover, an image captured by another user in the important period is presented as a recommended image. Examples of the important period include a period in which the user frequently performs a shutter operation, and a period in which the user frequently performs the shutter operation, but the image is not transmitted to the image distribution server due to an imaging failure or the like.

SUMMARY

According to the technology disclosed in JP2014-182651A, it is possible for the user to obtain the recommended image that the user may desire among the images captured by other users without any trouble. However, there is a possibility that an image with poor image quality than an image with enough quality which is captured by the imaging apparatus of the user is included in the recommended images presented to the user, and the recommended images are not always the desirable images. Therefore, a technology of preferentially presenting an image which is more desirable than an image of a user has been sought.

The technology of the present disclosure provides an image processing device, an operation method of an image processing device, and an operation program of an image processing device capable of preferentially presenting the image which is more desirable than the image of the user.

In order to achieve the object described above, the present disclosure relates to an image processing device comprising at least one processor, in which the processor acquires a first performance evaluation value related to performance of a first imaging apparatus of a first user who is one of a plurality of users, acquires a second performance evaluation value related to performance of a second imaging apparatus of a second user different from the first user among the plurality of users, specifies an image of the second user corresponding to the second imaging apparatus having the second performance evaluation value, which is equal to or larger than the first performance evaluation value, from shared images which are limitedly shared by the plurality of users, and sets a presentation priority of a specific image, which is the specified image, to the first user to be higher than presentation priorities of other shared images.

The present disclosure relates to an operation method of an image processing device, the method comprising, via a processor, a first acquisition step of acquiring a first performance evaluation value related to performance of a first imaging apparatus of a first user who is one of a plurality of users, a second acquisition step of acquiring a second performance evaluation value related to performance of a second imaging apparatus of a second user different from the first user among the plurality of users, a specifying step of specifying an image of the second user corresponding to the second imaging apparatus having the second performance evaluation value, which is equal to or larger than the first performance evaluation value, from shared images which are limitedly shared by the plurality of users, and a setting step of setting a presentation priority of a specific image, which is the specified image, to the first user to be higher than presentation priorities of other shared images.

The present disclosure relates to an operation program of an image processing device, the program causing a processor to function as a first acquisition unit that acquires a first performance evaluation value related to performance of a first imaging apparatus of a first user who is one of a plurality of users, a second acquisition unit that acquires a second performance evaluation value related to performance of a second imaging apparatus of a second user different from the first user among the plurality of users, a specifying unit that specifies an image of the second user corresponding to the second imaging apparatus having the second performance evaluation value, which is equal to or larger than the first performance evaluation value, from shared images which are limitedly shared by the plurality of users, and a setting unit that sets a presentation priority of a specific image, which is the specified image, to the first user to be higher than presentation priorities of other shared images.

BRIEF DESCRIPTION OF THE DRAWINGS

Exemplary embodiments according to the technique of the present disclosure will be described in detail based on the following figures, wherein:

FIG. 4 is a diagram showing an image file;

FIG. 5 is a diagram showing image basic information;

FIG. 6 is a diagram showing an imaging condition;

FIG. 15 is an explanatory diagram of a specifying process executed by a specifying unit;

FIG. 16 is an explanatory diagram of a setting process executed by a setting unit;

FIG. 18 is a diagram showing a content of recommended image information;

FIG. 19 is a block diagram showing a processing unit of a CPU of the user terminal;

FIG. 24 is a flowchart showing a process procedure of the image distribution server;

FIG. 25 is a flowchart showing the process procedure of the image distribution server;

FIG. 33 is a diagram showing a state of calculating a total sum of products of an item-specific performance evaluation value and a coefficient for the body from first body information;

FIGS. 35A to 35C are diagrams showing an aspect in which the coefficient for the body and the coefficient for the lens are changed in accordance with a scene corresponding to the image of the shared folder, FIG. 35A shows a case in which the scene is sports, FIG. 35B shows a case in which the scene is a dark place, and FIG. 35C shows a case in which the scene is a landscape;

FIG. 36 is a diagram showing an aspect in which evaluation items are changed in accordance with the scene corresponding to the image in the shared folder;

FIG. 37 is a diagram showing an aspect in which a first performance evaluation value is derived based on the first apparatus information of a first imaging apparatus associated with the image stored in a personal folder of a first user;

FIG. 38 is a diagram showing an aspect in which a second performance evaluation value is derived based on the second apparatus information of a second imaging apparatus associated with the image stored in a personal folder of a second user;

FIG. 39 is a diagram showing an aspect in which a first type of the first imaging apparatus that satisfies a predetermined first selection condition is selected from a plurality of types of the first imaging apparatuses;

FIG. 42 is a diagram showing a state of setting the presentation priority also in consideration of a first imaging skill evaluation value related to an imaging skill of the first user and a second imaging skill evaluation value related to an imaging skill of the second user; and FIG. 43 is a diagram showing an example of adding a mark representing that it is the recommended image and the presentation priority to the specific image.

DETAILED DESCRIPTION

First Embodiment

Figure 1:
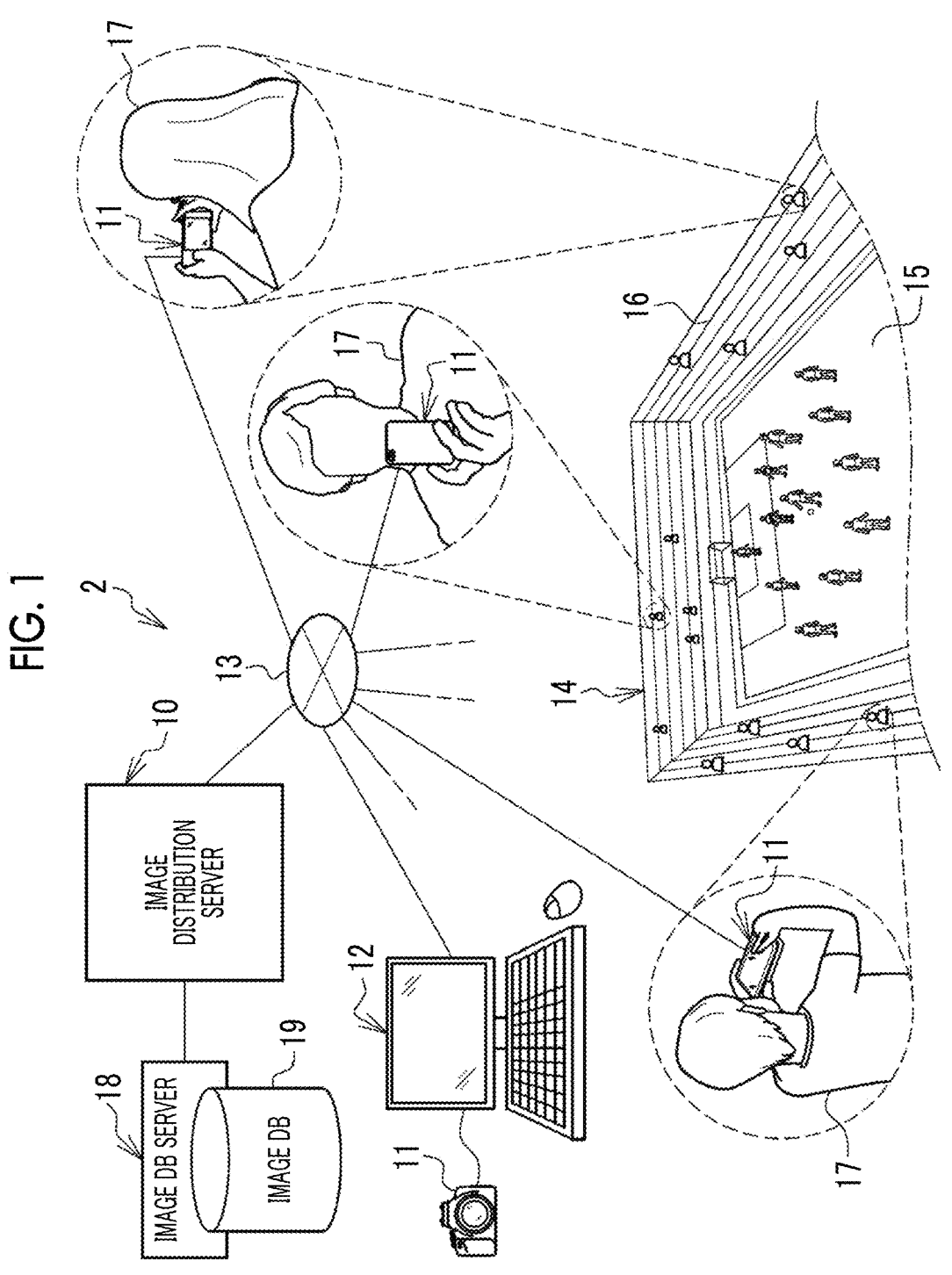
FIG. 1 is a diagram showing an image distribution server and various devices connected to the image distribution server.

In FIG. 1, an imaging apparatus 11 and a user terminal 12 are connected to an image distribution server 10. The image distribution server 10, the imaging apparatus 11, and the user terminal 12 are connected to each other to be able to communicate with each other via a network 13. The network 13 is a wide area network (WAN) of, for example, the Internet or a public communication network.

The imaging apparatus 11 is owned by, for example, each of a plurality of users 17 who watch a soccer match played in a soccer field 15 of a stadium 14 in a spectator seat 16. The user 17 uses the imaging apparatus 11 to image a state of the soccer match. Moreover, an image file 27 (see FIG. 2) including an image 28 (see FIG. 2) obtained by the imaging is transmitted to the image distribution server 10 via the network 13. Some of the imaging apparatuses 11 directly transmit the image file 27 to the image distribution server 10, while others transmit the image file 27 from the user terminal 12 by taking the image file 27 in the user terminal 12.

The user terminal 12 is a terminal associated with each user 17. The user terminal 12 is, for example, a terminal owned or used by the user 17. The user terminal 12 has a function of receiving the image file 27 from the image distribution server 10 and a function of reproducing and displaying the image 28 included in the received image file 27, in addition to a function of transmitting the image file 27 taken from the imaging apparatus 11 to the image distribution server 10. The user terminal 12 is, for example, a personal computer, a smartphone, or a tablet terminal.

Some of the imaging apparatuses 11 have following functions in addition to a function of capturing the image 28 and a function of transmitting the image file 27. That is, similar to the user terminal 12, the imaging apparatuses 11 has a function of receiving the image file 27 from the image distribution server 10 and a function of reproducing and displaying the image 28 included in the received image file 27. In a word, some of the imaging apparatuses 11 also function as the user terminal 12. The notation "user terminal 12" in the following description includes the imaging apparatus 11 that also functions as the user terminal 12 described above. The imaging apparatus 11 is a compact digital camera, a digital single-lens reflex camera, a smartphone, a tablet terminal, or the like.

The image distribution server 10 is, for example, a server computer or a workstation, and is an example of an "image processing device" according to the technology of the present disclosure. The image distribution server 10 receives the image file 27 from the imaging apparatus 11 and the user terminal 12 via the network 13. In addition, the image distribution server 10 distributes the image file 27 to the user terminal 12 via the network 13.

The image distribution server 10 is connected to an image database (hereinafter, abbreviated as DB) server 18 via a network, such as a local area network (LAN). The image distribution server 10 transmits the image file 27 from the imaging apparatus 11 or the like to the image DB server 18. The image DB server 18 includes an image DB 19. The image DB server 18 accumulates the image file 27 from the image distribution server 10 in the image DB 19, and manages the accumulated image file 27. In addition, the image DB server 18 transmits the image file 27 accumulated in the image DB 19 to the image distribution server 10 in response to a request from the image distribution server 10. It should be noted that, in the present embodiment, the network 13, which connects the image distribution server 10, the imaging apparatus 11, and the user terminal 12 to each other, is the WAN, and the network, which connects the image distribution server 10 and the image DB server 18 to each other, is the LAN, but the present disclosure is not limited to this. These networks need only be at least one of the WAN or the LAN, and the connection method may be a wired method or a wireless method. In addition, the image distribution server 10 and the image DB server 18 may be directly connected by a wired cable or the like.

Figure 2:
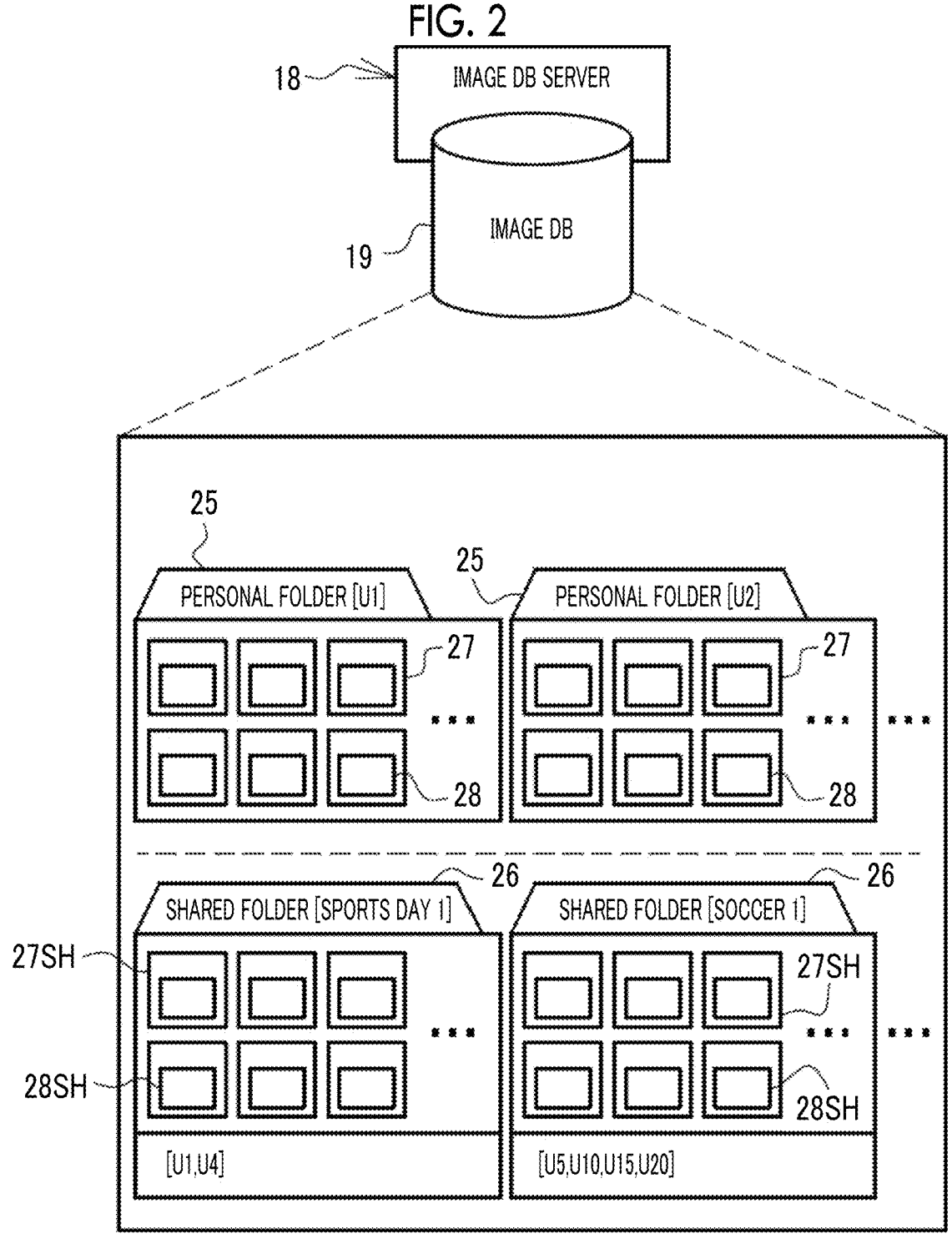
FIG. 2 is a diagram showing an inside of an image DB.

As shown in FIG. 2, in the image DB 19, a personal folder 25 and a shared folder 26 are provided. The personal folder 25 is a folder peculiar to one user 17, which is addressed to each user 17 one by one. Therefore, the personal folders 25 are provided for the number of users 17. The image file 27 transmitted from the imaging apparatus 11 or the like of each user 17 is stored in the personal folder 25. The image file 27 includes the image 28. Therefore, the image 28 associated with each user 17 is stored in the personal folder 25. Here, the "image associated with the user" includes, for example, an image associated with a user identification data (ID). In addition, the "image associated with the user" is, for example, the image 28 associated with the user ID or a terminal ID by the user 17 accessing the image distribution server 10 and uploading the image by the user ID or the terminal ID. The "image associated with the user" includes the image 28 captured by the user 17 with the imaging apparatus 11 as well as the image 28 read by the user 17 with a scanner. In addition, the "image associated with the user" includes the image 28 received by the user 17 from another user 17, such as a friend or a family member, the image 28 downloaded by the user 17 on the Internet site, and the like.

[U1] behind the "personal folder" is the user ID for identifying each user 17, which is common in the image distribution server 10. The "personal folder [U1]" means the personal folder 25 of the user 17 of which the user ID is [U1].

Figure 3:
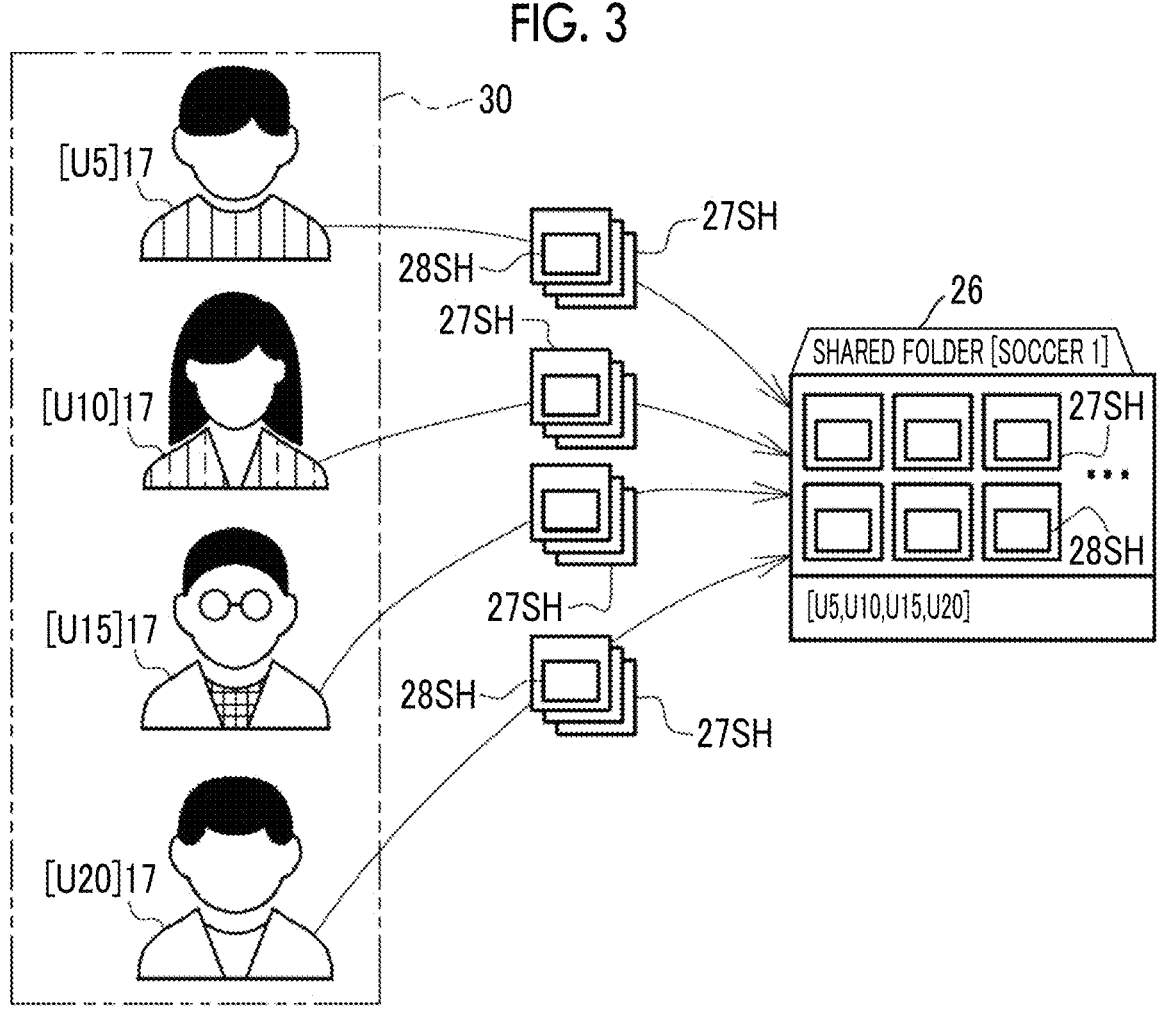
FIG. 3 is a diagram for describing the formation of a shared folder.

As shown in FIG. 3, unlike the personal folder 25, the shared folder 26 is a folder shared by a user group 30 composed of the plurality of users 17. Therefore, in the shared folder 26, the user IDs of the plurality of users 17 who share the shared folder 26 are registered. In the shared folder 26, access authority is granted only to the user 17 of which the user ID is registered. In the shared folder 26, the image files 27 of the images 28 captured in the event by the plurality of users 17 who participate in the common event are stored. Examples of the event include a sports day, a party, a wedding ceremony, a presentation, and a concert, in addition to the soccer match shown in FIG. 1. It should be noted that, in the following description, the image file 27 stored in the shared folder 26 is referred to as an image file 27SH, and the image 28 included in the image file 27SH is referred to as an image 28SH. The image 28SH is an example of a "shared image" according to the technology of the present disclosure. It should be noted that the image 28 included in the shared folder 26 is not limited to the image 28 specified by the event as long as the images 28 acquired from the plurality of accessible users 17 is included.

FIG. 3 shows a state in which four users 17 having the user IDs [U5], [U10], [U15], and [U20] who participate in the soccer match shown in FIG. 1 as spectators store the image files 27SH of the images 28SH captured by himself/herself in the shared folder 26 named "shared folder [soccer 1]". The shared folder 26 is created by, for example, one user 17 among the plurality of users 17 constituting the user group 30. The shared folder 26 may be created by an event organizer. It should be noted that, FIG. 3 is drawn such that three image files 27SH stored in the shared folder 26 by each user 17 are overlapped, but it does not mean that each user 17 stores three image files 27SH. FIG. 3 represents that each user 17 stores several image files 27SH, whether it is one or a plurality of images. Also in the following figures, three image files 27SH drawn to be overlapped do not strictly represent that the number of the image files 27SH is three.

As shown in FIG. 4, the image file 27 includes the image 28, the user ID, and image information 35. The image information 35 includes image basic information 36 (see FIG. 5), an imaging condition 37 (see FIG. 6), and apparatus information 38. As described above, the image basic information 36, the imaging condition 37, and the apparatus information 38 are associated with each image 28. The apparatus information 38 is information related to the imaging apparatus 11 that captures the image 28, and has body information 39 (see FIG. 7) and lens information 40 (see FIG. 8). The body information 39 is information related to a body of the imaging apparatus 11. The lens information 40 is information related to a lens built in or mounted on the body of the imaging apparatus 11.

In FIG. 5, the image basic information 36 includes items, such as an image ID for identifying each image 28, an imaging date and time of the image 28, an imaging location, and a tag. In the item of the imaging location, the latitude and longitude detected by a global positioning system (GPS) function of the imaging apparatus 11 is recorded. In the item of the tag, a word that simply represents a subject of the image 28 is recorded. The tag is manually input by the user 17 and/or obtained by analysis of the image 28.

In FIG. 6, the imaging condition 37 includes items, such as an exposure time when the image 28 is captured, international organization for standardization (ISO) sensitivity, a shutter speed, an F-number, a subject distance, a focal length, and an imaging mode setting. In addition to a shown night view mode, an imaging mode includes a sports mode suitable for imaging a moving subject, a portrait mode suitable for imaging a stationary person, a landscape mode suitable for imaging a landscape, and the like. The type of the imaging mode that can be set differs for each imaging apparatus 11. It should be noted that, in addition to these items, the imaging condition 37 has various items, such as a brightness value, a focus method, a white balance setting, and the presence or absence of a flash.

Figures 7, 8, 9:
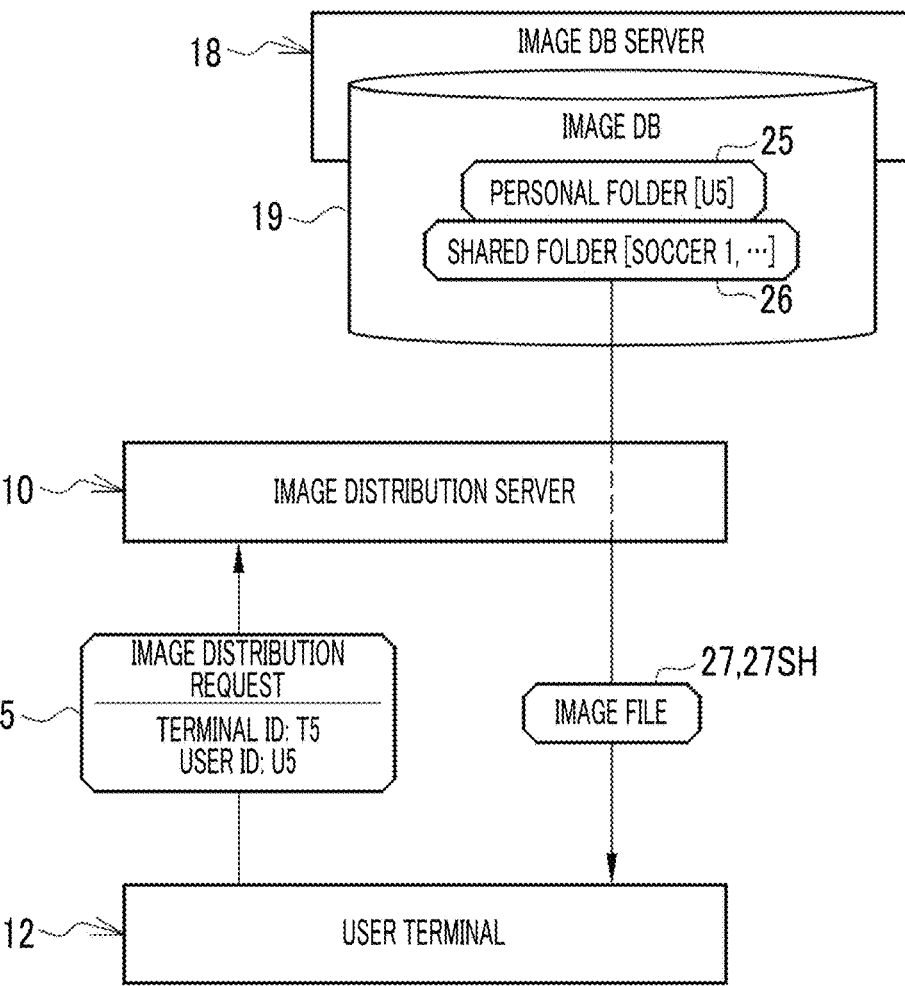
FIG. 7 is a diagram showing body information.
FIG. 8 is a diagram showing lens information.
FIG. 9 is a diagram showing information transmitted and received between the image distribution server and a user terminal.

In FIG. 7, the body information 39 has items, such as a manufacturer name, a model name, and a resolution of the body of the imaging apparatus 11. In the item of the resolution, horizontal and vertical dots per inch (dpi) of the pixels of an imaging element mounted on the body of the imaging apparatus 11 are recorded.

In FIG. 8, the lens information 40 has items, such as a manufacturer name, a model name, a minimum F-number, a focal length, and an angle of view of a lens built in or mounted on the body of the imaging apparatus 11. The shortest focal length and the longest focal length are registered in the item of the focal length. The maximum angle of view and the minimum angle of view are registered in the item of the angle of view. It should be noted that the image basic information 36, the imaging condition 37, the body information 39, and the lens information 40 are not limited to these information, and may include at least a part of the items described above.

In FIG. 9, the user terminal 12 transmits an image distribution request 45 to the image distribution server 10. The image distribution request 45 includes the terminal ID of the user terminal 12, and the user ID of the user 17 corresponding to the user terminal 12. In response to the image distribution request 45, the image distribution server 10 distributes the image file 27 in the personal folder 25 designated by the user ID to the user terminal 12, which is a transmission source of the image distribution request 45 designated by the terminal ID. In addition, in a case in which there is the shared folder 26 designated by the user ID, the image distribution server 10 distributes the image file 27SH in the shared folder 26 to the user terminal 12, which is the transmission source of the image distribution request 45 designated by the terminal ID, together with the image file 27 in the personal folder 25. FIG. 9 shows a case in which the user 17 of the user ID [U5] shown in FIG. 3 transmits the image distribution request 45 from his/her user terminal 12 of the terminal ID [T5] to the image distribution server 10.

It should be noted that the terminal ID is information for distributing the image file 27 from the image distribution server 10 to the user terminal 12 that transmits the image distribution request 45. The terminal ID is not limited to a media access control (MAC) address, but may be an internet protocol (IP) address or a port number. The user 17 corresponding to the user terminal 12 may be paraphrased as the user 17 who owns the user terminal 12 or the user 17 who uses the user terminal 12. In addition, the image distribution server 10 may execute a user authentication process of authenticating the user by the user ID or a passcode, and may associate various requests or the image 28 from the user authentication to the release of the user authentication with the authenticated user 17.

Figure 10:
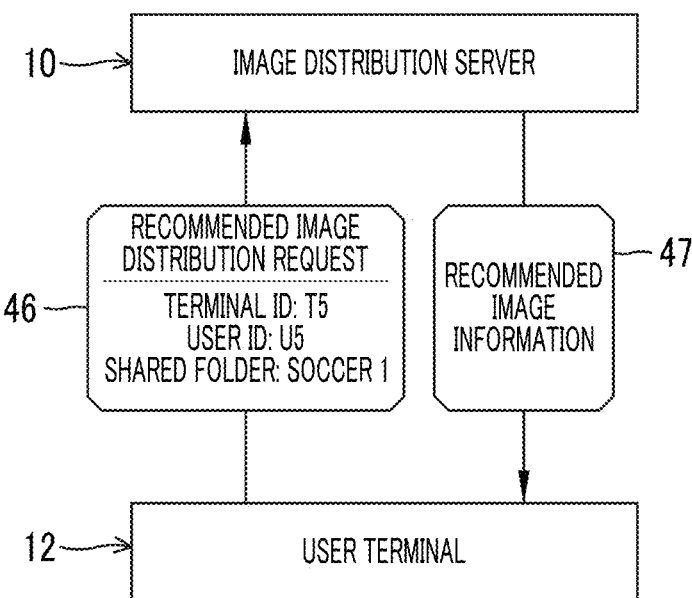
FIG. 10 is a diagram showing the information transmitted and received between the image distribution server and the user terminal.

In FIG. 10, the user terminal 12 transmits a recommended image distribution request 46 to the image distribution server 10. The recommended image distribution request 46 includes the terminal ID of the user terminal 12, the user ID of the user 17 corresponding to the user terminal 12, and a name of the shared folder 26 requesting a recommended image. The recommended image distribution request 46 is a request for the user 17 corresponding to the user terminal 12 of a transmission source of the recommended image distribution request 46 to present the recommended image, which is recommended to himself/herself among the images 28SH in the shared folder 26 designated by the name, to the image distribution server 10. The image distribution server 10 distributes recommended image information 47 to the user terminal 12 of the transmission source of the recommended image distribution request 46 designated by the terminal ID in response to the recommended image distribution request 46. As in the case of FIG. 9, FIG. 10 shows a case in which the user 17 of the user ID [U5] transmits the recommended image distribution request 46 for the shared folder 26 named "shared folder [soccer 1]" to the image distribution server 10 from his/her user terminal 12 of the terminal ID [T5]. It should be noted that the recommended image distribution request 46 includes information for designating the shared folder 26 that can be accessed by the user 17. In addition, the recommended image information 47 includes the image 28 of another user 17 having the apparatus information 38 having the performance equal to or larger than the apparatus information 38 of the user 17 who makes the recommended image distribution request 46 in the shared folder 26 designated by the recommended image distribution request 46. It should be noted that the terminal ID is information for distributing the recommended image information 47 from the image distribution server 10 to the user terminal 12 that transmits the recommended image distribution request 46. The terminal ID is not limited to the MAC address, but may be the IP address or the port number.

Here, among the plurality of users 17 constituting the user group 30, the user 17 corresponding to the user terminal 12 which is the transmission source of the recommended image distribution request 46 that requests the recommended image, which is recommended to himself/herself (in the present example, the user 17 of the user ID [U5]) is an example of a "first user" according to the technology of the present disclosure. In addition, among the plurality of users 17 constituting the user group 30, the user 17 other than the user 17 corresponding to the user terminal 12 which is the transmission source of the recommended image distribution request 46 (in the present example, the users 17 of the user IDs [U10], [U15], and [U20]) is an example of a "second user different from the first user" according to the technology of the present disclosure. Hereinafter, the first user is assigned by reference numeral 17F (see FIG. 17), and the second user is assigned by reference numeral 17S (see FIG. 17), respectively, for distinction. In addition, the imaging apparatus 11 corresponding to a first user 17F is referred to as a first imaging apparatus 11F (see FIG. 17), and the imaging apparatus 11 corresponding to a second user 17S is referred to as a second imaging apparatus 11S (see FIG. 17). The apparatus information 38 of the first imaging apparatus 11F is referred to as first apparatus information 38F (see FIG. 14), and the apparatus information 38 of the second imaging apparatus 11S is referred to as second apparatus information 38S (see FIG. 14). In addition, the body information 39 of the first apparatus information 38F and the lens information 40 are referred to as first body information 39F (see FIG. 14) and first lens information 40F (see FIG. 14), and the body information 39 of the second apparatus information 38S and the lens information 40 are referred to as second body information 39S (see FIG. 14) and second lens information 40S (see FIG. 14).

Figure 11:
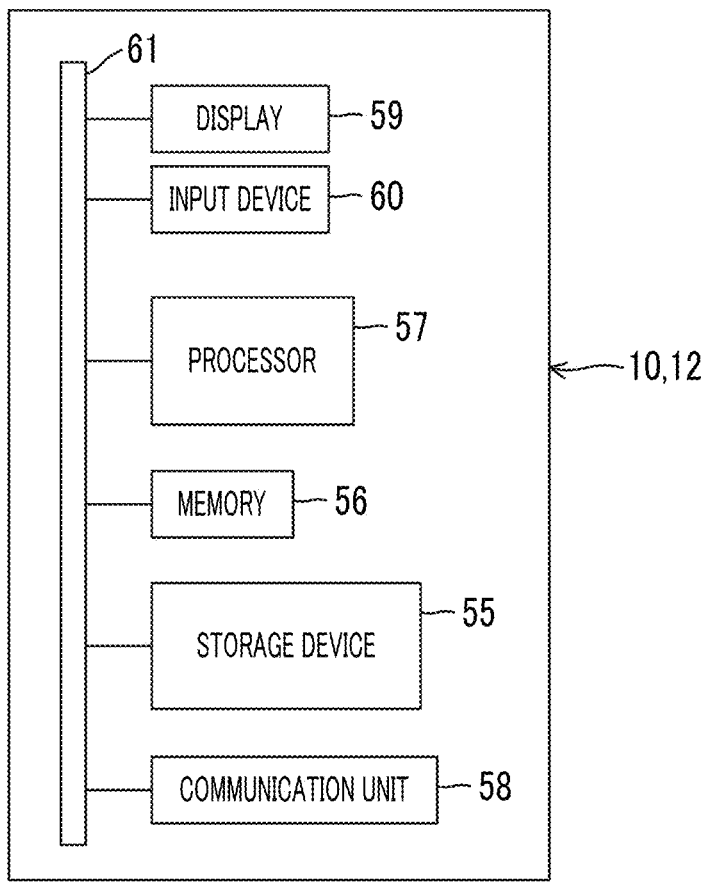
FIG. 11 is a block diagram showing computers constituting the image distribution server and the user terminal.

In FIG. 11, the computers constituting the image distribution server 10 and the user terminal 12 have basically the same configuration, and comprise a storage device 55, a memory 56, a processor 57, a communication unit 58, a display 59, and an input device 60. The components are connected to each other via a bus line 61.

The storage device 55 is a hard disk drive built in or connected to the computers constituting the image distribution server 10 and the user terminal 12 via the cable and the network. Alternatively, the storage device 55 is a disk array in which a plurality of hard disk drives are coaxially mounted. The storage device 55 stores a control program, such as an operating system, various application programs (hereinafter, abbreviated as AP), various data associated with these programs, and the like. It should be noted that a solid state drive may be used instead of the hard disk drive.

The memory 56 is a work memory on which the processor 57 executes a process. The processor 57 comprehensively controls the units of the computer by loading the program stored in the storage device 55 into the memory 56 and executing the process in accordance with the program. The processor 57 is, for example, a central processing unit (CPU).

The communication unit 58 is a network interface which performs a control of transmitting various information via the network 13 and the like. The display 59 displays various screens. Various screens have an operation function by a graphical user interface (GUI). The computers constituting the image distribution server 10 and the user terminal 12 receive the input of an operation instruction from the input device 60 via various screens. The input device 60 is a keyboard, a mouse, a touch panel, or the like.

It should be noted that, in the following description, a subscript "A" is assigned to reference numeral of each unit of the computer constituting the image distribution server 10 and a subscript "B" is assigned to reference numeral of each unit of the computer constituting the user terminal 12, respectively, for distinction.

Figure 12:
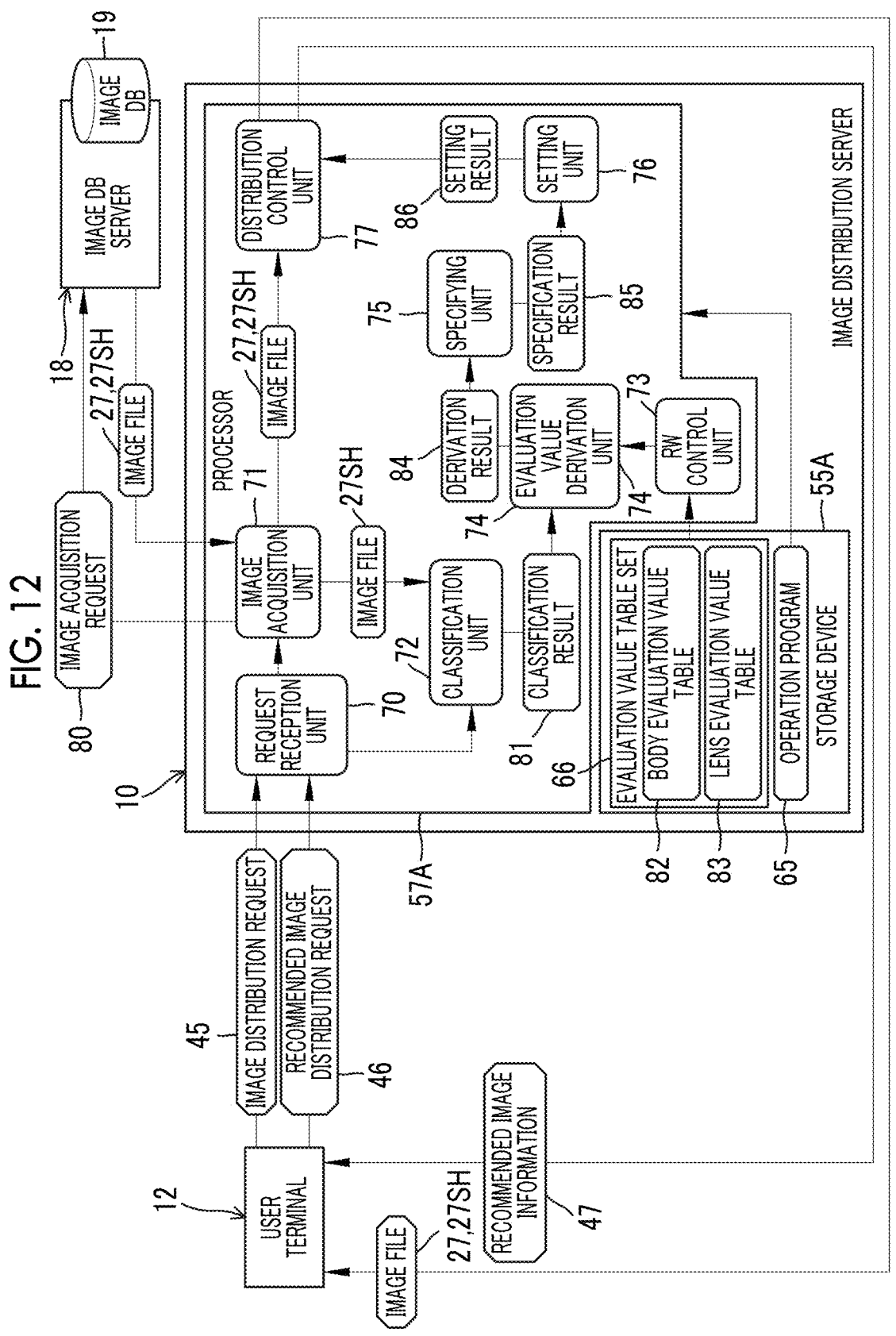
FIG. 12 is a block diagram showing a processing unit of a CPU of the image distribution server.

In FIG. 12, an operation program 65 is stored in a storage device 55A of the image distribution server 10. The operation program 65 is an AP for causing the computer constituting the image distribution server 10 function as an "image processing device" according to the technology of the present disclosure. That is, the operation program 65 is an example of an "operation program of an image processing device" according to the technology of the present disclosure. In addition to the operation program 65, the storage device 55A also stores an evaluation value table set 66.

In a case in which the operation program 65 is activated, a processor 57A of the image distribution server 10 cooperates with the memory 56 and the like to function as a request reception unit 70, an image acquisition unit 71, a classification unit 72, and a read write (hereinafter, abbreviated as RW) control unit 73, an evaluation value derivation unit 74, a specifying unit 75, a setting unit 76, and a distribution control unit 77.

The request reception unit 70 receives various requests from the user terminal 12. For example, the request reception unit 70 receives the image distribution request 45. The request reception unit 70 outputs the image distribution request 45 to the image acquisition unit 71. In addition, the request reception unit 70 receives the recommended image distribution request 46. The request reception unit 70 outputs the recommended image distribution request 46 to the classification unit 72.

In a case in which the image distribution request 45 is input from the request reception unit 70, the image acquisition unit 71 transmits an image acquisition request 80 to the image DB server 18. The image acquisition request 80 is a copy of the image distribution request 45, and requests the acquisition of the image file 27 in the personal folder 25 designated by the user ID of the image distribution request 45 and the image file 27SH in the shared folder 26.

The image DB server 18 reads out the image file 27 in the personal folder 25 and the image file 27SH in the shared folder 26 in response to the image acquisition request 80 from the image DB 19, and transmits the read out image file 27 and the read out image file 27SH in the image distribution server 10. The image acquisition unit 71 acquires the image file 27 and the image file 27SH transmitted from the image DB server 18 in response to the image acquisition request 80. The image acquisition unit 71 outputs the acquired image file 27 and the image file 27SH to the distribution control unit 77. In addition, the image acquisition unit 71 outputs the acquired image file 27SH to the classification unit 72. It should be noted that, in a case in which there is no shared folder 26 designated by the user ID of the image distribution request 45, only the image file 27 in the personal folder 25 is acquired by the image acquisition unit 71.

In a case in which the recommended image distribution request 46 is input from the request reception unit 70, the classification unit 72 classifies the apparatus information 38 included in the image file 27SH in the shared folder 26 designated by the recommended image distribution request 46 (hereinafter, referred to as recommendation designated shared folder 26SP, see FIG. 13) into the first apparatus information 38F and the second apparatus information 38S. The classification unit 72 outputs a classification result 81 to the evaluation value derivation unit 74.

The RW control unit 73 controls the storage of various information in the storage device 55A and the reading out of various information in the storage device 55A. For example, the RW control unit 73 reads out the evaluation value table set 66 from the storage device 55A, and outputs the read out evaluation value table set 66 to the evaluation value derivation unit 74. The evaluation value table set 66 includes a body evaluation value table 82 and a lens evaluation value table 83.

The evaluation value derivation unit 74 derives a performance evaluation value related to the performance of the imaging apparatus 11 based on the apparatus information 38 included in the image file 27SH in the recommendation designated shared folder 26SP, the classification result 81 from the classification unit 72, and the evaluation value table set 66 from the RW control unit 73. The evaluation value derivation unit 74 outputs a derivation result 84 of the performance evaluation value to the specifying unit 75. It should be noted that, in the following, the performance evaluation value of the first imaging apparatus 11F is referred to as a first performance evaluation value, and the performance evaluation value of the second imaging apparatus 11S is referred to as a second performance evaluation value.

Based on the derivation result 84 from the evaluation value derivation unit 74, the specifying unit 75 specifies the second apparatus information 38S of the second imaging apparatus 11S having the second performance evaluation value equal to or larger than the first performance evaluation value (hereinafter, referred to as high performance second apparatus information 38SS, see FIG. 15). Since the second apparatus information 38S is associated with the image 28SH, by specifying the high performance second apparatus information 38SS, the specifying unit 75 specifies the image 28SH of the second user 17S corresponding to the second imaging apparatus 11S having the second performance evaluation value equal to or larger than the first performance evaluation value (hereinafter, referred to as specific image 90, see FIGS. 16 and 21). The specifying unit 75 outputs a specification result 85 of the high performance second apparatus information 38SS to the setting unit 76.

The setting unit 76 sets the presentation priority of the image 28SH to the first user 17F. More specifically, the setting unit 76 sets the presentation priority of the image 28SH associated with the high performance second apparatus information 38SS specified by the specifying unit 75, that is, the specific image 90, to be higher than the presentation priority of the other images 28SH. The setting unit 76 outputs a setting result 86 of the presentation priority to the distribution control unit 77.

The distribution control unit 77 performs a control of distributing the image file 27 and the image file 27SH from the image acquisition unit 71 to the user terminal 12 which is the transmission source of the image distribution request 45. In this case, the distribution control unit 77 distributes the image file 27SH in such an aspect in which the shared folder 26 to which the image file 27SH belongs can be identified. In addition, the distribution control unit 77 generates the recommended image information 47 based on the setting result 86 from the setting unit 76, and performs the control of distributing the generated recommended image information 47 to the user terminal 12 which is the transmission source of the recommended image distribution request 46. It should be noted that the recommended image information 47 is information including, for example, a display priority based on the image 28 and the high performance second apparatus information 38SS.

Hereinafter, various processes executed by the processing units of the processor 57A will be described by taking, as an example, a case in which the user 17 of the user ID [U5] transmits the recommended image distribution request 46 for the shared folder 26 named "shared folder [soccer 1]" in the user group 30 shown in FIG. 3, as shown in FIG. 10. Therefore, in the following example, the user 17 of the user ID [U5] is the first user 17F. In addition, the imaging apparatus 11 corresponding to the user 17 of the user ID [U5] is the first imaging apparatus 11F. Moreover, the apparatus information 38 of the imaging apparatus 11 corresponding to the user 17 of the user ID [U5] is the first apparatus information 38F. On the other hand, the users 17 of the user IDs [U10], [U15], and [U20] are the second user 17S. In addition, the imaging apparatuses 11 corresponding to the users 17 of the user IDs [U10], [U15], and [U20] are the second imaging apparatus 11S. Moreover, the apparatus information 38 of the imaging apparatuses 11 corresponding to the users 17 of the user IDs [U10], [U15], and [U20] are the second apparatus information 38S. Further, the shared folder 26 named "shared folder [soccer 1]" is the recommendation designated shared folder 26SP. It should be noted that, in the following example, the imaging apparatuses 11 used by the users 17 for the imaging at the event will be described as one apparatus.

Figure 13:
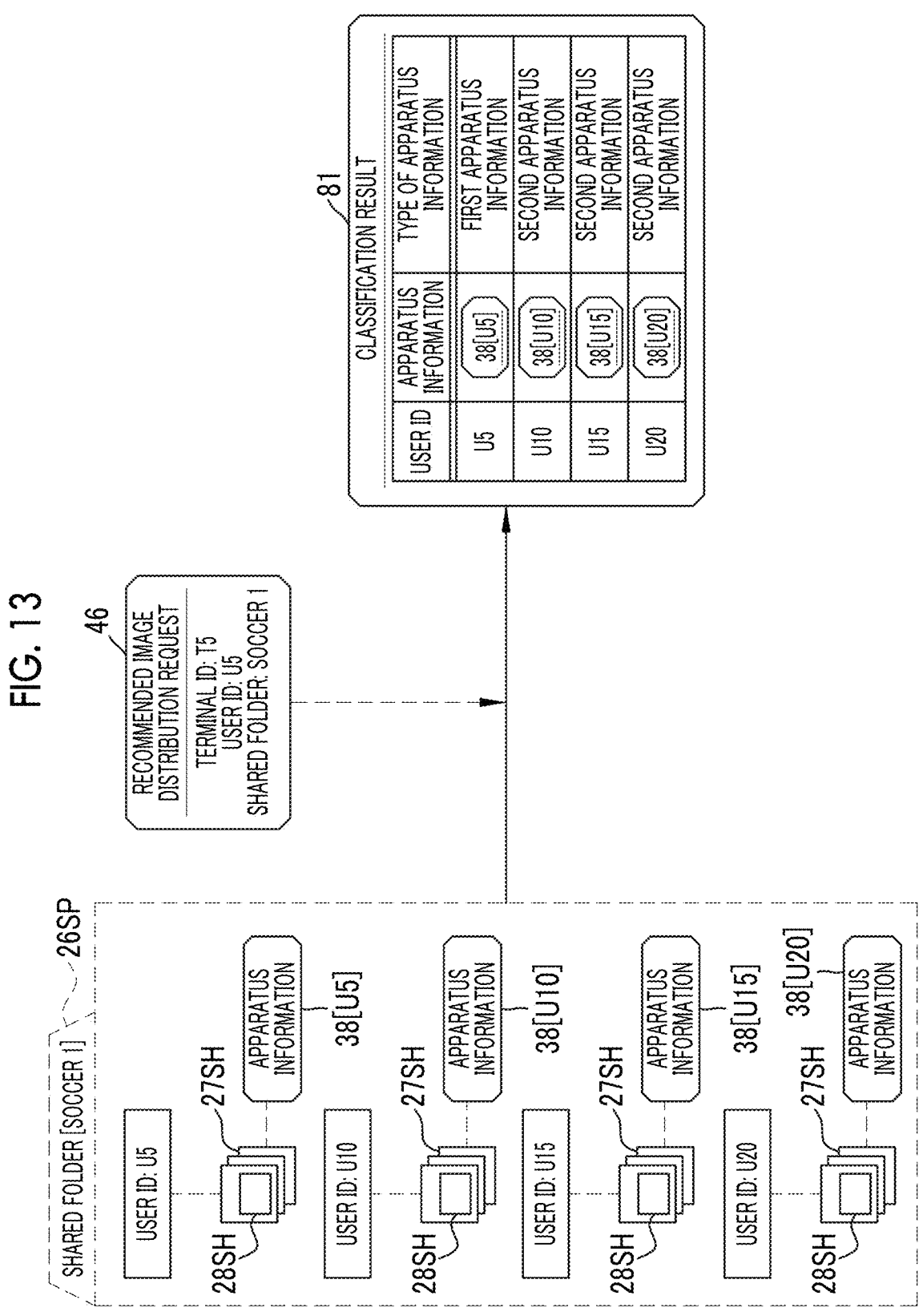
FIG. 13 is an explanatory diagram of a classification process executed by a classification unit.

FIG. 13 shows a classification process executed by the classification unit 72. In this case, since the user ID designated by the recommended image distribution request 46 is [U5], the classification unit 72 recognizes the user 17 of the user ID [U5] as the first user 17F. Moreover, the type of the apparatus information 38 [U5] included in the image file 27SH to which the user ID [U5] is assigned is classified into the first apparatus information 38F.

On the other hand, the classification unit 72 recognizes the users 17 of the user IDs [U10], [U15], and [U20] other than the user 17 of the user ID [U5] as the second user 17S. Moreover, the types of the apparatus information 38 [U10], 38 [U15], and 38 [U20] included in the image file 27SH to which the user IDs [U10], [U15], and [U20] are assigned are classified into the second apparatus information 38S. The classification unit 72 generates the classification result 81 in which the apparatus information 38 and its type are registered for each user ID, and outputs the generated classification result 81 to the evaluation value derivation unit 74.

Figure 14:
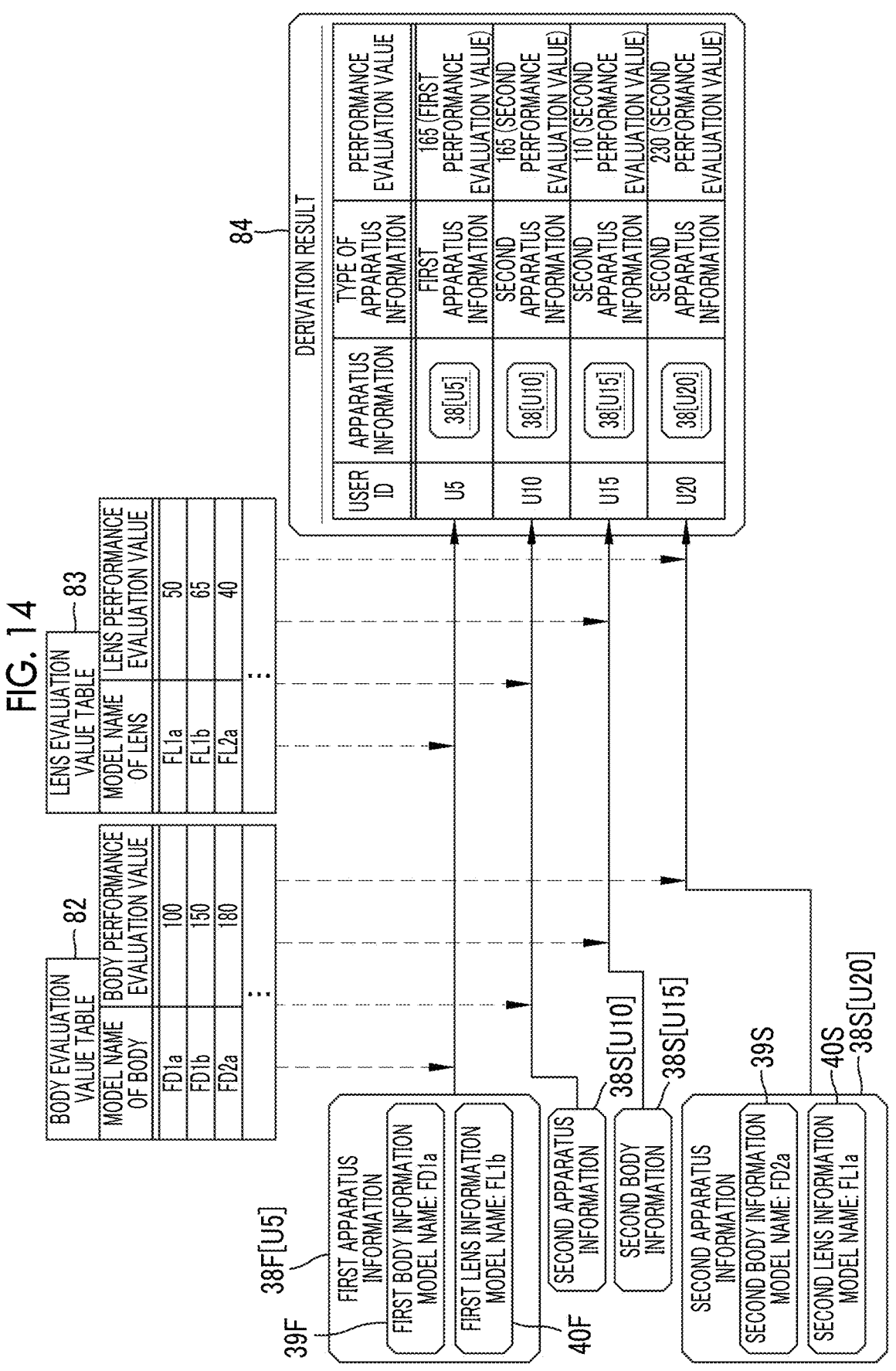
FIG. 14 is an explanatory diagram of an evaluation value derivation process executed by an evaluation value derivation unit.

FIG. 14 shows an evaluation value derivation process executed by the evaluation value derivation unit 74. First, the body evaluation value table 82 and the lens evaluation value table 83 will be described. In the body evaluation value table 82, a body performance evaluation value corresponding to the model name of the body of the imaging apparatus 11 is registered. In addition, in the lens evaluation value table 83, a lens performance evaluation value corresponding to the model name of the lens is registered. The body performance evaluation value is an evaluation value related to the body performance of the imaging apparatus 11. The lens performance evaluation value is an evaluation value related to the performance of the lens. In the body of the imaging apparatus 11, the performance is better as the body performance evaluation value is higher. Similarly, the performance of the lens is better as the lens performance evaluation value is higher. Therefore, for example, "FD2a" having the body performance evaluation value of 180 has better performance than "FD1a" having the body performance evaluation value of 100 and "FD1b" having the body performance evaluation value of 150.

FIG. 14 shows a case in which the model name registered in the first body information 39F of the first apparatus information 38F [U5] is "FD1a" and the model name registered in the first lens information 40F is "FL1b". The body performance evaluation value of "FD1a" is 100 in accordance with the body evaluation value table 82. In addition, the lens performance evaluation value of "FL1b" is 65 in accordance with the lens evaluation value table 83. Therefore, the evaluation value derivation unit 74 derives the first performance evaluation value of the first imaging apparatus 11F represented by the first apparatus information 38F [U5] as 100+65=165.

In addition, FIG. 14 shows a case in which the model name registered in the second body information 39S of the second apparatus information 38S [U20] is "FD2a" and the model name registered in the second lens information 40S is "FL1a". The body performance evaluation value of "FD2a" is 180 in accordance with the body evaluation value table 82. In addition, the lens performance evaluation value of "FL1a" is 50 in accordance with the lens evaluation value table 83. Therefore, the evaluation value derivation unit 74 derives the second performance evaluation value of the second imaging apparatus 11S represented by the second apparatus information 38S [U20] as 180+50=230.

Similarly, the evaluation value derivation unit 74 derives the second performance evaluation value of the second imaging apparatus 11S represented by the second apparatus information 38S [U10] as 165, and the second performance evaluation value of the second imaging apparatus 11S represented by the second apparatus information 38S [U15] as 110. The evaluation value derivation unit 74 generates the derivation result 84 in which the apparatus information 38, the type of the apparatus information 38, and the performance evaluation value are registered for each user ID, and outputs the generated derivation result 84 to the specifying unit 75. The evaluation value derivation unit 74 is an example of a "first acquisition unit" and a "second acquisition unit" according to the technology of the present disclosure.

FIG. 15 shows a specifying process executed by the specifying unit 75. In this case, in accordance with the derivation result 84, 165 which is the second performance evaluation value corresponding to the user ID [U10] and 230 which is the second performance evaluation value corresponding to the user ID [U20] correspond to the second performance evaluation value equal to or larger than 165, which is the first performance evaluation value. Therefore, the specifying unit 75 specifies the second apparatus information 38S [U10] and the second apparatus information 38S [U20] as the high performance second apparatus information 38SS. By specifying the high performance second apparatus information 38SS by the specifying unit 75 in this way, the image 28SH associated with the second apparatus information 38S, that is, the specific image 90 is specified. The specifying unit 75 generates the specification result 85 in which the specified high performance second apparatus information 38SS and the second performance evaluation value are associated with each other, and outputs the generated specification result 85 to the setting unit 76.

Figure 16:
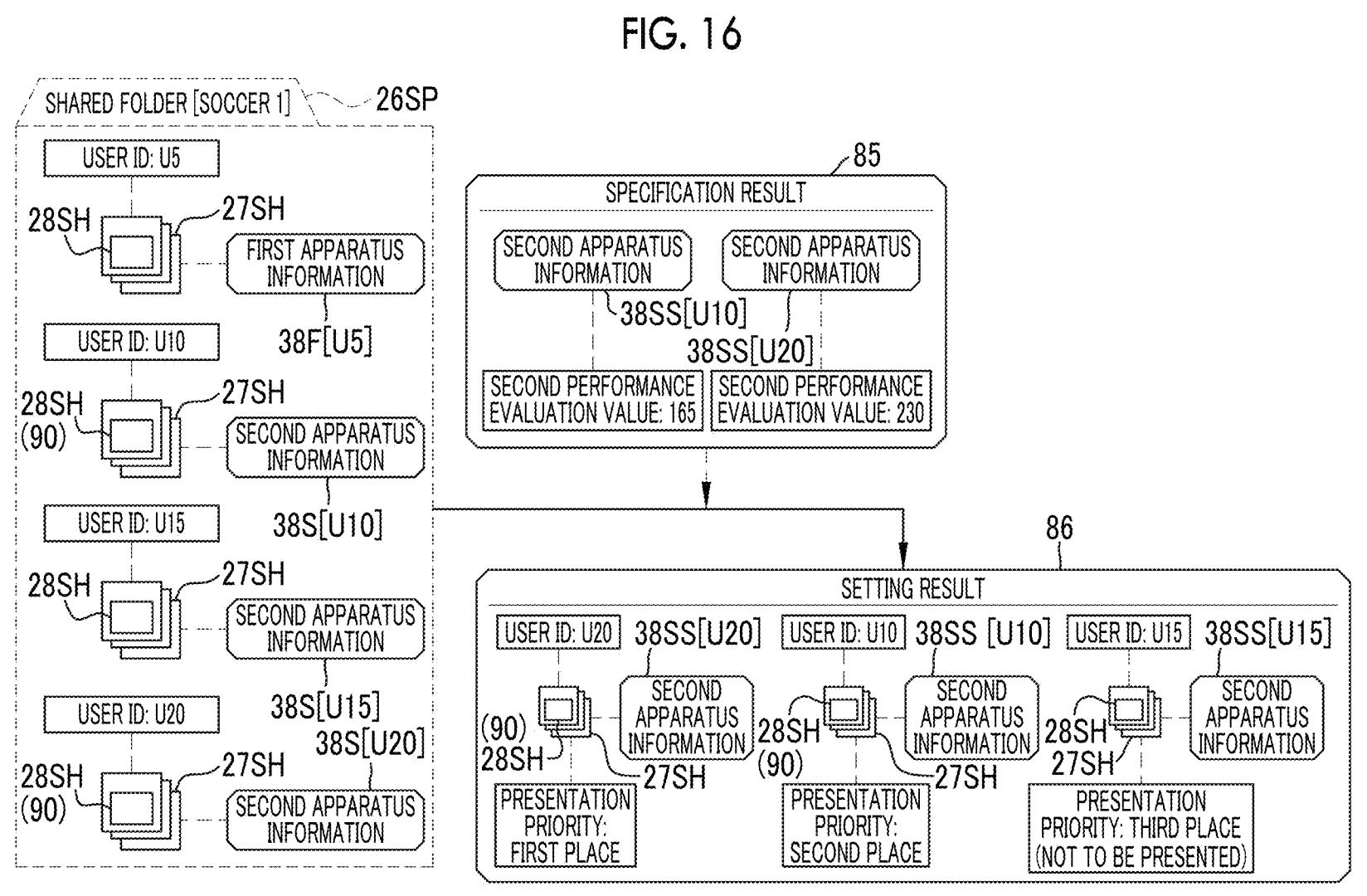

FIG. 16 shows a setting process executed by the setting unit 76. In this case, the setting unit 76 sets the presentation priority of the specific image 90 associated with the high performance second apparatus information 38SS [U20], which has a relatively high second performance evaluation value of 230, to the first place. In addition, the setting unit 76 sets the presentation priority of the specific image 90 associated with the high performance second apparatus information 38SS [U10], which has a relatively low second performance evaluation value of 165, to the second place.

Further, the setting unit 76 sets the presentation priority of the image 28SH associated with the second apparatus information 38S [U15], which has the second performance evaluation value less than the first performance evaluation value, to the third place. Moreover, the setting unit 76 sets the image 28SH associated with the second apparatus information 38S [U15] not to be presented as the recommended image. The image 28SH associated with the second apparatus information 38S [U15] is an example of "other shared images" according to the technology of the present disclosure. The setting unit 76 generates the setting result 86 in which the presentation priority set in this way is associated with each image file 27SH, and outputs the generated setting result 86 to the distribution control unit 77.

Figure 17:
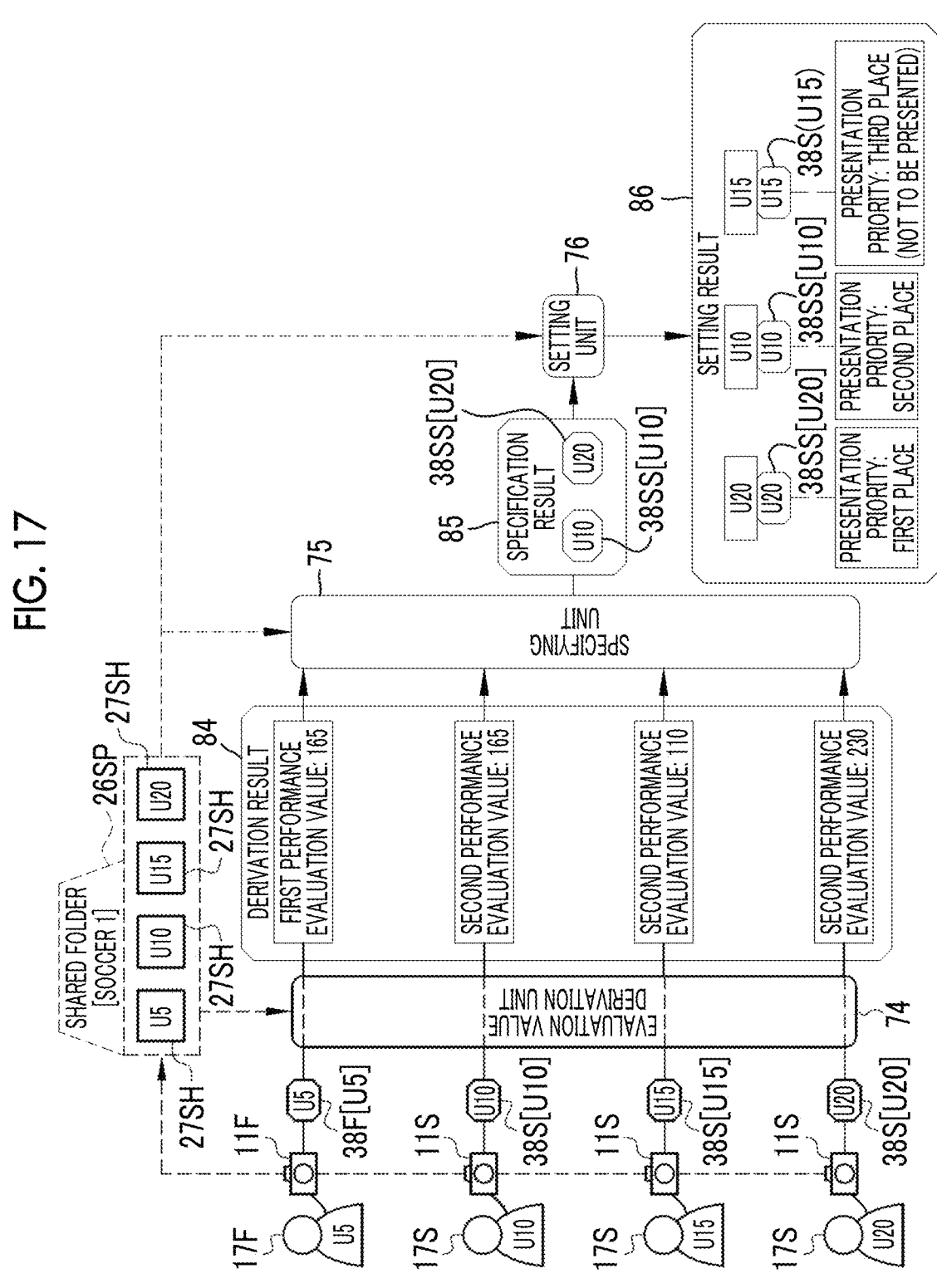
FIG. 17 is a diagram summarizing a series of the processes shown in FIGS. 13 to 16.

FIG. 17 is a diagram summarizing a series of the processes shown in FIGS. 13 to 16. That is, the evaluation value derivation unit 74 derives 165 which is the first performance evaluation value based on the first apparatus information 38F related to the first imaging apparatus 11F of the first user 17F. In addition, the evaluation value derivation unit 74 derives 165, 110, and 230 which are the second performance evaluation values based on the second apparatus information 38S related to the second imaging apparatus 11S of the second user 17S. As a result, the acquisition of the first performance evaluation value and the second performance evaluation value are performed.

The first apparatus information 38F referred to by the evaluation value derivation unit 74 for deriving the first performance evaluation value is information of the first imaging apparatus 11F that captures the image 28SH. Stated another way, the evaluation value derivation unit 74 derives the first performance evaluation value based only on the first apparatus information 38F of the first imaging apparatus 11F associated with the image 28SH. Similarly, the second apparatus information 38S referred to by the evaluation value derivation unit 74 for deriving the second performance evaluation value is the information of the second imaging apparatus 11S that captures the image 28SH. Stated another way, the evaluation value derivation unit 74 derives the second performance evaluation value based only on the second apparatus information 38S of the second imaging apparatus 11S associated with the image 28SH.

The specifying unit 75 specifies the second apparatus information 38S [U10] and the second apparatus information 38S [U20] as the high performance second apparatus information 38SS based on the derivation result 84.

The setting unit 76 sets the presentation priority of the specific image 90 associated with the high performance second apparatus information 38SS [U10] to the second place based on the specification result 85. In addition, the setting unit 76 sets the presentation priority of the specific image 90 associated with the high performance second apparatus information 38SS [U20] to the first place. Further, the setting unit 76 sets the presentation priority of the image 28SH associated with the second apparatus information 38S [U15] to the third place, and sets the image 28SH not to be presented.

As shown in FIG. 18, the distribution control unit 77 generates the recommended image information 47 in which the image ID of the specific image 90 and the user ID are registered for each presentation priority. As described above, in the present example, since the setting unit 76 sets the image 28SH having the presentation priority equal to or less than a predetermined threshold value (for example, the third place) not to be presented, the image ID or the like of the image 28SH having the presentation priority of the third place is not registered. It should be noted that the setting unit 76 may set the image 28 other than the specific image 90 associated with the second apparatus information 38S, which has lower performance than the first apparatus information 38F, not to be presented, and the distribution control unit 77 may not transmit the image 28 other than the specific image 90 to the user terminal 12 as the recommended image information 47.

Figure 19:
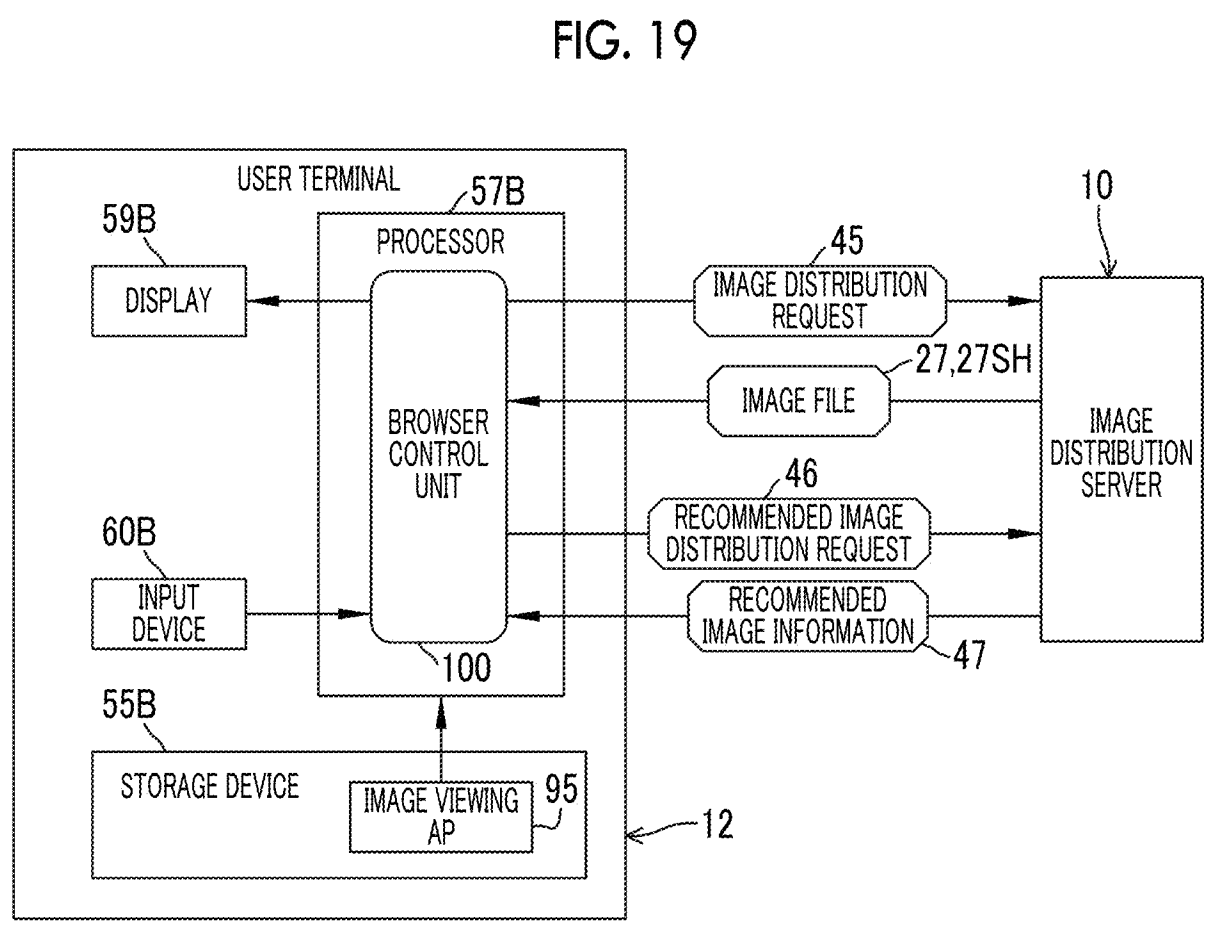

In FIG. 19, an image viewing AP 95 is stored in a storage device 55B of the user terminal 12. In a case in which the image viewing AP 95 is executed and a web browser dedicated to the image viewing AP 95 is activated, a processor 57B of the imaging apparatus 11 functions as a browser control unit 100 in cooperation with the memory 56 or the like. The browser control unit 100 controls the operation of the web browser. The browser control unit 100 receives the image file 27 and the image file 27SH from the image distribution server 10, the recommended image information 47, and the like. The browser control unit 100 generates various screens, such as an image display screen 105 (see FIG. 20) on which the image 28 of the image file 27 and the image 28SH of the image file 27SH are displayed, and a recommended image display screen 110 (see FIG. 21) on which the specific image 90 is displayed as the recommended image, and displays the generated screens on a display 59B.

In addition, the browser control unit 100 receives various operation instructions input from an input device 60B by the user 17 via various screens. The operation instructions include an image distribution instruction for the image distribution server 10, a recommended image distribution instruction, and the like. For example, the image distribution instruction also serves as an activation instruction for the image viewing AP 95. The browser control unit 100 transmits a request in accordance with the operation instruction to the image distribution server 10. Specifically, the browser control unit 100 transmits the image distribution request 45 to the image distribution server 10 in response to the image distribution instruction to the image distribution server 10. In addition, the browser control unit 100 transmits the recommended image distribution request 46 to the image distribution server 10 in accordance with the recommended image distribution instruction to the image distribution server 10.

Figure 20:
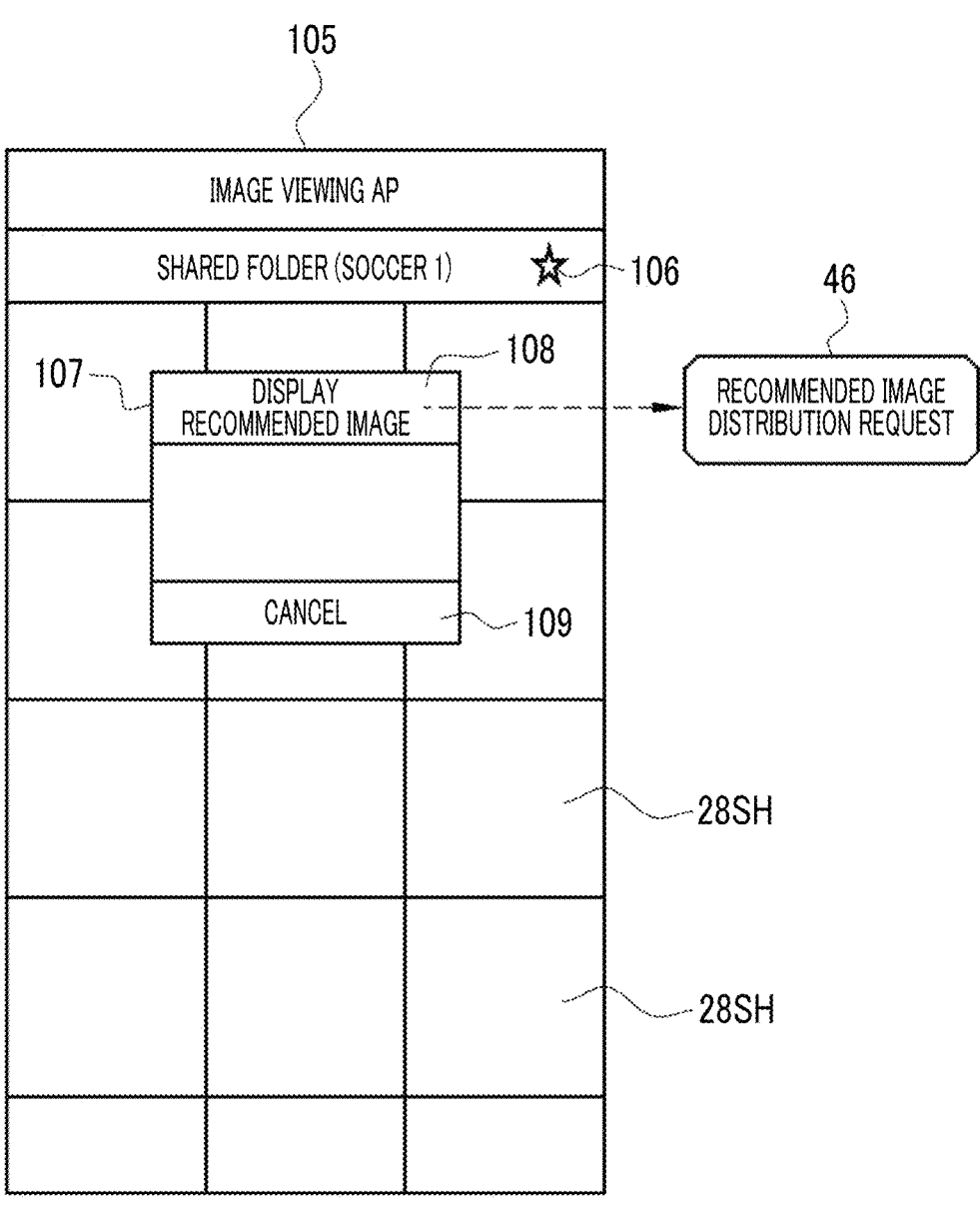
FIG. 20 is a diagram showing an image display screen.

FIG. 20 shows the image display screen 105 on which the image 28SH included in the image file 27SH in the shared folder 26 is displayed. On the image display screen 105, a plurality of images 28SH are displayed in a list, for example, in order of imaging date and time. In a case in which a shared folder selection button 106 is selected on the image display screen 105, a context menu 107 is pop-up displayed. It should be noted that the shared folder selection button 106 is displayed in association with each of one or more shared folders 26 on the image display screen 105. In addition, the shared folder selection button 106 has a star shape, but is not limited to this as long as the user 17 can select a specific shared folder 26 from a plurality of shared folders 26.

A recommended image distribution instruction button 108 and a cancel button 109 are displayed on the context menu 107. In a case in which the recommended image distribution instruction button 108 is selected, the recommended image distribution instruction is input to the browser control unit 100, and the recommended image distribution request 46 is transmitted from the browser control unit 100 to the image distribution server 10. In a case in which the cancel button 109 is selected, the display of the context menu 107 is turned off. It should be noted that, in the present embodiment, the recommended image distribution request 46 for designating the shared folder 26 is transmitted by selecting the shared folder selection button 106 and then selecting the recommended image distribution instruction button 108, but the present disclosure is not limited to this. The recommended image distribution request 46 for the selected shared folder 26 may be made by selecting the shared folder selection button 106 without displaying the context menu 107.

Figure 21:
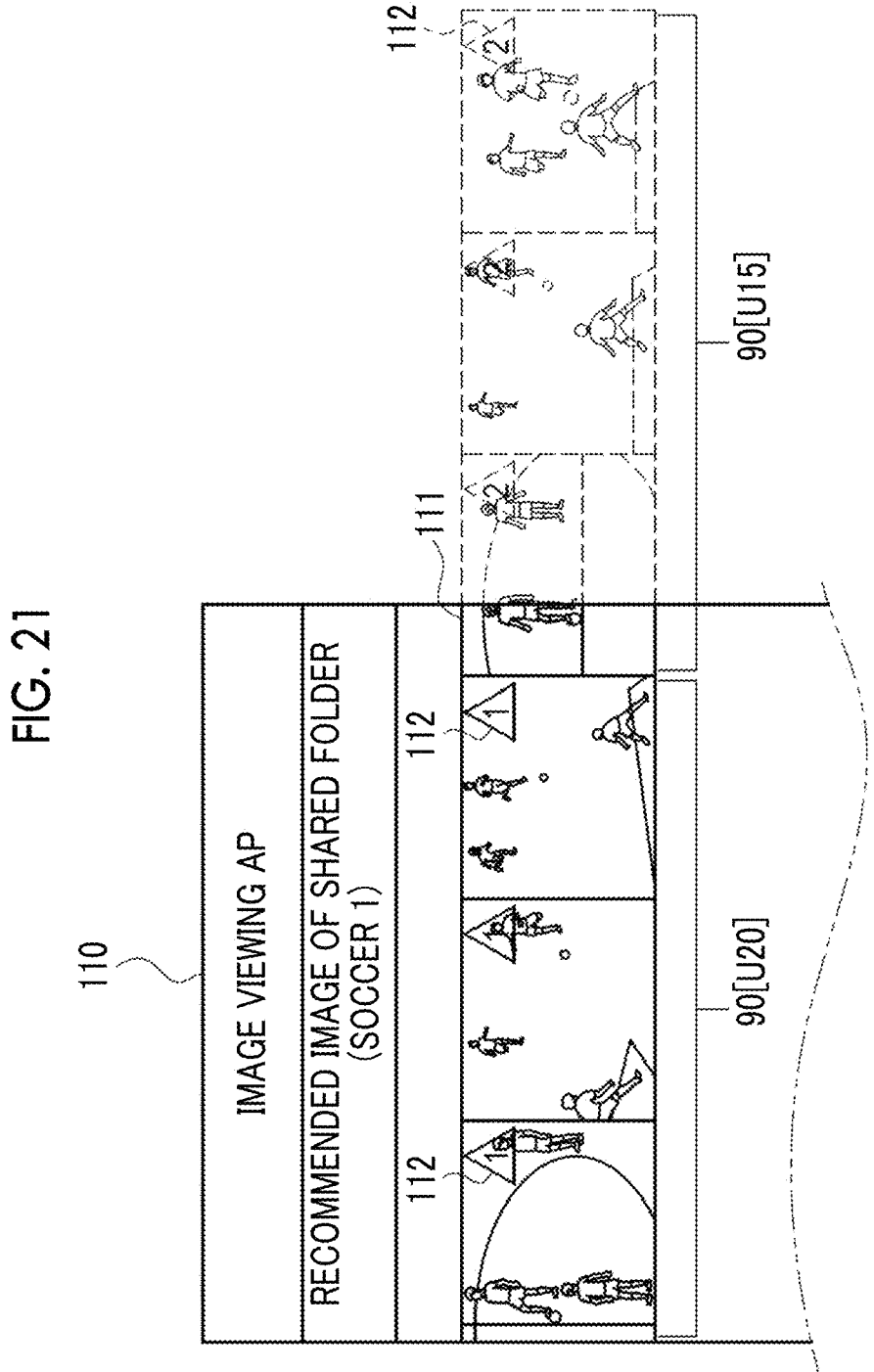
FIG. 21 is a diagram showing a recommended image display screen.

FIG. 21 shows the recommended image display screen 110 on which the specific image 90 is displayed as the recommended image. The recommended image display screen 110 has a recommended image display region 111. In the recommended image display region 111, a plurality of specific images 90 are displayed in a row in a horizontally long strip. In this case, the specific image 90 is displayed in accordance with the presentation priority set by the setting unit 76. In a case of the examples shown in FIGS. 13 to 17, as shown in the figure, the specific image 90 [U20], which is associated with the second apparatus information 38S [U20] and has the presentation priority of the first place, is disposed on the left side on which a degree of recommendation is relatively high. Moreover, the specific image 90 [U10], which is associated with the second apparatus information 38S [U10] and has the presentation priority of the second place, is disposed on the right side on which the degree of recommendation is relatively low. That is, the specific images 90 are rearranged in accordance with the presentation priorities and displayed.

In the specific image 90 of the recommended image display region 111, a mark 112 indicating that it is the recommended image is displayed. A number indicating the presentation priority is displayed in the mark 112. For example, the specific image 90, which has the older imaging date and time, of the recommended image display region 111 is disposed on the left side. The specific image 90 in the recommended image display region 111 is scrolled and displayed by a horizontal scrolling operation. In addition, each of the specific images 90 of the recommended image display region 111 can be selected and displayed in an enlarged manner.

Figure 22:
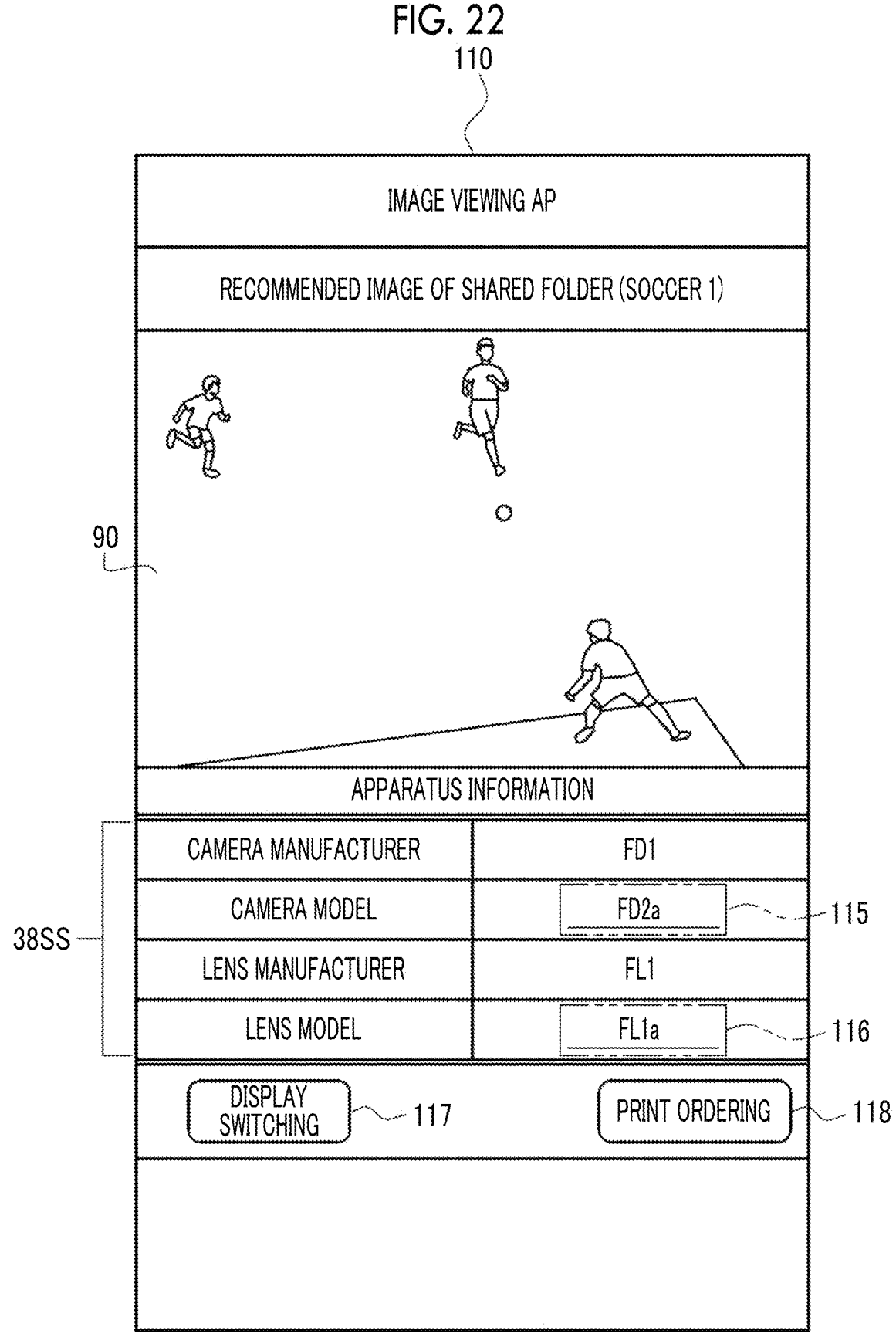
FIG. 22 is a diagram showing the recommended image display screen on which a specific image and second apparatus information are displayed.

FIG. 22 shows the recommended image display screen 110 on which one of the specific images 90 in the recommended image display region 111 is selected and displayed in an enlarged manner. In this case, the high performance second apparatus information 38SS associated with the specific image 90 displayed in an enlarged manner is displayed on the recommended image display screen 110. Specifically, in the high performance second apparatus information 38SS, the manufacturer name (referred to as a camera manufacturer in FIG. 22) and the model name (referred to as a camera model in FIG. 22) of the body of the second imaging apparatus 11S included in the second body information 39S are displayed. In addition, in the high performance second apparatus information 38SS, the manufacturer name (referred to as a lens manufacturer in FIG. 22) and the model name (referred to as a lens model in FIG. 22) of the lens included in the second lens information 40S are displayed. The model name of the body of the second imaging apparatus 11S has a link 115 to a web page of the product introduction of the body of the second imaging apparatus 11S. Similarly, the model name of the lens has a link 116 to a web page of the product introduction of the lens.

Figure 23:
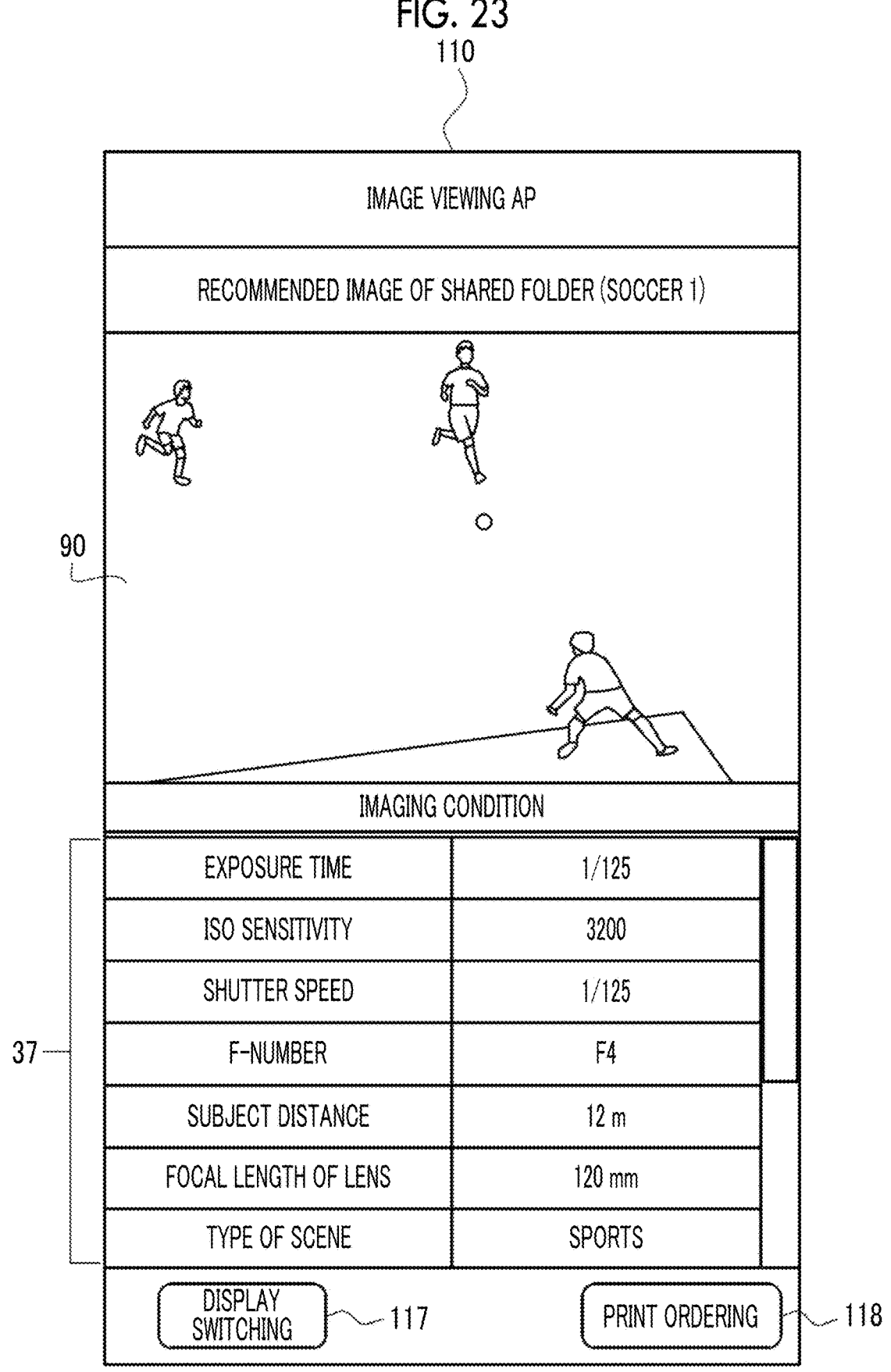
FIG. 23 is a diagram showing the recommended image display screen on which the specific image and the imaging condition are displayed.

A display switching button 117 is provided below the high performance second apparatus information 38SS. In a case in which the display switching button 117 is selected, the imaging condition 37 is displayed instead of the high performance second apparatus information 38SS, as shown in FIG. 23. The imaging condition 37 is the imaging condition 37 of the second imaging apparatus 11S associated with the specific image 90 displayed in an enlarged manner, and is the imaging condition 37 set in a case in which the specific image 90 displayed in an enlarged manner is captured.

The display switching button 117 is also provided below the imaging condition 37. In a case in which the display switching button 117 is selected, the display of the imaging condition 37 is switched to the display of the high performance second apparatus information 38SS, and the recommended image display screen 110 is returned to the display state of FIG. 22.

A print ordering button 118 is provided next to the display switching button 117. In a case in which the print ordering button 118 is selected, it is possible to order a photographic print of the specific image 90 displayed in an enlarged manner.

Next, an action of the configuration described above will be described with reference to flowcharts of FIGS. 24 and 25. In a case in which the operation program 65 is activated, the processor 57A of the image distribution server 10 functions as the request reception unit 70, the image acquisition unit 71, the classification unit 72, the RW control unit 73, the evaluation value derivation unit 74, the specifying unit 75, the setting unit 76, and the distribution control unit 77, as shown in FIG. 12.

As shown in FIG. 24, in a case in which the image distribution request 45 is received by the request reception unit 70 (YES in step ST100), the image acquisition unit 71 transmits the image acquisition request 80 to the image DB server 18 (step ST110). Moreover, the image file 27 in the personal folder 25 and the image file 27SH in the shared folder 26 transmitted from the image DB server 18 in response to the image acquisition request 80 are acquired by the image acquisition unit 71 (step ST120).

The image file 27 and the image file 27SH are output to the distribution control unit 77 from the image acquisition unit 71. The image file 27 and the image file 27SH are distributed by the distribution control unit 77 to the user terminal 12 which is the transmission source of the image distribution request 45 (step ST130).

As shown in FIG. 25, in a case in which the recommended image distribution request 46 is received by the request reception unit 70 (YES in step ST200), the classification process shown in FIG. 13 is executed by the classification unit 72 (step ST210). As a result, the apparatus information 38 included in the image file 27SH in the recommendation designated shared folder 26SP is classified into the first apparatus information 38F and the second apparatus information 38S. The classification result 81 generated by the classification unit 72 by the classification process is output to the evaluation value derivation unit 74.

Then, the evaluation value derivation unit 74 executes the evaluation value derivation process shown in FIG. 14 (step ST220). As a result, the first performance evaluation value related to the performance of the first imaging apparatus 11F and the second performance evaluation value related to the performance of the second imaging apparatus 11S are derived. The derivation result 84 generated by the evaluation value derivation unit 74 by the evaluation value derivation process is output to the specifying unit 75. Step ST220 is an example of a "first acquisition step" and a "second acquisition step" according to the technology of the present disclosure.

The specifying unit 75 executes the specifying process shown in FIG. 15 (step ST230). As a result, the high performance second apparatus information 38SS is specified. The specification result 85 generated by the specifying unit 75 by the specifying process is output to the setting unit 76. Step ST230 is an example of a "specifying step" according to the technology of the present disclosure.

Then, the setting unit 76 executes the setting process shown in FIG. 16 (step ST240). As a result, the presentation priority of the image 28SH to the first user 17F is set, and the presentation priority of the specific image 90 is set to be higher than the presentation priorities of other images 28SH. The setting result 86 generated by the setting unit 76 by the setting process is output to the distribution control unit 77. Step ST240 is an example of a "setting step" according to the technology of the present disclosure.

As shown in FIG. 18, the distribution control unit 77 generates the recommended image information 47 that follows a content of the setting result 86. The recommended image information 47 is distributed by the distribution control unit 77 to the user terminal 12 which is the transmission source of the recommended image distribution request 46 (step ST250).

The recommended image display screen 110 shown in FIG. 21 is displayed on the user terminal 12 based on the recommended image information 47. In addition, in accordance with the operation of the first user 17F, the high performance second apparatus information 38SS associated with the specific image 90 is displayed as shown in FIG. 22, and the imaging condition 37 associated with the specific image 90 is displayed as shown in FIG. 23.

As described above, the processor 57A of the image distribution server 10 includes the evaluation value derivation unit 74, the specifying unit 75, and the setting unit 76. The evaluation value derivation unit 74 derives and acquires the first performance evaluation value related to the performance of the first imaging apparatus 11F of the first user 17F who is one of the plurality of users 17 constituting the user group 30. In addition, the evaluation value derivation unit 74 derives and acquires the second performance evaluation value related to the performance of the second imaging apparatus 11S of the second user 17S different from the first user 17F among the plurality of users 17 constituting the user group 30. The specifying unit 75 specifies the image 28SH (specific image 90) of the second user 17S corresponding to the second imaging apparatus 11S having the second performance evaluation value equal to or larger than the first performance evaluation value from among the images 28SH in the recommendation designated shared folder 26SP. The setting unit 76 sets the presentation priority of the specific image 90 to the first user 17F higher than the presentation priorities of other images 28SH. In short, the image distribution server 10 preferentially presents the image 28SH captured by the second imaging apparatus 11S having the performance equal to or higher than the performance of the first imaging apparatus 11F to the first user 17F. Therefore, it is possible to preferentially present an image desirable relatively to an image 28F of the first user 17F.

The distribution control unit 77 distributes the recommended image information 47 in which the presentation priority is registered to the user terminal 12 of the first user 17F. As a result, the images 28SH are rearranged in accordance with the presentation priorities and presented in the user terminal 12. Therefore, the first user 17F can grasp the presentation priority of the image 28SH by the arrangement of the images 28SH. The image 28SH having a relatively high presentation priority can be easily found.

The distribution control unit 77 presents the imaging condition 37 of the second imaging apparatus 11S associated with the specific image 90 by distributing the image file 27SH to the user terminal 12 of the first user 17F. Therefore, the first user 17F can know how to set the imaging condition 37 to be capable of obtaining the presented specific image 90, which can be a useful clue in a case of setting the imaging condition 37 in the next imaging. Therefore, it is possible to contribute to the improvement of an imaging skill of the first user 17F.

The evaluation value derivation unit 74 derives the first performance evaluation value based on first apparatus information 38F related to the first imaging apparatus 11F, and derives the second performance evaluation value based on second apparatus information 38S related to the second imaging apparatus 11S. Therefore, the first performance evaluation value corresponding to the first imaging apparatus 11F and the second performance evaluation value corresponding to the second imaging apparatus 11S can be reliably derived.

The distribution control unit 77 presents the high performance second apparatus information 38SS of the second imaging apparatus 11S associated with the specific image 90 by distributing an image file 27S to the user terminal 12 of the first user 17F. Therefore, the first user 17F can know what the second imaging apparatus 11S used for imaging the specific image 90 is. In addition, the interest of the first user 17F can be used as the clue for the second imaging apparatus 11S. It is possible to lead to more effective sales promotion of the second imaging apparatus 11S than a case in which the advertisement of the second imaging apparatus 11S is suddenly presented to the first user 17F who is not interested in the second imaging apparatus 11S.

The first apparatus information 38F includes the first body information 39F related to the body of the first imaging apparatus 11F and the first lens information 40F related to the lens built in or mounted on the body of the first imaging apparatus 11F. In addition, the second apparatus information 38S includes the second body information 39S related to the body of the second imaging apparatus 11S and the second lens information 40S related to the lens built in or mounted on the body of the second imaging apparatus 11S. Therefore, even in a case in which the combination of the body of the imaging apparatus 11 and the lens is changed, for example, as in a lens interchangeable camera, the first performance evaluation value and the second performance evaluation value can be derived without any problem.

The evaluation value derivation unit 74 derives the first performance evaluation value based only on the first apparatus information 38F of the first imaging apparatus 11F associated with the image 28SH, and derives the second performance evaluation value based only on the second apparatus information 38S of the second imaging apparatus 11S associated with the image 28SH. Therefore, it is possible to derive the first performance evaluation value and the second performance evaluation value without any trouble.

It should be noted that, in a case in which the first user 17F uses a plurality of the first imaging apparatuses 11F for the imaging at the event, the evaluation value derivation unit 74 derives the first performance evaluation value for each of the plurality of first imaging apparatuses 11F. Moreover, the maximum value among the first performance evaluation values derived for the plurality of first imaging apparatuses 11F, respectively, is used as a final first performance evaluation value used for the specifying process by the specifying unit 75. Alternatively, the first performance evaluation value derived for one first imaging apparatus 11F having the largest captured number of the images 28SH among the plurality of first imaging apparatuses 11F may be used as the final first performance evaluation value. The average value of the first performance evaluation values derived for the plurality of first imaging apparatuses 11F may be used as the final first performance evaluation value.

The same applies to a case in which the first imaging apparatus 11F is the lens interchangeable camera and the first user 17F exchanges the lenses during the event to capture the image. For example, the evaluation value derivation unit 74 derives the first performance evaluation value for each of a plurality of combinations of the body of the first imaging apparatus 11F and the lens, and uses the maximum value thereof as the final first performance evaluation value.

Even in a case in which the second user 17S uses a plurality of second imaging apparatuses 11S for the imaging at the event, the evaluation value derivation unit 74 derives the second performance evaluation value for each of the plurality of second imaging apparatuses 11S. The specifying unit 75 compares the magnitude of the second performance evaluation value derived for each of the plurality of second imaging apparatuses 11S with the magnitude of the first performance evaluation value to specify the high performance second apparatus information 38SS. Alternatively, as in a case of the first performance evaluation value described above, the second performance evaluation value derived for one second imaging apparatus 11S having the largest captured number of the images 28SH among the plurality of second imaging apparatuses 11S may be used as a final second performance evaluation value used for the specifying process by the specifying unit 75. In addition, the average value of the second performance evaluation values derived for the plurality of second imaging apparatuses 11S, respectively, may be used as the final second performance evaluation value. It should be noted that the same applies to a case in which the second imaging apparatus 11S is the lens interchangeable camera and the second user 17S exchanges the lenses during the event to capture the image.

Second Embodiment

In a second embodiment shown in FIGS. 26 to 29, the images 28SH are classified into a plurality of attribute groups based on attribute information of each of the plurality of images 28SH. Moreover, the image 28SH is presented to the first user 17F for each attribute group.

Figure 26:
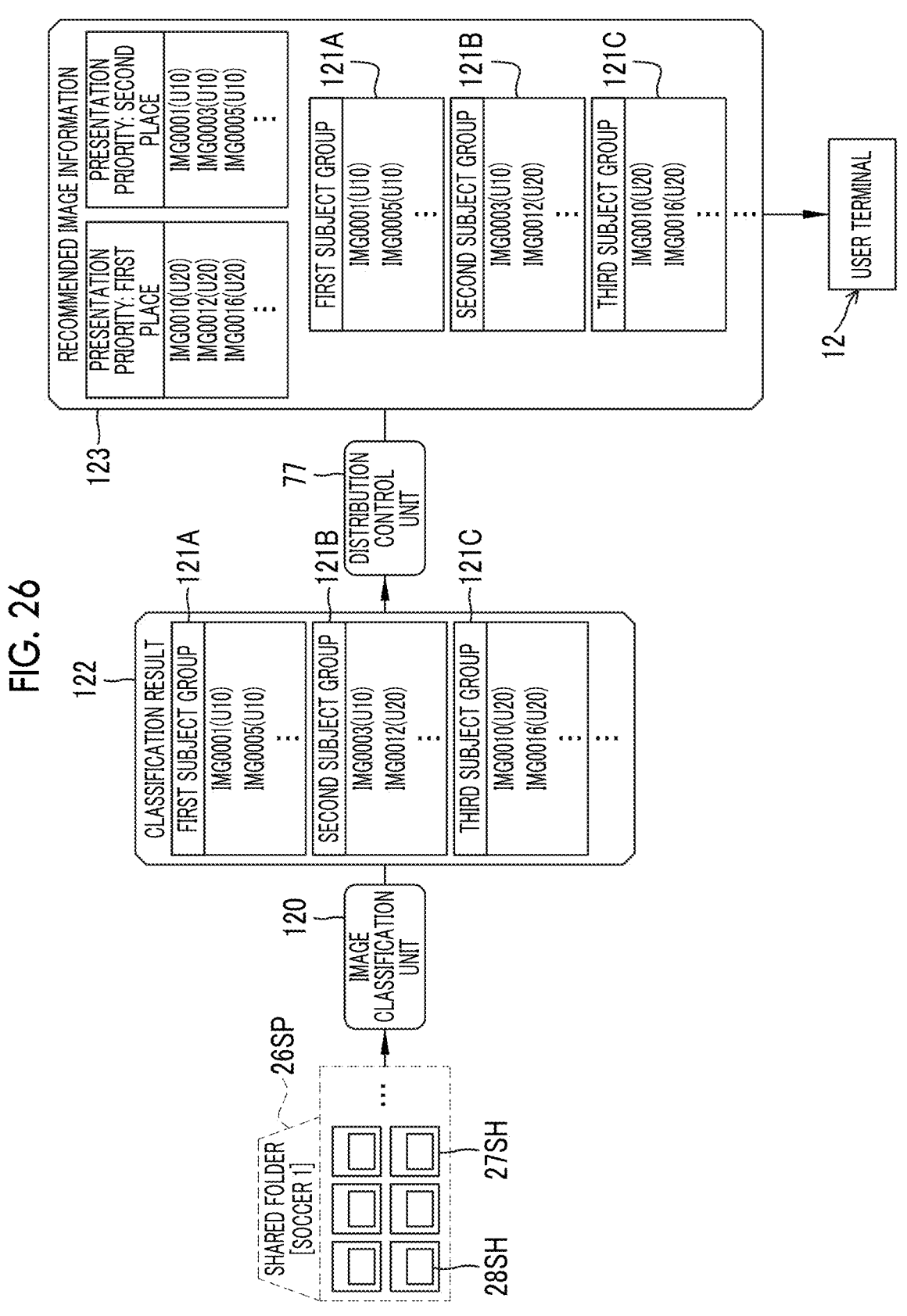
FIG. 26 is a diagram showing an aspect in which images in the shared folder are classified into a plurality of subject groups and the images are presented for each subject group.
Figure 27:
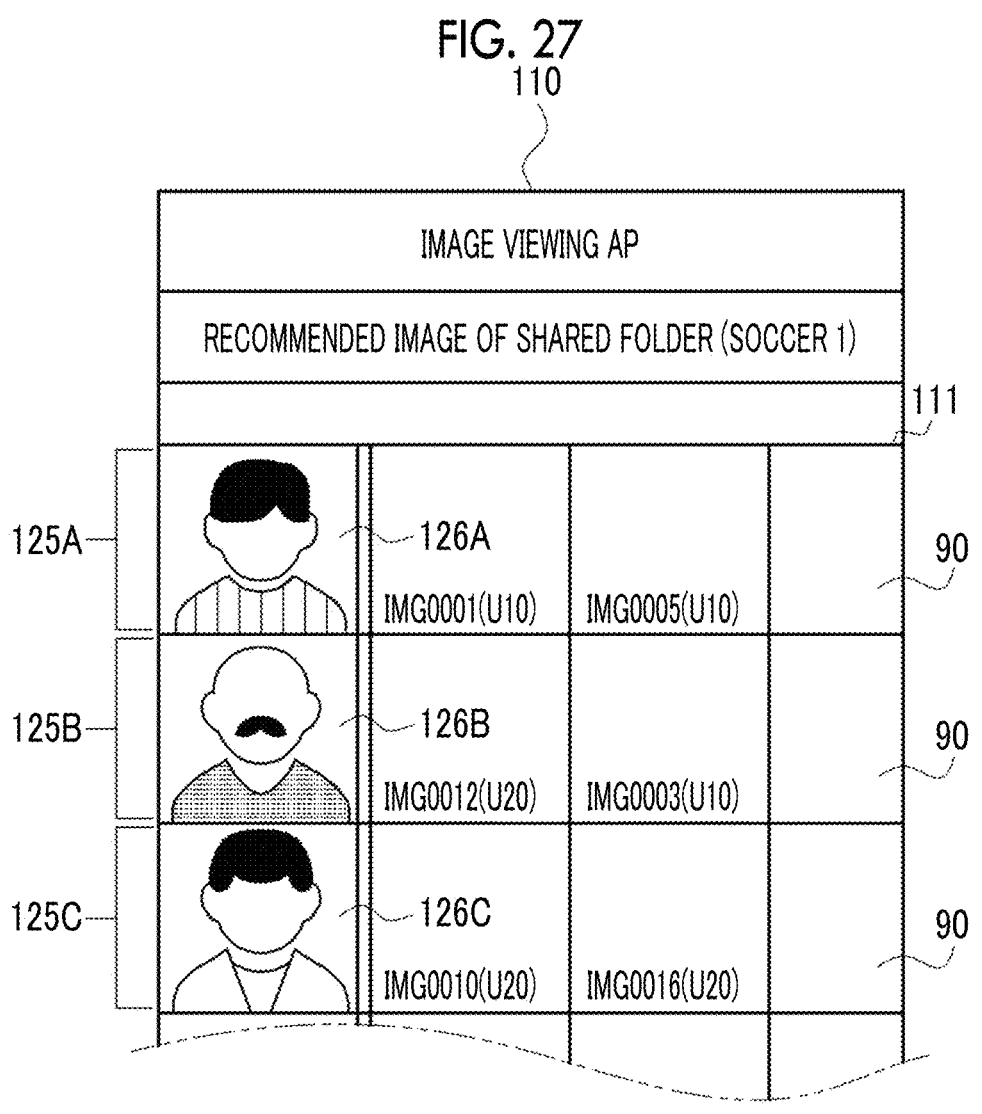
FIG. 27 is a diagram showing the recommended image display screen in the aspect shown in FIG. 26.

FIGS. 26 and 27 are examples in which the attribute information is the subject of the image 28SH. First, as shown in FIG. 26, the processor 57A of the image distribution server 10 functions as an image classification unit 120 in addition to each of the processing units 70 to 77 according to the first embodiment (only the distribution control unit 77 is shown in FIG. 26). The image classification unit 120 performs a subject recognition process on the specific image 90 among the images 28SH included in the image file 27SH in the recommendation designated shared folder 26SP. Specifically, the subject to be recognized is a person. Moreover, the specific images 90 are classified into any of a plurality of subject groups 121. It should be noted that, in a case in which two or more people are reflected in the specific image 90, the image classification unit 120 classifies the specific image 90 into, for example, the subject group 121 corresponding to one person in the center.

The image classification unit 120 generates a classification result 122 in which the image ID of the specific image 90 and the user ID are registered for each subject group 121, and outputs the generated classification result 122 to the distribution control unit 77. FIG. 26 shows a state in which the specific images 90 of the recommendation designated shared folder 26SP named "shared folder [soccer 1]" are classified into a first subject group 121A, a second subject group 121B, a third subject group 121C, and the like, respectively. The subject group 121 is an example of an "attribute group" according to the technology of the present disclosure.

The distribution control unit 77 copies the classification result 122 from the image classification unit 120, in addition to the setting result 86 from the setting unit 76, to generate recommended image information 123. The distribution control unit 77 distributes the generated recommended image information 123 to the user terminal 12 which is the transmission source of the recommended image distribution request 46.

FIG. 27 shows the recommended image display screen 110 displayed on the display 59B of the user terminal 12 in a case in which the recommended image information 123 is received. In this case, the recommended image display region 111 is divided into a plurality of regions 125. Each region 125 is a region corresponding to each subject group 121. For example, a region 125A is a region corresponding to the first subject group 121A. At the left end of each region 125, a face image 126 of the person recognized as the subject is displayed. For example, in a region 125B, a face image 126B of the person recognized as a second subject is displayed. The face image 126 is extracted from one representative specific image 90, for example. In each region 125, the specific images 90 belonging to each subject group 121 are displayed in a row in a horizontally long strip. For example, in a region 125C, the specific image 90 belonging to the third subject group 121C is displayed. That is, the specific image 90 is presented for each subject group 121.

FIGS. 26 and 27 shows a case in which the presentation priority of the specific images 90 (image IDs "IMG0010 ID (U20)", "IMG0012 ID (U20)", "IMG0016 ID (U20)", . . . ) corresponding to the second user 17S of the user ID [U20] are set to the first place, and the presentation priority of the specific images 90 (image IDs "IMG0001 ID (U10)", "IMG0003 ID (U10)", "IMG0005 ID (U10)", . . . ) corresponding to the second user 17S of the user ID [U10] are set to the second place. In addition, a case is shown in which the specific images 90 of the image IDs "IMG0001 (U10)", "IMG0005 (U10)", . . . are classified into the first subject group 121A, the specific images 90 of the image IDs "IMG0003 (U10)", "IMG0012 (U20)", . . . are classified into the second subject group 121B, and the specific images 90 of the image IDs "IMG0010 (U20)", "IMG0016 (U20)", . . . are classified into the third subject group 121C, respectively. Moreover, only the specific image 90 corresponding to the second user 17S of the user ID [U10] is classified into the first subject group 121A. In this case, in the region 125A corresponding to the first subject group 121A, as shown in FIG. 27, the specific images 90 corresponding to the second user 17S of the user ID [U10] (image IDs "IMG0001 (U10)" and "IMG0005 (U10)") of which the presentation priority is the second place, but the presentation priority is the highest in the first subject group 121A are preferentially displayed. In addition, in the region 125B corresponding to the second subject group 121B, the specific images 90 are displayed in the order of "IMG0012 (U20)" of which the presentation priority is the first place and "IMG0003 (U10)" of which the presentation priority is the second place. It should be noted that, in a case in which all the specific images 90 classified into one subject group 121 have the same presentation priority as in the first subject group 121A, for example, the images need only be displayed side by side in order from the oldest imaging date and time.

Figure 28:
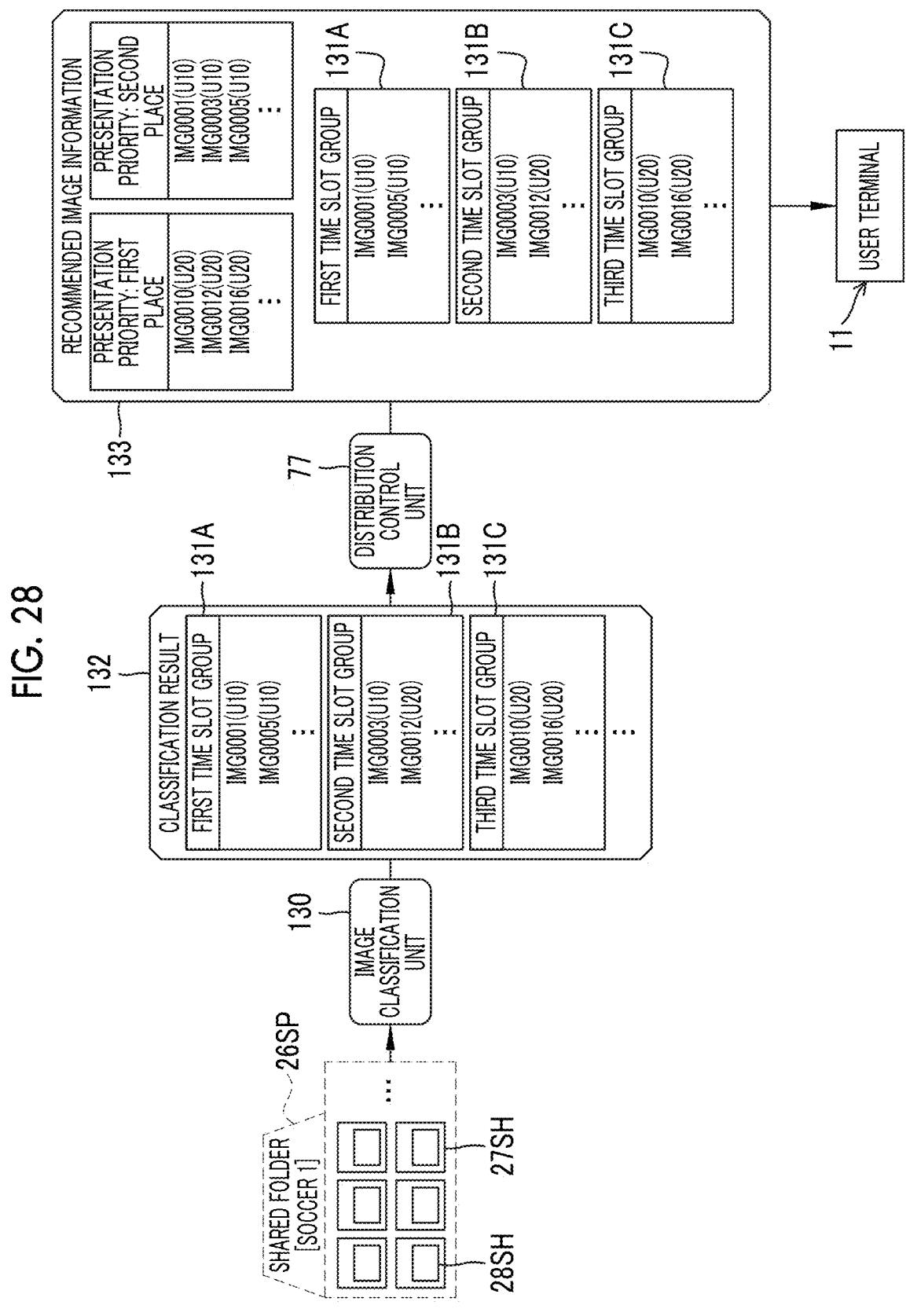
FIG. 28 is a diagram showing an aspect in which images in the shared folder are classified into a plurality of time slot groups and the images are presented for each time slot group.
Figure 29:
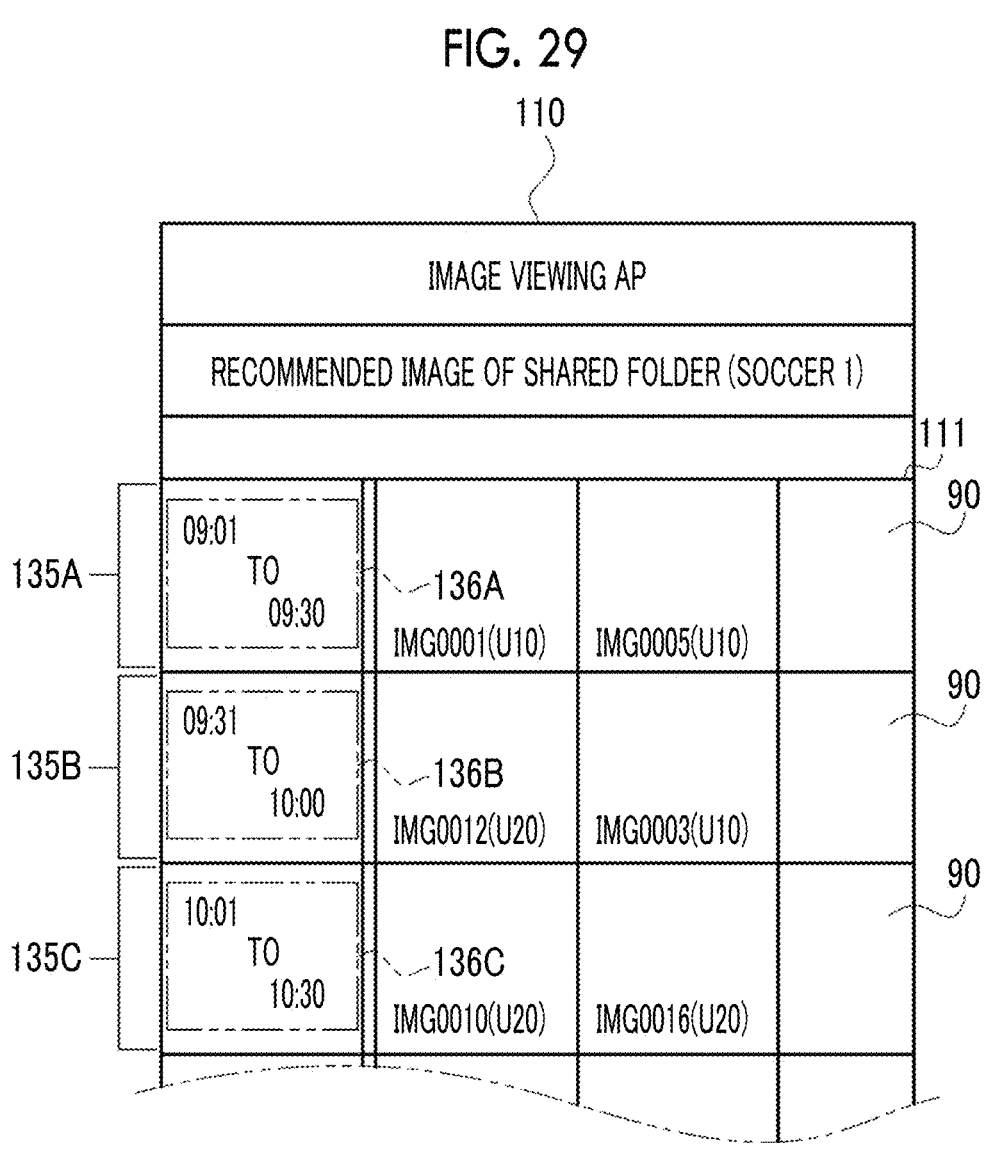
FIG. 29 is a diagram showing the recommended image display screen in the aspect shown in FIG. 28.

FIGS. 28 and 29 are examples in which the attribute information is the imaging date and time of the image 28SH. First, as shown in FIG. 28, the processor 57A of the image distribution server 10 functions as an image classification unit 130, as in a case of FIG. 26. The image classification unit 130 classifies the specific image 90 of the images 28SH included in the image file 27SH in the recommendation designated shared folder 26SP into one of a plurality of time slot groups 131 based on the imaging date and time.

The image classification unit 130 generates a classification result 132 in which the image ID of the specific image 90 and the user ID are registered for each time slot group 131, and outputs the generated classification result 132 to the distribution control unit 77. FIG. 28 shows a state in which the specific images 90 of the recommendation designated shared folder 26SP named "shared folder [soccer 1]" are classified into a first time slot group 131A, a second time slot group 131B, a third time slot group 131C, and the like, respectively. The time slot group 131 is an example of an "attribute group" according to the technology of the present disclosure, similar to the subject group 121.

The distribution control unit 77 copies the classification result 132 from the image classification unit 130, in addition to the setting result 86 from the setting unit 76, to generate recommended image information 133. The distribution control unit 77 distributes the generated recommended image information 133 to the user terminal 12 which is the transmission source of the recommended image distribution request 46.

FIG. 29 shows the recommended image display screen 110 displayed on the display 59B of the user terminal 12 in a case in which the recommended image information 133 is received. In this case, the recommended image display region 111 is divided into a plurality of regions 135 as in a case of FIG. 27. Each region 135 is a region corresponding to each time slot group 131. For example, a region 135A is a region corresponding to the first time slot group 131A. At the left end of each region 135, a character 136 indicating each time slot is displayed. For example, in a region 135B, "09:31 to 10:00", which is a character 136B indicating a second time slot, is displayed. In each region 135, the specific images 90 belonging to each time slot group 131 are displayed in a row in a horizontally long strip. For example, in a region 135C, the specific image 90 belonging to the third time slot group 131C is displayed. That is, the specific image 90 is presented for each time slot group 131.

As in a case of FIGS. 26 and 27, FIGS. 28 and 29 shows a case in which the presentation priority of the specific images 90 (image IDs "IMG0010 ID (U20)", "IMG0012 ID (U20)", "IMG0016 ID (U20)", . . . ) corresponding to the second user 17S of the user ID [U20] are set to the first place, and the presentation priority of the specific images 90 (image IDs "IMG0001 ID (U10)", "IMG0003 ID (U10)", "IMG0005 ID (U10)", . . . ) corresponding to the second user 17S of the user ID [U10] are set to the second place. In addition, a case is shown in which the specific images 90 of the image IDs "IMG0001 (U10)", "IMG0005 (U10)", . . . are classified into the first time slot group 131A, the specific images 90 of the image IDs "IMG0003 (U10)", "IMG0012 (U20)", . . . are classified into the second time slot group 131B, and the specific images 90 of the image IDs "IMG0010 (U20)", "IMG0016 (U20)", . . . are classified into the third time slot group 131C, respectively. Moreover, only the specific image 90 corresponding to the second user 17S of the user ID [U10] is classified into the first time slot group 131A. In this case, in the region 135A corresponding to the first time slot group 131A, as shown in FIG. 29, the specific images 90 corresponding to the second user 17S of the user ID [U10] (image IDs "IMG0001 (U10)" and "IMG0005 (U10)") of which the presentation priority is the second place, but the presentation priority is the highest in the first time slot group 131A are preferentially displayed. In addition, in the region 135B corresponding to the second time slot group 131B, the specific images 90 are displayed in the order of "IMG0012 (U20)" of which the presentation priority is the first place and "IMG0003 (U10)" of which the presentation priority is the second place. It should be noted that, in a case in which all the specific images 90 classified into one time slot group 131 have the same presentation priority as in the first time slot group 131A, for example, the images need only be displayed side by side in order from the oldest imaging date and time.

As described above, in a case in which the images 28SH are classified into the plurality of attribute groups (the subject group 121 and the time slot group 131) based on the attribute information of each of the plurality of images 28SH, and the image 28SH is presented for each attribute group, the first user 17F can more easily find the specific image 90 of his/her target.

In the aspect in which the attribute information is the subject shown in FIGS. 26 and 27, the first user 17F can easily find the specific image 90 including a target subject, such as his/her child, in the event, such as the sports day, in which an unspecified number of people are imaged as the subject. In the aspect in which the attribute information is the imaging date and time shown in FIGS. 28 and 29, it is possible to easily find, for example, the specific image 90 of a competition time slot in which his/her child participates, in the event, such as the sports day, in which the subject is changed each time slot.

It should be noted that the attribute information is not limited to the subject and the imaging date and time, which are shown. An imaging location may be adopted as the attribute information. In this case, for example, in the soccer match shown in FIG. 1, the specific images 90 are classified into location groups of the spectator seats 16 in which the second user 17S is located, such as a main stand, a back stand, and a side stand, and the specific image 90 is presented for each location group. In this way, the first user 17F can easily find, for example, the specific image 90 or the like in a location different from the spectator seat 16 in which he/she is located.

The images 28SH may be classified based on a plurality of pieces of attribute information, such as further classifying the subject group 121 into the time slot group 131. In addition, only the subject group 121 of one or more subjects designated by the user 17 may be displayed. Similarly, only the time slot group 131 of one or more time slots designated by the user 17 may be displayed.

Third Embodiment

Figure 30:
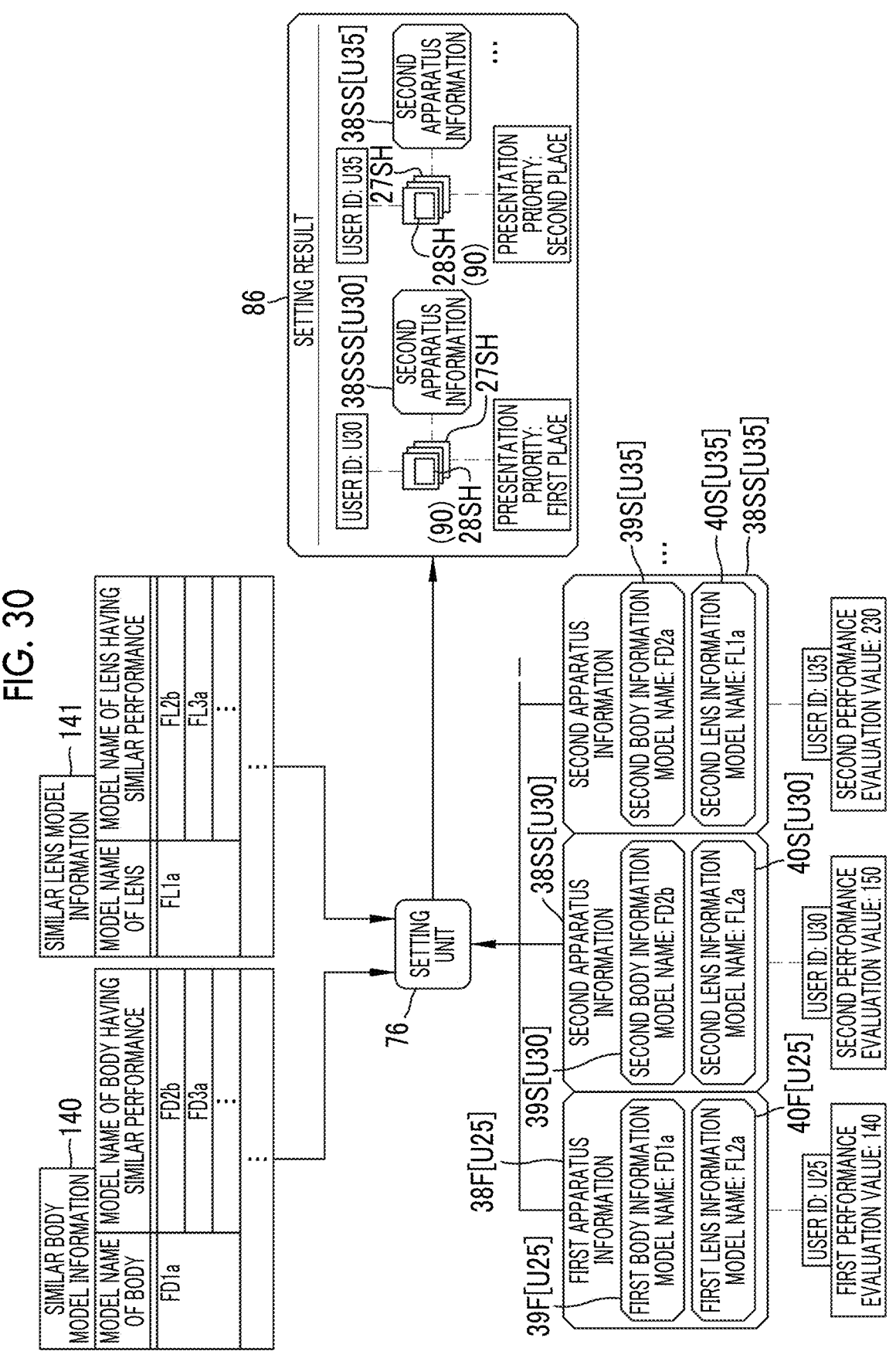
FIG. 30 is a diagram showing a third embodiment in which a presentation priority of the specific image of a second user corresponding to a second imaging apparatus having the second apparatus information, which matches or is similar to first apparatus information, is set to be higher than presentation priorities of other specific images.

In a third embodiment shown in FIG. 30, the presentation priority of the specific image 90 of the second user 17S corresponding to the second imaging apparatus 11S having the second apparatus information 38S, which matches or is similar to first apparatus information 38F, is set to be higher than presentation priorities of other specific images 90.

In FIG. 30, similar body model information 140 and similar lens model information 141 are given to the setting unit 76. In the similar body model information 140, the model name of the body having similar performance is registered for each model name of the body of the imaging apparatus 11. Similarly, in the similar lens model information 141, the model name of the lens having similar performance is registered for each model name of the lens. The similar body model information 140 and the similar lens model information 141 are stored in the storage device 55A, are read out from the storage device 55A by the RW control unit 73, and are output to the setting unit 76.

By using the similar body model information 140, the setting unit 76 determines whether or not a model that matches the model of the body of the first imaging apparatus 11F registered in the first body information 39F of the first apparatus information 38F or a model that has similar performance to the model is registered in the second body information 39S in the high performance second apparatus information 38SS. In addition, by using the similar lens model information 141, the setting unit 76 determines whether or not a model that matches the model of the lens registered in the first lens information 40F of the first apparatus information 38F or a model that has similar performance to the model is registered in the second lens information 40S in the high performance second apparatus information 38SS. That is, the setting unit 76 determines whether or not there is the high performance second apparatus information 38SS in which at least one of the model that matches the body of the first imaging apparatus 11F, the model that has similar performance to the body of the first imaging apparatus 11F, the model that matches the lens of the first imaging apparatus 11F, or the model that has similar performance to the lens of the first imaging apparatus 11F is registered (hereinafter, referred to as "specific second apparatus information 38SSS"). In a case in which there is the specific second apparatus information 38SSS, the setting unit 76 sets the presentation priority of the specific image 90 associated with the specific second apparatus information 38SSS to be higher than the presentation priorities of other specific images 90 associated with the high performance second apparatus information 38SS.

FIG. 30 shows a case in which the user 17 of the user ID [U25] is the first user 17F. In addition, FIG. 30 shows a case in which the users 17 of the user IDs [U30] and [U35] are the second user 17S, which is the second user 17S associated with the high performance second apparatus information 38SS. The first performance evaluation value derived by the first apparatus information 38F [U25] is 140, the second performance evaluation value derived by the second apparatus information 38S [U30] is 150, and the second performance evaluation value derived by the second apparatus information 38S [U35] is 230. Moreover, "FD1a" is registered in the model name of the first body information 39F [U25], and "FL2a" is registered in the model name of the first lens information 40F [U25], respectively. In addition, "FD2b" is registered in the model name of the second body information 39S [U30], and "FL2a" is registered in the model name of the second lens information 40S [U30], respectively. Further, "FD2a" is registered in the model name of the second body information 39S [U35], and "FL1a" is registered in the model name of the second lens information 40S [U35], respectively.

According to the similar body model information 140, the model name "FD2b" registered in the second body information 39S [U30] is similar in performance to the model name "FD1a" registered in the first body information 39F [U25]. In addition, the model name "FL2a" registered in the second lens information 40S [U30] matches the model name "FL2a" registered in the first lens information 40F [U25]. Therefore, the setting unit 76 determines the high performance second apparatus information 38SS [U30] as the specific second apparatus information 38SSS. On the other hand, in the high performance second apparatus information 38SS [U35], the model name of the second body information 39S [U35] and the model name of the second lens information 40S [U35] do not match the model names of the first body information 39F [U25] and the first lens information 40F [U25], and the performance is not similar, so that the setting unit 76 does not make a determination as the specific second apparatus information 38SSS.

The setting unit 76 sets the presentation priority of the specific image 90 associated with the specific second apparatus information 38SSS [U30] to the first place. In addition, the setting unit 76 sets the presentation priority of the specific image 90 associated with the high performance second apparatus information 38SS [U35] to the second place.

As described above, in the third embodiment, the presentation priority of the specific image 90 of the second user 17S corresponding to the second imaging apparatus 11S having the second apparatus information 38S, which matches or is similar to first apparatus information 38F, is set to be higher than presentation priorities of other specific images 90. Stated another way, the specific image 90 captured by the second imaging apparatus 11S having the performance, which matches or is similar to that of the first imaging apparatus 11F corresponding to the first user 17F, is preferentially presented to the first user 17F. Therefore, the specific image 90 having the image quality which matches or is similar to that of the image familiar to the first user 17F can be first shown to the first user 17F. In addition, it is possible to refer to a setting method of the imaging condition 37, an imaging composition, and the like without any resistance, as compared with the specific image 90 captured by the second imaging apparatus 11S of which the performance is different.

It should be noted that, in a case in which the specific second apparatus information 38SSS matching both the model of the body of the first imaging apparatus 11F and the model of the lens, and the specific second apparatus information 38SSS matching any one of the model of the body of the first imaging apparatus 11F or the model of the lens are mixed, the presentation priority of the specific image 90 associated with the former specific second apparatus information 38SSS may be set to be higher than that of the latter. Similarly, in a case in which the specific second apparatus information 38SSS matching at least any one of the model of the body of the first imaging apparatus 11F or the model of the lens, and the specific second apparatus information 38SSS similar to at least any one of the performance of the model of the body of the first imaging apparatus 11F or the performance of the model of the lens are mixed, the presentation priority of the specific image 90 associated with the former specific second apparatus information 38SSS may be set to be higher than that of the latter.

Fourth Embodiment

In the first embodiment, the performance evaluation value is derived by using the evaluation value table set 66, but the present disclosure is not limited to this. As in a fourth embodiment shown in FIGS. 31 to 36, the performance evaluation value obtained by integrating a plurality of evaluation items may be derived.

Figure 31:
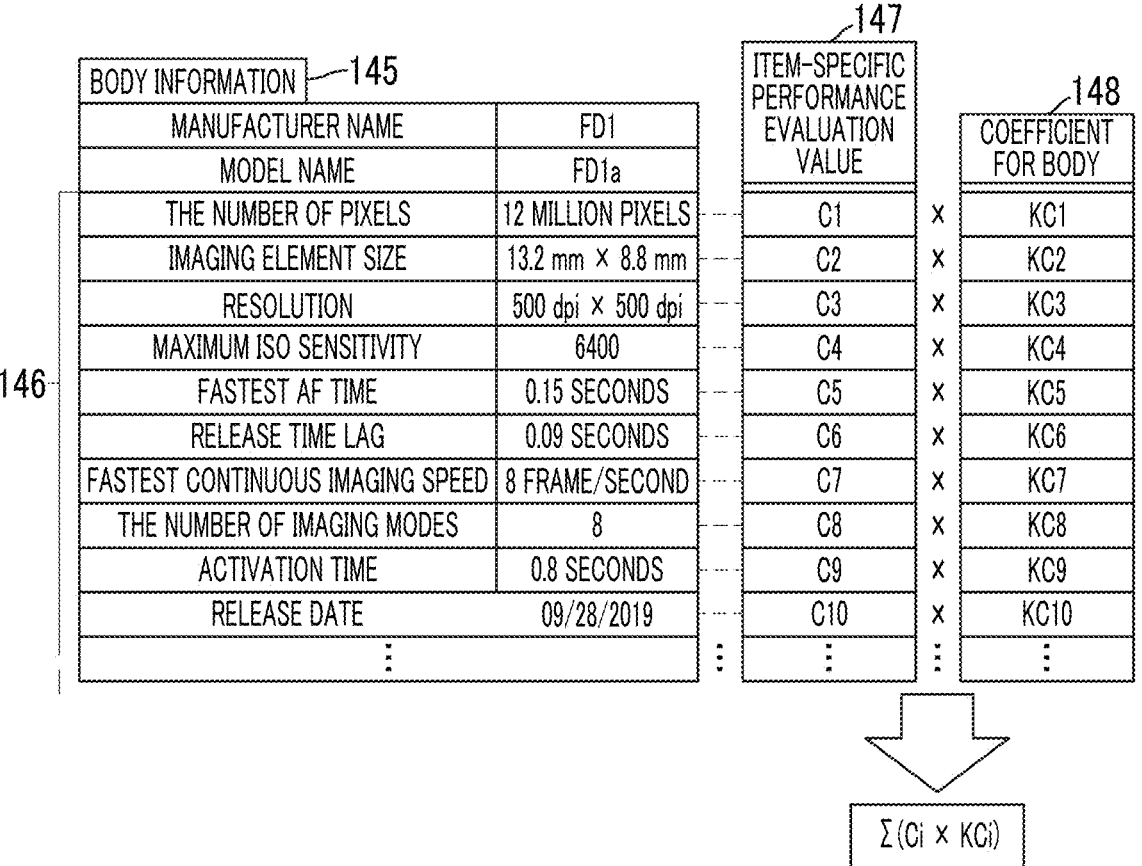
FIG. 31 is a diagram showing the body information according to a fourth embodiment.

In FIG. 31, body information 145 according to the present embodiment includes a plurality of evaluation items 146 representing the performance of the body of the imaging apparatus 11. The evaluation items 146 include the number of pixels, an imaging element size, maximum ISO sensitivity, a fastest auto focus (AF) time, a release time lag, a fastest continuous imaging speed, the number of imaging modes, an activation time, and a release date. As the number of pixels and the imaging element size, the number of pixels and the size of the imaging element built in the body of the imaging apparatus 11 are registered. As the maximum ISO sensitivity, the maximum value of the ISO sensitivity that can be set is registered. As the number of imaging modes, the total number of imaging modes that can be set is registered. The data registered in these evaluation items 146 include the data provided by the manufacturer of the body of the imaging apparatus 11, in addition to the data from the body information 39 of the image file 27S.

As shown in a table 147, the evaluation value derivation unit 74 derives an item-specific performance evaluation value Ci ($i=1, 2, 3, \ldots$, and M, M is the total number of the evaluation items 146) for each evaluation item 146. The evaluation value derivation unit 74 multiplies the derived item-specific performance evaluation value Ci by a coefficient for the body KCi shown in a table 148 to calculate the total sum $\Sigma(Ci \times KCi)$. It should be noted that the coefficient for the body KCi is an example of an "evaluation standard" according to the technology of the present disclosure.

Figure 32:
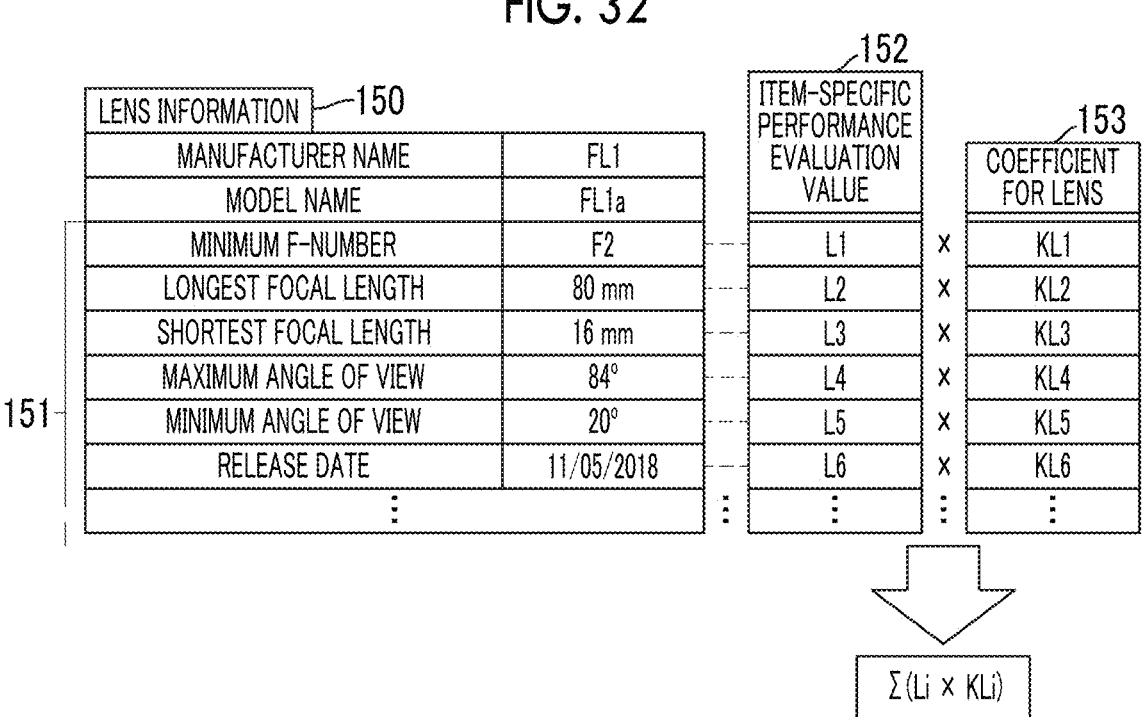
FIG. 32 is a diagram showing the lens information according to the fourth embodiment.

In FIG. 32, lens information 150 according to the present embodiment has a plurality of evaluation items 151 representing the performance of the lens. The evaluation items 151 include the minimum F-number, the longest focal length, the shortest focal length, the maximum angle of view, the minimum angle of view, the release date, and the like. The data registered in these evaluation items 151 includes the data provided by the lens manufacturer, in addition to the data from the lens information 40 of the image file 27S.

As in a case of the body information 145, the evaluation value derivation unit 74 derives an item-specific performance evaluation value Li ($i=1, 2, 3, \ldots$, and N, N is the total number of the evaluation items 151) for each evaluation item 151, as shown in a table 152. The evaluation value derivation unit 74 multiplies the derived item-specific performance evaluation value Li by a coefficient for the lens KLi shown in a table 153 to calculate the total sum $\Sigma(Li \times KLi)$. Moreover, the total sum $\Sigma(Li \times KLi)$ and the total sum $\Sigma(Ci \times KCi)$ calculated based on the evaluation items 146 are added to calculate the final performance evaluation value used for the specifying process by the specifying unit 75. That is, in a case in which the final performance evaluation value is Z, it is represented by Expression (1).

$$Z = \Sigma(Ci \times KCi) + \Sigma(Li \times KLi) \qquad (1)$$

It should be noted that the coefficient for the lens KLi is an example of an "evaluation standard" according to the technology of the present disclosure, like the coefficient for the body KCi.

FIG. 33 shows a state of calculating the total sum $\Sigma(Ci \times KCi)$ from first body information 145F. The evaluation value derivation unit 74 derives the item-specific performance evaluation value Ci by referring to an item-specific performance evaluation value table 155. The item-specific performance evaluation value table 155 is prepared for each evaluation item 146. In the item-specific performance evaluation value table 155, the item-specific performance evaluation value Ci is registered for each data registered in the evaluation item 146. For example, in an item-specific performance evaluation value table 155_1 of the pixel value, 3 as an item-specific performance evaluation value C1 in which the number of pixels is equal to or larger than 7.5 million pixels and less than 10 million pixels, 4 as the item-specific performance evaluation value C1 in which the number of pixels is equal to or larger than 10 million pixels and less than 12.5 million pixels, and the like are registered. In addition, in an item-specific performance evaluation value table 155_4 of the maximum ISO sensitivity, 3 as an item-specific performance evaluation value C4 in which the maximum ISO sensitivity is equal to or larger than 3200 and less than 6400, 4 as the item-specific performance evaluation value C4 in which the maximum ISO sensitivity is equal to or larger than 6400 and less than 12800, and the like are registered. The item-specific performance evaluation value table 155 is stored in the storage device 55A, is read out from the storage device 55A by the RW control unit 73, and is output to the evaluation value derivation unit 74. That is, the evaluation value derivation unit 74 derives the item-specific performance evaluation value Ci by comparing the data registered in each evaluation item 146 of the first body information 145F with a plurality of predetermined threshold values, and calculates the final first performance evaluation value based on the item-specific performance evaluation value Ci.

FIG. 33 shows a case in which the item-specific performance evaluation values C1=4, C2=2, C3=4, C4=4, and the like are derived. In addition, a case in which the coefficient for the body KCi=1 is set is shown. It should be noted that, although not shown, in a case of second body information 145S, the total sum $\Sigma(Ci \times KCi)$ is calculated in the same manner.

Figure 34:
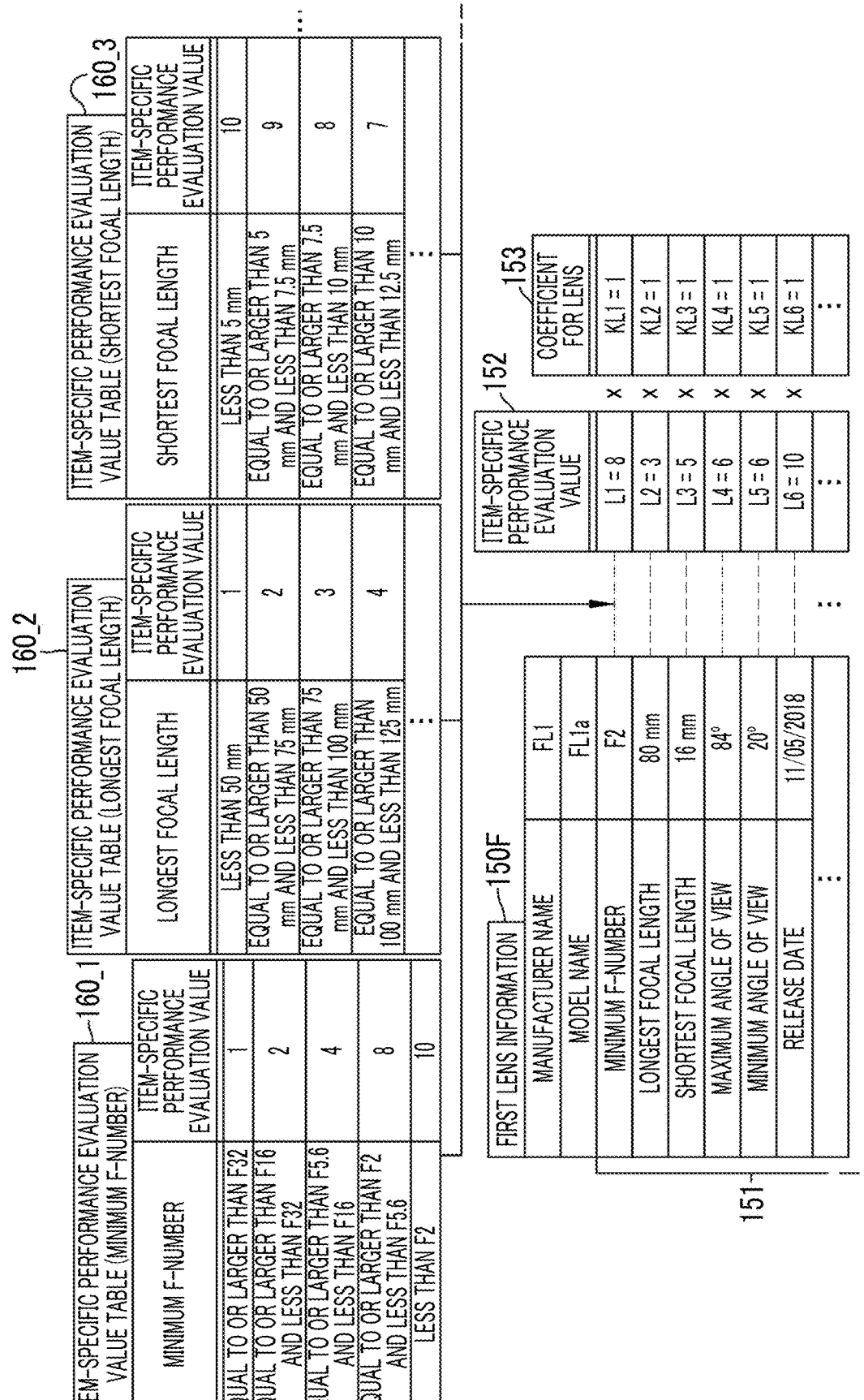
FIG. 34 is a diagram showing a state of calculating a total sum of products of the item-specific performance evaluation value and a coefficient for the lens from first lens information.

FIG. 34 shows a state of calculating the total sum $\Sigma(Li \times KLi)$ from first lens information 150F. The evaluation value derivation unit 74 derives the item-specific performance evaluation value Li by referring to an item-specific performance evaluation value table 160. The item-specific performance evaluation value table 160 is prepared for each evaluation item 151. In the item-specific performance evaluation value table 160, the item-specific performance evaluation value Li is registered for each data registered in the evaluation item 151. For example, in an item-specific performance evaluation value table 160_1 of the minimum F-number, 8 as an item-specific performance evaluation value L1 in which the minimum F-number is equal to or larger than F2 and less than F5.6, 10 as the item-specific performance evaluation value L1 in which the minimum F-number is less than F2, and the like are registered. In addition, in an item-specific performance evaluation value table 160_3 of the shortest focal length, 10 as an item-specific performance evaluation value L3 in which the shortest focal length is less than 5 mm, 9 as the item-specific performance evaluation value L3 in which the shortest focal length is equal to or larger than 5 mm and less than 7.5 mm, and the like are registered. The item-specific performance evaluation value table 160 is stored in the storage device 55A, is read out from the storage device 55A by the RW control unit 73, and is output to the evaluation value derivation unit 74. That is, the evaluation value derivation unit 74 derives the item-specific performance evaluation value Li by comparing the data registered in each evaluation item 151 of the first lens information 150F with a plurality of predetermined threshold values, and calculates the final first performance evaluation value based on the item-specific performance evaluation value.

FIG. 34 shows a case in which the item-specific performance evaluation values L1=8, L2=3, L3=5, L4=6, and the like are derived. In addition, a case in which the coefficient for the lens KLi=1 is set is shown. It should be noted that, although not shown, in a case of second lens information 150S, the total sum $\Sigma(Li \times KLi)$ is calculated in the same manner.

As described above, in the fourth embodiment, the evaluation value derivation unit 74 evaluates the performance of the imaging apparatus 11 for each of the plurality of evaluation items 146 and 151, and derives the performance evaluation value obtained by integrating the plurality of evaluation items 146 and 151. Therefore, it is possible to acquire the performance evaluation value that incorporates various characteristics of the imaging apparatus 11.

It should be noted that, in FIGS. 33 and 34, the coefficient for the body KCi and the coefficient for the lens KLi are both set to 1, but the present disclosure is not limited to this. As shown in FIGS. 35A to 35C, the coefficient for the body KCi and the coefficient for the lens KLi may be changed in accordance with the scene corresponding to the image 28SH of the recommendation designated shared folder 26SP. It should be noted that the scene corresponding to the image 28SH is determined by referring to the tag associated with the image 28SH, the image analysis result of the image 28SH, and the like.

FIG. 35A shows a case in which the scene corresponding to the image 28SH of the recommendation designated shared folder 26SP is sports, such as the sports day. In this case, the evaluation value derivation unit 74 sets a coefficient for the body KC7 related to the fastest continuous imaging speed to 2. The fastest continuous imaging speed is considered to be a particularly important evaluation item 146 in a sports scene in which the subject moves rapidly. Therefore, as described above, the setting is made to increase an item-specific performance evaluation value C7 of the fastest continuous imaging speed.

FIG. 35B shows a case in which the scene corresponding to the image 28SH of the recommendation designated shared folder 26SP is a dark place, such as indoors or at night. In this case, the evaluation value derivation unit 74 sets a coefficient for the body KC2 related to the imaging element size, a coefficient for the body KC4 related to the maximum ISO sensitivity, and a coefficient for the lens KL1 related to the minimum F-number to 2. The imaging element size, the maximum ISO sensitivity, and the minimum F-number are considered to be particularly important evaluation items 146 and 151 for imaging the subject brightly in the dark place in which the subject tends to be reflected dark. Therefore, as described above, the setting is made to increase the item-specific performance evaluation values C2, C4, and L1.

FIG. 35C shows a case in which the scene corresponding to the image 28SH of the recommendation designated shared folder 26SP is a landscape, such as a mountain range. In this case, the evaluation value derivation unit 74 sets a coefficient for the lens KL2 related to the longest focal length and a coefficient for the lens KL5 related to the minimum angle of view to 2. The longest focal length and the minimum angle of view are considered to be particularly important evaluation items 151 for imaging a distant landscape with the angle of view as large as possible. Therefore, as described above, the setting is made to increase the item-specific performance evaluation values L2 and L5.

As described above, by changing the coefficient for the body KCi and the coefficient for the lens KLi in accordance with the scene corresponding to the image 28SH of the recommendation designated shared folder 26SP, the performance evaluation value suitable for the scene corresponding to the image 28SH can be derived. As a result, it is possible to preferentially present the specific image 90 suitable for the scene corresponding to the image 28SH.

It should be noted that, instead of setting the coefficient for the body KCi and the coefficient for the lens KLi related to the evaluation items 146 and 151 that are regarded as important in each scene to values equal to or larger than 1, the coefficient for the body KCi and the coefficient for the lens KLi related to the evaluation items 146 and 151 that are not regarded as important in each scene may be set to values less than 1.

FIGS. 35A to 35C show the aspect in which the coefficient for the body KCi and the coefficient for the lens KLi are changed in accordance with the scene corresponding to the image 28SH of the recommendation designated shared folder 26SP, but the present disclosure is not limited to this. As shown in FIG. 36, the evaluation items 146 and 151 used for deriving the performance evaluation value may be changed in accordance with the scene corresponding to the image 28SH of the recommendation designated shared folder 26SP.

FIG. 36 shows a case in which the scene corresponding to the image 28SH of the recommendation designated shared folder 26SP is sports, such as the sports day. In this case, the evaluation value derivation unit 74 derives only the item-specific performance evaluation values C5, C6, C7, and C9 of the fastest AF time, the release time lag, the fastest continuous imaging speed, and the activation time. It should be noted that the scene corresponding to the image 28SH may be input by the user 17, or may be input by the image distribution server 10 by performing an image analysis process on the image 28SH.

As described above, by changing the evaluation items 146 and 151 used for deriving the performance evaluation value in accordance with the scene corresponding to the image 28SH of the recommendation designated shared folder 26SP, the performance evaluation value suitable for the scene corresponding to the image 28SH can also be derived. In addition, as a result, it is possible to preferentially present the specific image 90 suitable for the scene corresponding to the image 28SH.

Fifth Embodiment

In the first embodiment, the first performance evaluation value is derived based only on the first apparatus information 38F of the first imaging apparatus 11F associated with the image 28SH, and derives the second performance evaluation value based only on the second apparatus information 38S of the second imaging apparatus 11S associated with the image 28SH, but the present disclosure is not limited to this. The first performance evaluation value and the second performance evaluation value may be derived as in a fifth embodiment shown in FIGS. 37 to 40.

Figure 37:
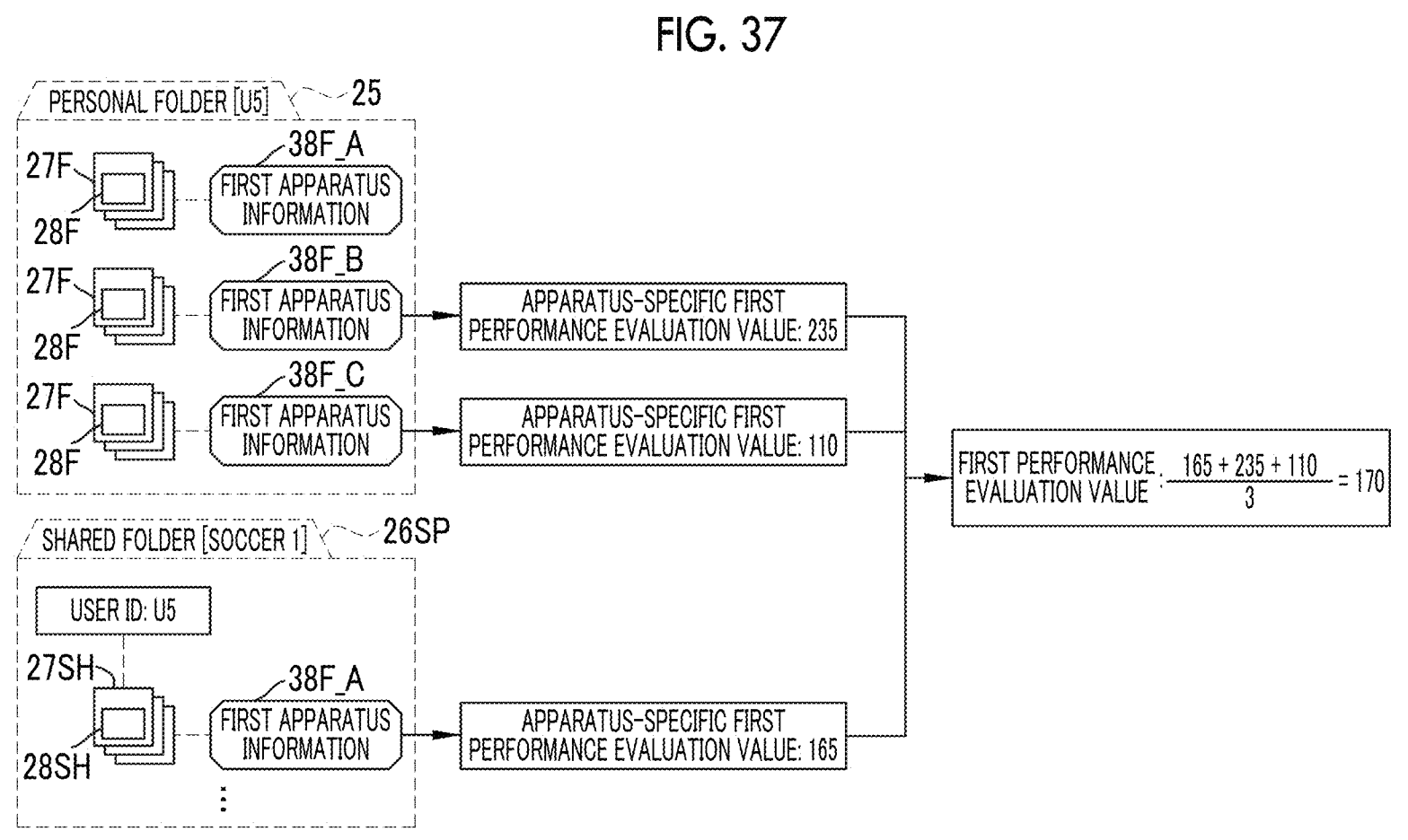

In FIG. 37, the evaluation value derivation unit 74 derives an apparatus-specific first performance evaluation value for each of a plurality of pieces of the first apparatus information 38F associated with the image 28F of the image file 27F stored in the personal folder 25 of the first user 17F, in addition to the first apparatus information 38F of the first imaging apparatus 11F associated with the image 28SH. The evaluation value derivation unit 74 calculates the average value of the derived apparatus-specific first performance evaluation values, and uses the calculated average value used for the specifying process by the specifying unit 75. The average value of the apparatus-specific first performance evaluation values is, so to speak, the average value of the performance of the plurality of first imaging apparatuses 11F corresponding to the first user 17F. The image 28F is an example of a "first user image" according to the technology of the present disclosure. It should be noted that, as a derivation method of the apparatus-specific first performance evaluation value, a method using the evaluation value table set 66 according to the first embodiment may be adopted, or a method of evaluating the performance for each of the plurality of evaluation items 146 and 151 according to the fourth embodiment may be adopted.

FIG. 37 shows a state of deriving the first performance evaluation value is derived for the first user 17F of the user ID [U5]. In the personal folder 25, the image 28F associated with three pieces of the first apparatus information 38F of first apparatus information 38F_A, 38F_B, and 38F_C are stored. The evaluation value derivation unit 74 derives 165 as the apparatus-specific first performance evaluation value based on the first apparatus information 38F_A. In addition, the evaluation value derivation unit 74 derives 235 as the apparatus-specific first performance evaluation value based on the first apparatus information 38F_B. Further, the evaluation value derivation unit 74 derives 110 as the apparatus-specific first performance evaluation value based on the first apparatus information 38F_C. Moreover, the average value of 170 of the apparatus-specific first performance evaluation values is calculated and used as the final first performance evaluation value.

In FIG. 38, as in a case of the first user 17F, the evaluation value derivation unit 74 derives an apparatus-specific second performance evaluation value for each of a plurality of pieces of the second apparatus information 38S associated with the image 28S of the image file 27S stored in the personal folder 25 of the second user 17S, in addition to the second apparatus information 38S of the second imaging apparatus 11S associated with the image 28SH. The evaluation value derivation unit 74 calculates the average value of the derived apparatus-specific second performance evaluation values, and uses the calculated average value as the final second performance evaluation value used for the specifying process by the specifying unit 75. The average value of the apparatus-specific second performance evaluation value is, so to speak, the average value of the performance of the plurality of second imaging apparatuses 11S corresponding to the second user 17S. The image 28S is an example of a "second user image" according to the technology of the present disclosure. It should be noted that, as a derivation method of the apparatus-specific second performance evaluation value, the method according to the first embodiment may be adopted, or the method according to the fourth embodiment may be adopted, as in a case of the apparatus-specific first performance evaluation value.

FIG. 38 shows a state of deriving the second performance evaluation value for the second user 17S of the user ID [U20]. The personal folder 25 stores the image 28S associated with four pieces of the second apparatus information 38S of the second apparatus information 38S_A, 38S_B, 38S_C, and 38S_D. The evaluation value derivation unit 74 derives 230 as the apparatus-specific second performance evaluation value based on the second apparatus information 38S_A. In addition, the evaluation value derivation unit 74 derives 200 as the apparatus-specific second performance evaluation value based on the second apparatus information 38S_B. Further, the evaluation value derivation unit 74 derives 260 as the apparatus-specific second performance evaluation value based on the second apparatus information 38S_C. Further, the evaluation value derivation unit 74 derives 110 as the apparatus-specific second performance evaluation value based on the second apparatus information 38S_D. Moreover, the average value of 200 of these apparatus-specific second performance evaluation values is calculated and used as the final second performance evaluation value.

As described above, in the fifth embodiment, the evaluation value derivation unit 74 derives the first performance evaluation value based on the first apparatus information 38F associated with the image 28F associated with the first user 17F, which is the image 28F other than the image 28SH, in addition to the first apparatus information 38F associated with the image 28SH. In addition, the evaluation value derivation unit 74 derives the second performance evaluation value based on the second apparatus information 38S associated with the image 28S associated with the second user 17S, which is the image 28S other than the image 28SH, in addition to the second apparatus information 38S associated with the image 28SH. Therefore, it is possible to acquire the performance evaluation value obtained by integrating the performance of the plurality of imaging apparatuses 11 corresponding to the user 17, in addition to the imaging apparatus 11 used for the imaging at the event.

It should be noted that, in FIG. 37, the apparatus-specific first performance evaluation value is derived for each of the plurality of first apparatus information 38F associated with the image 28F, but the present disclosure is not limited to this. As shown in FIG. 39, the first apparatus information 38F for which the apparatus-specific first performance evaluation value is derived may be selected.

In FIG. 39, the evaluation value derivation unit 74 selects a first type of the first imaging apparatus 11F that satisfies a predetermined first selection condition 165 from among a plurality of types of the first imaging apparatuses 11F. The evaluation value derivation unit 74 calculates the average value of the apparatus-specific first performance evaluation values of the selected first type of the first imaging apparatus 11F, and uses the calculated average value as the final first performance evaluation value used for the specifying process by the specifying unit 75.

The first selection condition 165 is a content that the first imaging apparatus 11F of which a usage frequency is equal to or higher than a predetermined first setting frequency is selected. Specifically, the first selection condition 165 is a content that the first imaging apparatus 11F of which the captured number of the images 28F is equal to or larger than 50 and the number of usage days is equal to or larger than 5 days is selected. In this case, the evaluation value derivation unit 74 counts the captured number of the images 28F for each first imaging apparatus 11F (first apparatus information 38F). In addition, the evaluation value derivation unit 74 calculates the number of usage days from the imaging date and time associated with the image 28F for each first imaging apparatus 11F (first apparatus information 38F). Moreover, the first imaging apparatus 11F (first apparatus information 38F) of which the captured number is equal to or larger than 50 and the number of usage days is equal to or larger than 5 days is selected as the first type of the first imaging apparatus 11F. On the contrary, the first imaging apparatus 11F of which the captured number is less than 50 and/or the first imaging apparatus 11F of which the number of usage days is less than 5 days is not selected. It should be noted that the captured number of the image 28F and the number of usage days of the first imaging apparatus 11F are examples of a "usage frequency" according to the technology of the present disclosure. In addition, 50 of the captured number and 5 days of the number of usage days are examples of a "first setting frequency" according to the technology of the present disclosure. It should be noted that the usage frequency and the first setting frequency are set based on the captured number and the number of usage days, but the present disclosure is not limited to this. The usage frequency and the first setting frequency may be set based on any one of the captured number or the number of usage days.

FIG. 39 shows a case in which the number of usage days of a first imaging apparatus 11F_B (not shown) related to the first apparatus information 38F_B in the first apparatus information 38F_A, 38F_B, and 38F_C is 1 day. In this case, the evaluation value derivation unit 74 selects the first imaging apparatus 11F_A (not shown) related to the first apparatus information 38F_A and the first imaging apparatus 11F_C (not shown) related to the first apparatus information 38F_C as the first type of the first imaging apparatus 11F. On the other hand, the evaluation value derivation unit 74 does not select the first imaging apparatus 11F_B as the first type of the first imaging apparatus 11F. Therefore, the evaluation value derivation unit 74 derives the apparatus-specific first performance evaluation value based on the first apparatus information 38F_A and 38F_C, but does not derive the apparatus-specific first performance evaluation value based on the first apparatus information 38F_B. The evaluation value derivation unit 74 derives the average value of 137.5 of 165 which is the apparatus-specific first performance evaluation value derived based on the first apparatus information 38F_A and 110 which is the apparatus-specific first performance evaluation value derived based on the first apparatus information 38F_C, as the final first performance evaluation value.

As described above, in the aspect shown in FIG. 39, the first type of the first imaging apparatus 11F that satisfies the predetermined first selection condition 165 is selected from among the plurality of types of the first imaging apparatuses 11F, and the first performance evaluation value is derived based on the first apparatus information 38F of the first type of the first imaging apparatus 11F. Therefore, it is possible to secure the reliability of the first performance evaluation value.

The first selection condition 165 is the content that the first imaging apparatus 11F of which the usage frequency is equal to or higher than the predetermined first setting frequency is selected. Therefore, the performance of the first imaging apparatus 11F temporarily used, such as the first imaging apparatus 11F borrowed by using the rental service or the first imaging apparatus 11F borrowed from an acquaintance, can be prevented from being reflected in the first performance evaluation value.

Figure 40:
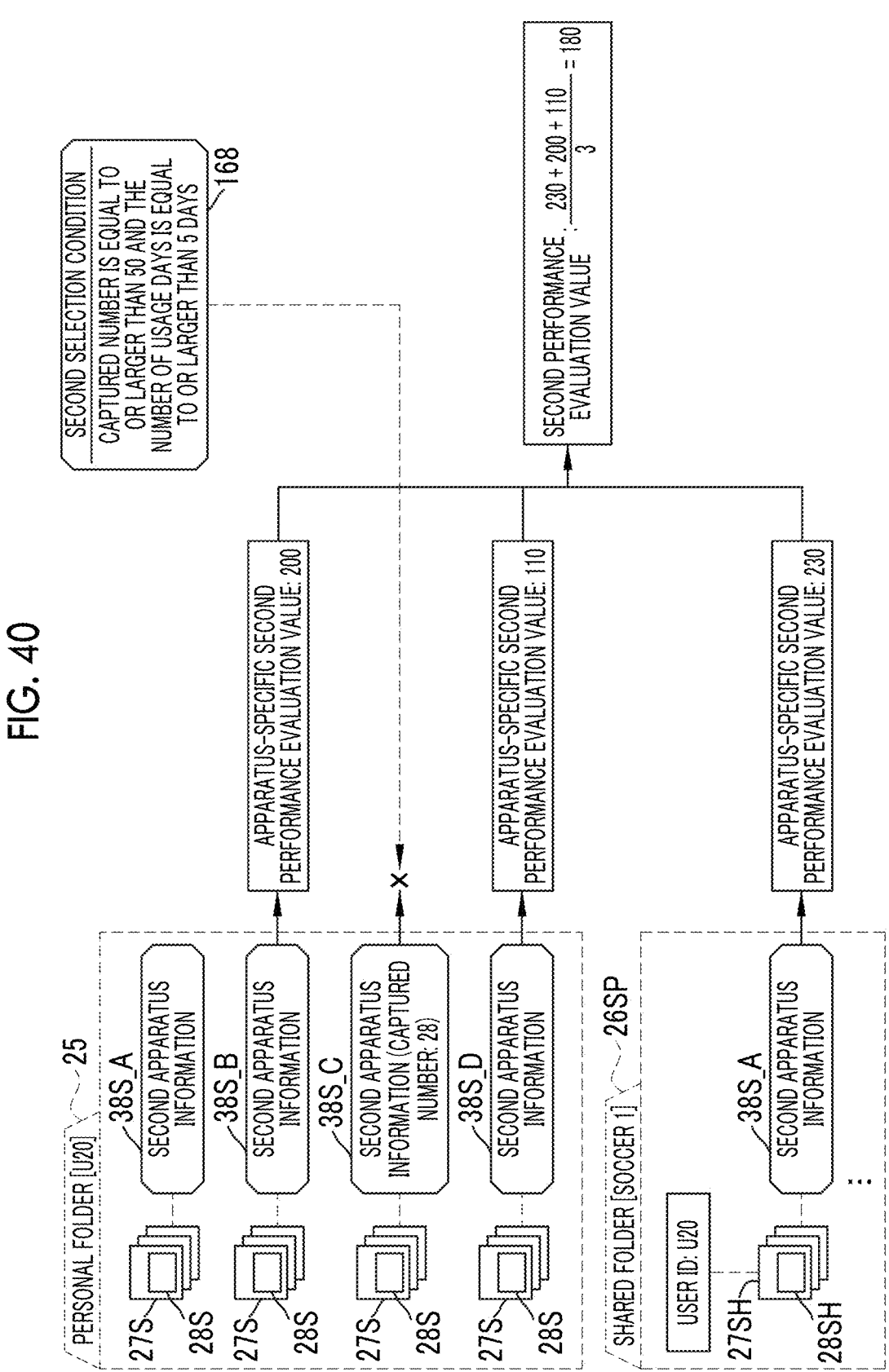
FIG. 40 is a diagram showing an aspect in which a second type of the second imaging apparatus that satisfies a predetermined second selection condition is selected from a plurality of types of the second imaging apparatuses.

Similarly, in FIG. 38, the apparatus-specific second performance evaluation value is derived for each of the plurality of pieces of the second apparatus information 38S associated with the image 28S, but the present disclosure is not limited to this. As shown in FIG. 40, the second apparatus information 38S for which the apparatus-specific second performance evaluation value is derived may be selected.

In FIG. 40, the evaluation value derivation unit 74 selects a second type of the second imaging apparatus 11S that satisfies a predetermined second selection condition 168 from among a plurality of types of the second imaging apparatuses 11S. The evaluation value derivation unit 74 calculates the average value of the apparatus-specific second performance evaluation values of the selected second type of the second imaging apparatus 11S, and uses the calculated average value as the final second performance evaluation value used for the specifying process by the specifying unit 75.

The second selection condition 168 is a content that the second imaging apparatus 11S of which a usage frequency is equal to or higher than a predetermined second setting frequency is selected. Specifically, the second selection condition 168 is a content that the second imaging apparatus 11S of which the captured number of the images 28S is equal to or larger than 50 and the number of usage days is equal to or larger than 5 days is selected. In this case, the evaluation value derivation unit 74 counts the captured number of the images 28S for each second imaging apparatus 11S (second apparatus information 38S). In addition, the evaluation value derivation unit 74 calculates the number of usage days from the imaging date and time associated with the image 28S for each second imaging apparatus 11S (second apparatus information 38S). Moreover, the second imaging apparatus 11S (second apparatus information 38S) of which the captured number is equal to or larger than 50 and the number of usage days is equal to or larger than 5 days is selected as the second type of the second imaging apparatus 11S. On the contrary, the second imaging apparatus 11S of which the captured number is less than 50 and/or the second imaging apparatus 11S of which the number of usage days is less than 5 days is not selected. It should be noted that the captured number of the image 28S and the number of usage days of the second imaging apparatus 11S are examples of a "usage frequency" according to the technology of the present disclosure. In addition, 50 of the captured number and 5 days of the number of usage days are examples of a "second setting frequency" according to the technology of the present disclosure. It should be noted that the usage frequency and the second setting frequency are set based on the captured number and the number of usage days, but the present disclosure is not limited to this. The usage frequency and the second setting frequency may be set based on only one of the captured number or the number of usage days.

FIG. 40 shows a case in which the captured number is 28 of a second imaging apparatus 11S_C (not shown) related to the second apparatus information 38S_C among the second apparatus information 38S_A, 38S_B, 38S_C, and 38S_D. In this case, the evaluation value derivation unit 74 selects a second imaging apparatus 11S_A (not shown) related to the second apparatus information 38S_A, a second imaging apparatus 11S_B (not shown) related to the second apparatus information 38S_B, and a second imaging apparatus 11S_D (not shown) related to the second apparatus information 38S_D, as the second type of the second imaging apparatus 11S. On the other hand, the evaluation value derivation unit 74 does not select a second imaging apparatus 11S_C as the second type of the second imaging apparatus 11S. Therefore, the evaluation value derivation unit 74 derives the apparatus-specific second performance evaluation value based on the second apparatus information 38S_A, 38S_B, and 38S_D, but does not derive the apparatus-specific second performance evaluation value based on the second apparatus information 38S_C. The evaluation value derivation unit 74 derives the average value of 180 of 230 which is the apparatus-specific second performance evaluation value derived based on the second apparatus information 38S_A, 200 which is the apparatus-specific second performance evaluation value derived based on the second apparatus information 38S_B, and 110 which is the apparatus-specific second performance evaluation value derived based on the second apparatus information 38S_D, as the final second performance evaluation value.

As described above, in the aspect shown in FIG. 40, the second type of the second imaging apparatus 11S that satisfies the predetermined second selection condition 168 is selected from among the plurality of types of the second imaging apparatuses 11S, and the second performance evaluation value is derived based on the second apparatus information 38S of the second type of the second imaging apparatus 11S. Therefore, as in a case of FIG. 39, it is possible to secure the reliability of the second performance evaluation value.

The second selection condition 168 is the content that the second imaging apparatus 11S of which the usage frequency is equal to or higher than the predetermined second setting frequency is selected. Therefore, as in a case of FIG. 39, the performance of the second imaging apparatus 11S temporarily used can be prevented from being reflected in the second performance evaluation value.

Sixth Embodiment

Figure 41:
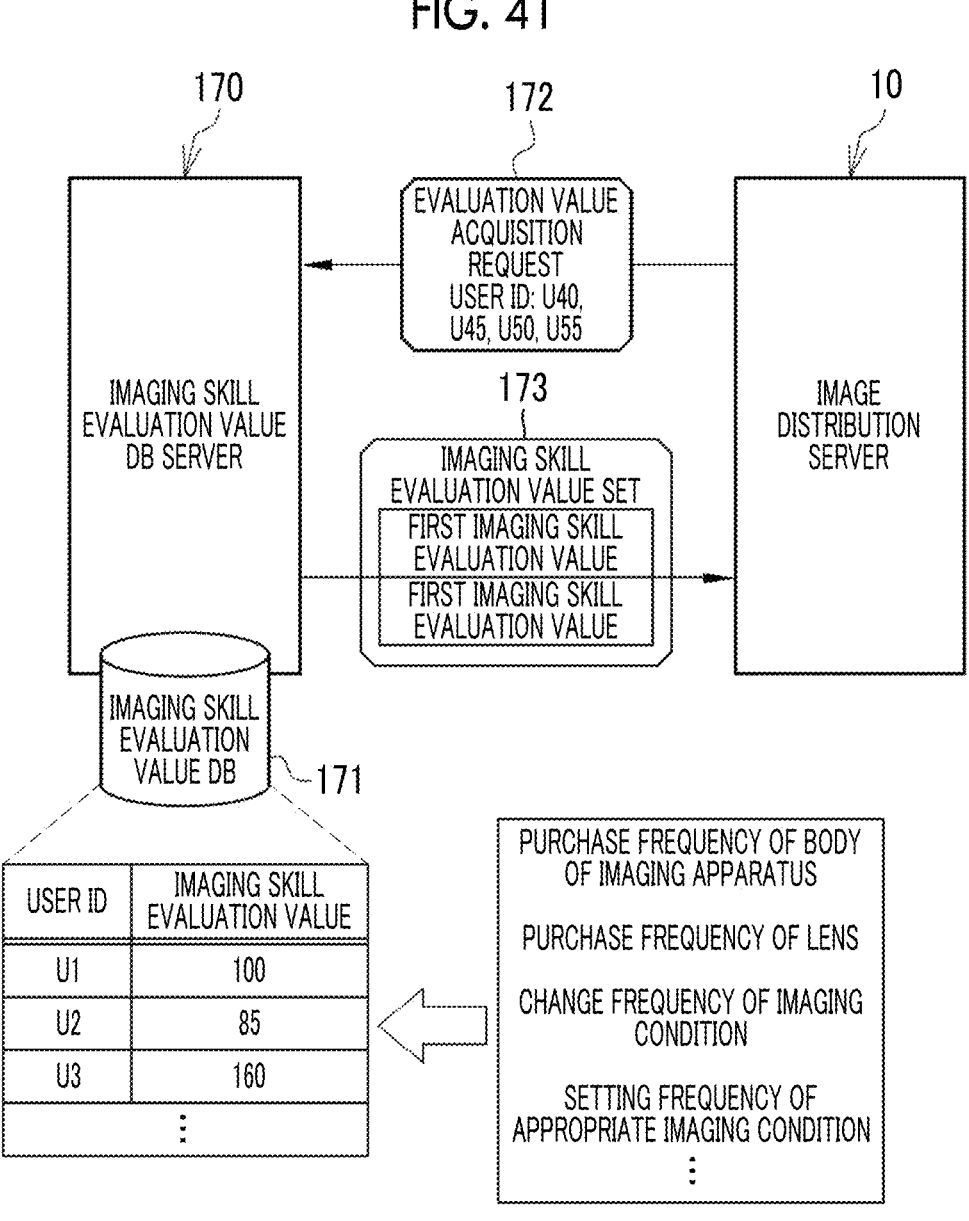
FIG. 41 is a diagram showing the information transmitted and received between the image distribution server and the user terminal according to a sixth embodiment.
Figure 42:
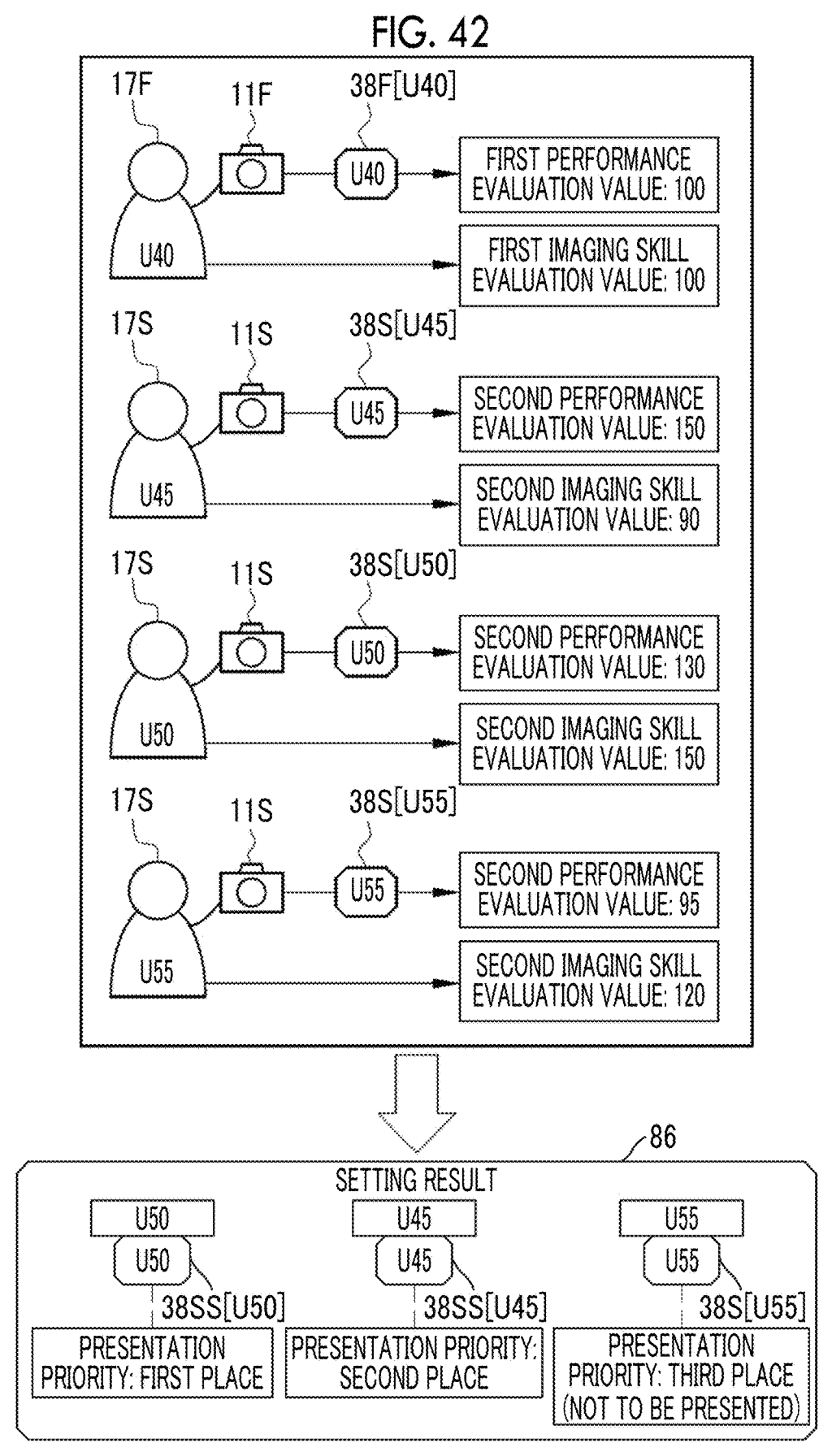

In a sixth embodiment shown in FIGS. 41 and 42, the presentation priority is set in consideration of an imaging skill evaluation value related to the imaging skill of the user 17, in addition to the performance evaluation value.

In FIG. 41, in the sixth embodiment, an imaging skill evaluation value DB server 170 is provided. The imaging skill evaluation value DB server 170 includes an imaging skill evaluation value DB 171. In the imaging skill evaluation value DB 171, the imaging skill evaluation value related to the imaging skill of each user 17 is registered for each user ID. The imaging skill evaluation value is derived based on the image file 27 in the personal folder 25 of each user 17. Specifically, the imaging skill evaluation value is derived based on the plurality of evaluation items, such as a purchase frequency of the body of the imaging apparatus 11, a purchase frequency of the lens, a change frequency of the imaging condition 37, and a setting frequency of the appropriate imaging condition 37.

The purchase frequency of the body of the imaging apparatus 11 can be recognized by following the transition of the model name of the body information 39. Similarly, the purchase frequency of the lens can be recognized by following the transition of the model name of the lens information 40. In addition, the change frequency of the imaging condition 37 can also be recognized by following the transition of the imaging condition 37. It is considered that the user 17 who has a higher purchase frequency of the body of the imaging apparatus 11, a higher purchase frequency of the lens, and a higher change frequency of the imaging condition 37 is more enthusiastic about the imaging and is familiar with the handling of the body and the lens of the imaging apparatus 11. Therefore, for the user 17 who has a higher purchase frequency of the body of the imaging apparatus 11, a higher purchase frequency of the lens, and a higher change frequency of the imaging condition 37, a higher imaging skill evaluation value is derived.

The setting frequency of the appropriate imaging condition 37 is derived as follows. First, the image 28 is subjected to the image analysis. Moreover, it is determined whether or not the set imaging condition 37 is appropriate for the image analysis result obtained in this way. For example, in a case in which the image analysis result indicates that the scene corresponding to the image 28 is sports, in a case in which the sports mode is set as the imaging mode, it is determined that the imaging condition 37 is appropriate. In addition, for example, in a case in which the image analysis result indicates that the scene corresponding to the image 28 is the dark place, in a case in which the ISO sensitivity equal to or larger than 1600 is set, it is determined that the imaging condition 37 is appropriate. Further, for example, in a case in which the subject of the image 28 is a face of a person and the image analysis result indicates that the face is in focus and the background is out of focus, in a case in which the subject distance is within 2 m, the F-number is equal to or less than F4, the focal length is equal to or larger than 100 mm, and an aperture priority mode is set, it is determined that the imaging condition 37 is appropriate. It is considered that the user 17 who has higher setting frequency of the appropriate imaging condition 37 has more abundant knowledge about what kind of the imaging condition 37 should be set to capture what kind of the image 28. Therefore, for the user 17 who has a higher setting frequency of the appropriate imaging condition 37, a higher imaging skill evaluation value is derived.

The image distribution server 10 transmits an evaluation value acquisition request 172 to the imaging skill evaluation value DB server 170 prior to the setting process in the setting unit 76. The evaluation value acquisition request 172 includes the user IDs of the first user 17F and the second user 17S registered in the recommendation designated shared folder 26SP. The imaging skill evaluation value DB server 170 reads out the imaging skill evaluation value associated with the user ID of the evaluation value acquisition request 172 from the imaging skill evaluation value DB 171 and transmits the read out imaging skill evaluation value to the image distribution server 10. Here, the imaging skill evaluation value includes a first imaging skill evaluation value which is the imaging skill evaluation value of the first user 17F and a second imaging skill evaluation value which is the imaging skill evaluation value of the second user 17S. The imaging skill evaluation value DB server 170 transmits an imaging skill evaluation value set 173 including a set of the first imaging skill evaluation value and the second imaging skill evaluation value to the image distribution server 10.

The image distribution server 10 receives the imaging skill evaluation value set 173 from the imaging skill evaluation value DB server 170. The setting unit 76 sets presentation priority based on the first imaging skill evaluation value and the second imaging skill evaluation value of the imaging skill evaluation value set 173.

FIG. 42 shows an example of setting the presentation priority based on the first imaging skill evaluation value and the second imaging skill evaluation value. In FIG. 42, the user 17 of the user ID [U40] is the first user 17F, and the users 17 of the user IDs [U45], [U50], and [U55] are the second user 17S. Moreover, the first imaging skill evaluation value of the first user 17F is 100, the second imaging skill evaluation value of the second user 17S of the user ID [U45] is 90, the second imaging skill evaluation value of the second user 17S of the user ID [U50] is 150, and the second imaging skill evaluation value of the second user 17S of the user ID [U55] is 120. In addition, the first performance evaluation value derived based on the first apparatus information 38F [U40] is 100, the second performance evaluation value derived based on the second apparatus information 38S [U45] is 150, the second performance evaluation value derived based on the second apparatus information 38S [U50] is 130, and the second performance evaluation value derived based on the second apparatus information 38S [U55] is 95. In this case, the specifying unit 75 specifies the second apparatus information 38S [U45] having the second performance evaluation value of 150 and the second apparatus information 38S [U50] having the second performance evaluation value of 130, as the high performance second apparatus information 38SS.

From the high and low of the second performance evaluation value, the presentation priority of the specific image 90 associated with the high performance second apparatus information 38SS [U45] is set to be higher than the presentation priority of the specific image 90 associated with the high performance second apparatus information 38SS [U50]. However, in the present embodiment, the setting unit 76 sets, to the first place, the presentation priority of the specific image 90 associated with the high performance second apparatus information 38SS [U50] related to the second user 17S of the user ID [U50] in which the second imaging skill evaluation value is 150, which is equal to or larger than the first imaging skill evaluation value. Moreover, the setting unit 76 sets, to the second place, the presentation priority of the specific image 90 associated with the second apparatus information 38S [U45] related to the second user 17S of the user ID [U45] in which the second imaging skill evaluation value is 90, which is less than the first imaging skill evaluation value. In addition, the setting unit 76 sets the presentation priority of the image 28SH associated with the second apparatus information 38S [U55] to the third place, and sets the image 28SH not to be presented.

As described above, in the sixth embodiment, the first imaging skill evaluation value related to the imaging skill of the first user 17F and the second imaging skill evaluation value related to the imaging skill of the second user 17S are acquired, and the presentation priority is set also in consideration of the first imaging skill evaluation value and the second imaging skill evaluation value. Therefore, the specific image 90 captured by the second user 17S having the imaging skill equal to or higher than the first user 17F by using the second imaging apparatus 11S having the performance equal to or higher than the first imaging apparatus 11F can be preferentially presented to the first user 17F.

It should be noted that, in a case in which a difference between the first performance evaluation value and the second performance evaluation value is equal to or larger than a predetermined threshold value, the presentation priority may be set without taking into consideration for the first imaging skill evaluation value and the second imaging skill evaluation value.

In a case in which all the derived second performance evaluation values are equal to or larger than the first performance evaluation value, all the images 28SH other than the image 28SH associated with the first user 17F are the specific images 90. In this case, all the specific images 90 may be presented to the first user 17F as the recommended images, or the specific images 90 of which the presentation priority is within a predetermined threshold value (for example, the third place) may be presented to the first user 17F as the recommended image.

In each of the embodiments described above, in a case in which the recommended image distribution request 46 is received by the request reception unit 70, the classification process by the classification unit 72, the evaluation value derivation process by the evaluation value derivation unit 74, the specifying process by the specifying unit 75, and the setting process by the setting unit 76 are executed to distribute the recommended image information 47 to the user terminal 12, but the present disclosure is not limited to this. In a case in which the first user 17F performs an operation of viewing the image 28SH of the shared folder 26 on the user terminal 12, the various processes described above may be executed to distribute the recommended image information 47 to the user terminal 12. In this case, the image 28SH associated with the second apparatus information 38S of the second imaging apparatus 11S having the second performance evaluation value less than the first performance evaluation value may set to a low presentation priority, and then presented to the first user 17F. In addition, the image 28SH associated with the first user 17F may be presented to the first user 17F after setting the presentation priority to the lowest.

In the first embodiment, the specific images 90 are rearranged in accordance with the presentation priority and displayed, but the present disclosure is not limited to this. Similar to the recommended image display screen 180 shown in FIG. 42, the specific image 90 and the image 28SH are displayed in a list without rearrangement in accordance with the presentation priority, and display aspects of the specific image 90 and the images other than the specific image 90 may be changed. For example, the mark 112 may be added only to the specific image 90. It should be noted that the change in the display aspect is not limited to this, and a display size of the specific image 90 on the recommended image display screen may be made larger than the display size of the image 28SH other than the specific image 90.

The performance evaluation value may be a stepwise level. Similarly, the imaging skill evaluation value may be a stepwise level.

Among the plurality of users 17 constituting the user group 30, there may be the user 17 who does not store the image file 27SH in the shared folder 26 but has the access authority to the shared folder 26. It should be noted that, for the first user 17F who does not store the image file 27SH in the shared folder 26, the first performance evaluation value is acquired by using the first apparatus information 38F associated with the image 28F of the image file 27F stored in the personal folder 25 of the first user 17F.

The image 28SH captured by the second user 17S during the important period regarded as important by the first user 17F in the event may be presented as the recommended image. In this case, the presentation priority of the image 28SH captured by the second user 17S during the important period need only be set in accordance with the performance evaluation value.

A hardware configuration of the computer constituting the image distribution server 10 can be modified in various ways. For example, the image distribution server 10 can be composed of a plurality of computers separated as hardware for the purpose of improving process ability and reliability. For example, the functions of the request reception unit 70, the image acquisition unit 71, and the distribution control unit 77, and the functions of the classification unit 72, the RW control unit 73, the evaluation value derivation unit 74, the specifying unit 75, and the setting unit 76 are distributed to and carried out by two computers. In this case, the image distribution server 10 is composed of two computers.

As described above, the hardware configuration of the computer of the image distribution server 10 can be appropriately changed in accordance with the required performance, such as the process ability, the safety, and the reliability. Further, in addition to the hardware, an application program, such as the operation program 65, can be duplicated or distributed and stored in a plurality of storage devices for the purpose of securing the safety and the reliability.

The user terminal 12 may carry out a part or all of the functions of each processing unit of the image distribution server 10.

In each of the embodiments described above, for example, as a hardware structure of processing units, which execute various processes, such as the request reception unit 70, the image acquisition unit 71, the classification unit 72, the RW control unit 73, the evaluation value derivation unit 74, the specifying unit 75, the setting unit 76, the distribution control unit 77, and the image classification units 120 and 130, the following various processors can be used. The various processors include a programmable logic device (PLD), which is a processor of which a circuit configuration is changeable after manufacturing, such as a field programmable gate array (FPGA), and/or a dedicated electric circuit, which is a processor having a circuit configuration designed for executing a specific process, such as an application specific integrated circuit (ASIC), in addition to the CPU, which is a general-purpose processor that executes the software (the operation program 65) to function as various processing units.

One processing unit may be composed of one of various processors described above or may be composed of a combination of two or more processors (for example, a combination of a plurality of FPGAs and/or a combination of a CPU and an FPGA) of the same type or different types. In addition, a plurality of the processing units may be composed of one processor.

As an example in which the plurality of processing units are composed of one processor, firstly, as represented by a computer, such as a client and a server, there is a form in which one processor is composed of a combination of one or more CPUs and software, and the processor functions as the plurality of processing units. Second, as represented by a system on chip (SoC) or the like, there is a form in which a processor, which realizes the functions of the entire system including the plurality of processing units with a single integrated circuit (IC) chip, is used. As described above, various processing units are composed of one or more of the various processors as the hardware structure.

Further, as the hardware structure of these various processors, more specifically, it is possible to use an electric circuit (circuitry) in which circuit elements, such as semiconductor elements, are combined.

[Supplementary Note 1]

It is preferable that the shared images be rearranged in accordance with the presentation priorities and presented.

[Supplementary Note 2]

It is preferable that the processor classify the shared images into a plurality of attribute groups based on attribute information of each of a plurality of the shared images, and the shared images be presented for each attribute group.

[Supplementary Note 3]

It is preferable that the attribute information be at least any of a subject of the shared image or imaging date and time of the shared image.

[Supplementary Note 4]

It is preferable that the processor present an imaging condition of the second imaging apparatus associated with the specific image.

[Supplementary Note 5]

It is preferable that the processor derive the first performance evaluation value based on first apparatus information related to the first imaging apparatus, and derive the second performance evaluation value based on second apparatus information related to the second imaging apparatus.

[Supplementary Note 6]

It is preferable that the processor present the second apparatus information associated with the specific image.

[Supplementary Note 7]

It is preferable that the processor set the presentation priority of the specific image associated with the second user who owns the second imaging apparatus having the second apparatus information, which matches or is similar to the first apparatus information, to be higher than the presentation priorities of other specific images.

[Supplementary Note 8]

It is preferable that the first apparatus information and the second apparatus information include a plurality of evaluation items representing the performance of the first imaging apparatus and the performance of the second imaging apparatus, and the processor evaluate the performance of the first imaging apparatus and the performance of the second imaging apparatus for each of the plurality of evaluation items to derive the first performance evaluation value and the second performance evaluation value obtained by integrating the plurality of evaluation items.

[Supplementary Note 9]

It is preferable that the processor change at least any of the evaluation item or an evaluation standard for the evaluation item in accordance with a scene reflected in the shared image to derive the first performance evaluation value and the second performance evaluation value.

[Supplementary Note 10]

It is preferable that the first apparatus information include first body information related to a body of the first imaging apparatus and first lens information related to a lens built in or mounted on the body of the first imaging apparatus, and the second apparatus information include second body information related to a body of the second imaging apparatus and second lens information related to a lens built in or mounted on the body of the second imaging apparatus.

[Supplementary Note 11]

It is preferable that the processor derive the first performance evaluation value based only on the first apparatus information of the first imaging apparatus associated with the shared image, and derive the second performance evaluation value based only on the second apparatus information of the second imaging apparatus associated with the shared image.

[Supplementary Note 12]

It is preferable that the processor derive the first performance evaluation value based on the first apparatus information of the first imaging apparatus associated with a first user image associated with the first user, which is the first user image other than the shared image, in addition to the first apparatus information of the first imaging apparatus associated with the shared image, and derive the second performance evaluation value based on the second apparatus information of the second imaging apparatus associated with a second user image associated with the second user, which is the second user image other than the shared image, in addition to the second apparatus information of the second imaging apparatus associated with the shared image.

[Supplementary Note 13]

It is preferable that the processor select a first type of a first imaging apparatus that satisfies a predetermined first selection condition from among a plurality of types of the first imaging apparatuses, and derive the first performance evaluation value based on first apparatus information of the first type of the first imaging apparatus.

[Supplementary Note 14]

It is preferable that the first selection condition be a content that the first imaging apparatus of which a usage frequency is equal to or higher than a predetermined first setting frequency is selected.

[Supplementary Note 15]

It is preferable that the processor select a second type of a second imaging apparatus that satisfies a predetermined second selection condition from among a plurality of types of the second imaging apparatuses, and derive the second performance evaluation value based on second apparatus information of the second type of the second imaging apparatus.

[Supplementary Note 16]

It is preferable that the second selection condition be a content that the second imaging apparatus of which a usage frequency is equal to or higher than a predetermined second setting frequency is selected.

[Supplementary Note 17]

It is preferable that the processor acquire a first imaging skill evaluation value related to an imaging skill of the first user and a second imaging skill evaluation value related to an imaging skill of the second user, and set the presentation priority also in consideration of the first imaging skill evaluation value and the second imaging skill evaluation value.

The technology of the present disclosure can also be appropriately combined with various embodiments and/or various modification examples described above. In addition, it is needless to say that the present disclosure is not limited to each of the embodiments described above, various configurations can be adopted as long as the configuration does not deviate from the gist. Further, the technology of the present disclosure includes, in addition to the program, a storage medium that stores the program in a non-transitory manner. The contents described and shown above are the detailed description of the parts according to the technology of the present disclosure, and are merely an example of the technology of the present disclosure. For example, the above description of the configuration, the function, the action, and the effect are the description of examples of the configuration, the function, the action, and the effect of the parts according to the technology of the present disclosure. Accordingly, it is needless to say that unnecessary parts may be deleted, new elements may be added, or replacements may be made with respect to the contents described and shown above within a range that does not deviate from the gist of the technology of the present disclosure. In addition, in order to avoid complications and facilitate grasping the parts according to the technology of the present disclosure, in the contents described and shown above, the description of technical general knowledge and the like that do not particularly require description for enabling the implementation of the technology of the present disclosure are omitted.

In the present specification, "A and/or B" is synonymous with "at least one of A or B". That is, "A and/or B" means that it may be only A, only B, or a combination of A and B. In addition, in the present specification, also in a case in which three or more matters are associated and expressed by "and/or", the same concept as "A and/or B" is applied.

All documents, patent applications, and technical standards described in the present specification are incorporated herein by reference to the same extent as in a case in which each document, each patent application, and each technical standard are specifically and individually described by being incorporated by reference.

What is claimed is:

1. An image processing device comprising:
at least one processor,
wherein the at least one processor
acquires a first performance evaluation value related to performance of a first imaging apparatus of a first user who is one of a plurality of users,
acquires a second performance evaluation value related to performance of a second imaging apparatus of a second user different from the first user among the plurality of users,
specifies an image of the second user corresponding to the second imaging apparatus having the second performance evaluation value, a difference of which from the first performance evaluation value satisfies a predetermined condition, among shared images which are shared by the plurality of users, and
sets a presentation priority of a specific image, which is the specified image, to the first user to be higher than presentation priorities of other shared images.

2. The image processing device according to claim 1, wherein the shared images are rearranged in accordance with the presentation priorities and presented.

3. The image processing device according to claim 1, wherein the at least one processor classifies the shared images into a plurality of attribute groups based on attribute information of each of a plurality of the shared images, and the shared images are presented for each attribute group.

4. The image processing device according to claim 3, wherein the attribute information is at least any of a subject of the shared image or imaging date and time of the shared image.

5. The image processing device according to claim 1, wherein the at least one processor presents an imaging condition of the second imaging apparatus associated with the specific image.

6. The image processing device according to claim 1, wherein the at least one processor
derives the first performance evaluation value based on first apparatus information related to the first imaging apparatus, and
derives the second performance evaluation value based on second apparatus information related to the second imaging apparatus.

7. The image processing device according to claim 6, wherein the at least one processor presents the second apparatus information associated with the specific image.

8. The image processing device according to claim 6, wherein the at least one processor sets the presentation priority of the specific image associated with the second user corresponding to the second imaging apparatus having the second apparatus information, which matches or is similar to the first apparatus information, to be higher than the presentation priorities of other specific images.

9. The image processing device according to claim 6, wherein the first apparatus information and the second apparatus information include a plurality of evaluation items representing the performance of the first imaging apparatus and the performance of the second imaging apparatus, and
the at least one processor evaluates the performance of the first imaging apparatus and the performance of the second imaging apparatus for each of the plurality of evaluation items to derive the first performance evaluation value and the second performance evaluation value obtained by integrating the plurality of evaluation items.

10. The image processing device according to claim 9, wherein the at least one processor changes at least any of the evaluation item or an evaluation standard for the evaluation item in accordance with a scene corresponding to the shared image to derive the first performance evaluation value and the second performance evaluation value.

11. The image processing device according to claim 6, wherein the first apparatus information includes first body information related to a body of the first imaging apparatus and first lens information related to a lens built in or mounted on the body of the first imaging apparatus, and
the second apparatus information includes second body information related to a body of the second imaging apparatus and second lens information related to a lens built in or mounted on the body of the second imaging apparatus.

12. The image processing device according to claim 6, wherein the at least one processor
derives the first performance evaluation value based only on the first apparatus information of the first imaging apparatus associated with the shared image, and
derives the second performance evaluation value based only on the second apparatus information of the second imaging apparatus associated with the shared image.

13. The image processing device according to claim 6, wherein the at least one processor
derives the first performance evaluation value based on the first apparatus information of the first imaging apparatus associated with a first user image associated with the first user, which is the first user image other than the shared image, in addition to the first apparatus information of the first imaging apparatus associated with the shared image, and
derives the second performance evaluation value based on the second apparatus information of the second imaging apparatus associated with a second user image associated with the second user, which is the second user image other than the shared image, in addition to the second apparatus information of the second imaging apparatus associated with the shared image.

14. The image processing device according to claim 13, wherein the at least one processor
selects a first type of a first imaging apparatus that satisfies a predetermined first selection condition from among a plurality of types of the first imaging apparatuses, and
derives the first performance evaluation value based on first apparatus information of the first type of the first imaging apparatus.

15. The image processing device according to claim 14, wherein the first selection condition is a content that the first imaging apparatus of which a usage frequency is equal to or higher than a predetermined first setting frequency is selected.

16. The image processing device according to claim 13, wherein the at least one processor
selects a second type of a second imaging apparatus that satisfies a predetermined second selection condition from among a plurality of types of the second imaging apparatuses, and
derives the second performance evaluation value based on second apparatus information of the second type of the second imaging apparatus.

17. The image processing device according to claim 16, wherein the second selection condition is a content that the second imaging apparatus of which a usage frequency is equal to or higher than a predetermined second setting frequency is selected.

18. The image processing device according to claim 1, wherein the at least one processor
acquires a first imaging skill evaluation value related to an imaging skill of the first user and a second imaging skill evaluation value related to an imaging skill of the second user, and
sets the presentation priority also in consideration of the first imaging skill evaluation value and the second imaging skill evaluation value.

19. An operation method of an image processing device, the method comprising:

via a processor, acquiring a first performance evaluation value related to performance of a first imaging apparatus of a first user who is one of a plurality of users;

acquiring a second performance evaluation value related to performance of a second imaging apparatus of a second user different from the first user among the plurality of users;

specifying an image of the second user corresponding to the second imaging apparatus having the second performance evaluation value, a difference of which from the first performance evaluation value satisfies a predetermined condition, among shared images which are shared by the plurality of users; and setting a presentation priority of a specific image, which is the specified image, to the first user to be higher than presentation priorities of other shared images.

20. A non-transitory computer-readable storage medium storing an operation program of an image processing device, the program causing a processor to function as:

acquire a first performance evaluation value related to performance of a first imaging apparatus of a first user who is one of a plurality of users;

acquire a second performance evaluation value related to performance of a second imaging apparatus of a second user different from the first user among the plurality of users;

specify an image of the second user corresponding to the second imaging apparatus having the second performance evaluation value, a difference of which from the first performance evaluation value satisfies a predetermined condition, among shared images which are shared by the plurality of users; and set a presentation priority of a specific image, which is the specified image, to the first user to be higher than presentation priorities of other shared images.

* * * * *